US010834718B2

(12) United States Patent
Shin et al.

(10) Patent No.: US 10,834,718 B2
(45) Date of Patent: Nov. 10, 2020

(54) METHOD AND DEVICE FOR SETTING PLURALITY OF DMRS STRUCTURES IN WIRELESS CELLULAR COMMUNICATION SYSTEM

(71) Applicant: Samsung Electronics Co., Ltd., Gyeonggi-do (KR)

(72) Inventors: Cheolkyu Shin, Gyeonggi-do (KR); Jeongho Yeo, Gyeonggi-do (KR); Jinyoung Oh, Seoul (KR); Youngwoo Kwak, Gyeonggi-do (KR); Donghan Kim, Gyeonggi-do (KR); Younsun Kim, Gyeonggi-do (KR); Hoondong Noh, Gyeonggi-do (KR); Taehyoung Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/319,730

(22) PCT Filed: Jul. 21, 2017

(86) PCT No.: PCT/KR2017/007864
§ 371 (c)(1),
(2) Date: Jan. 22, 2019

(87) PCT Pub. No.: WO2018/016904
PCT Pub. Date: Jan. 25, 2018

(65) Prior Publication Data

US 2019/0342865 A1 Nov. 7, 2019

(30) Foreign Application Priority Data

Jul. 21, 2016 (KR) ........................ 10-2016-0092713
Aug. 23, 2016 (KR) ........................ 10-2016-0106711

(Continued)

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/1819* (2013.01); *H04L 5/0051* (2013.01);
(Continued)

(58) Field of Classification Search
None
See application file for complete search history.

(56) References Cited

U.S. PATENT DOCUMENTS

2012/0163335 A1* 6/2012 Chung .................. H04L 5/0023 370/330
2012/0294248 A1* 11/2012 Seo ....................... H04W 24/00 370/329

(Continued)

FOREIGN PATENT DOCUMENTS

WO WO 2011046413 4/2011
WO WO 2014/161141 10/2014

(Continued)

OTHER PUBLICATIONS

PCT/ISA/210 Search Report issued on PCT/KR2017/007864 (pp. 5).

(Continued)

*Primary Examiner* — Steven H Nguyen
(74) *Attorney, Agent, or Firm* — The Farrell Law Firm, P.C.

(57) ABSTRACT

Disclosed are a communication technique of merging, with IoT technology, a 5G communication system for supporting a data transmission rate higher than that of a 4G system, and a system therefor. The disclosure can be applied to intelligent services (for example, smart home, smart building, (Continued)

smart city, smart car or connected car, health care, digital education, retailing, security and safety relate services, and the like) on the basis of 5G communication technology and IoT related technology. Disclosed is a method by which a base station sets a plurality of demodulation reference signal (DMRS) structures and determines uplink and downlink transmission timing for reducing delay.

16 Claims, 42 Drawing Sheets

(30) Foreign Application Priority Data

| | | |
|---|---|---|
| Sep. 13, 2016 | (KR) | 10-2016-0118399 |
| Feb. 3, 2017 | (KR) | 10-2017-0015794 |
| May 4, 2017 | (KR) | 10-2017-0057045 |

(51) Int. Cl.

| | |
|---|---|
| ***H04L 1/18*** | (2006.01) |
| ***H04L 5/00*** | (2006.01) |
| ***H04L 5/10*** | (2006.01) |

(52) U.S. Cl.

CPC .......... *H04L 5/0055* (2013.01); *H04L 5/0083* (2013.01); *H04L 5/10* (2013.01); *H04W 72/0446* (2013.01); *H04W 76/27* (2018.02); *H04L 5/0007* (2013.01)

(56) References Cited

U.S. PATENT DOCUMENTS

| | | | | |
|---|---|---|---|---|
| 2012/0300728 | A1 | 11/2012 | Lee et al. | |
| 2013/0135984 | A1 | 5/2013 | Choi et al. | |
| 2014/0293881 | A1* | 10/2014 | Khoshnevis | H04L 5/0046 370/329 |
| 2016/0057753 | A1 | 2/2016 | Yang et al. | |
| 2016/0087774 | A1* | 3/2016 | Guo | H04L 5/0051 370/329 |
| 2016/0143030 | A1* | 5/2016 | Lee | H04L 5/00 370/329 |
| 2016/0337841 | A1 | 11/2016 | Won et al. | |
| 2016/0338049 | A1 | 11/2016 | Takeda et al. | |
| 2017/0317808 | A1 | 11/2017 | You et al. | |
| 2018/0069652 | A1* | 3/2018 | Yamamoto | H04L 5/0051 |
| 2018/0241508 | A1* | 8/2018 | Chervyakov | H04L 5/0051 |

FOREIGN PATENT DOCUMENTS

| | | | |
|---|---|---|---|
| WO | WO 2015/108008 | 7/2015 | |
| WO | WO 2015/148041 | 10/2015 | |
| WO | WO 2016064218 | 4/2016 | |
| WO | WO 2016204549 | 12/2016 | |
| WO | WO-2018228305 A1 * | 12/2018 | H04L 5/0053 |

OTHER PUBLICATIONS

PCT/ISA/237 Written Opinion issued on PCT/KR2017/007864 (pp. 7).

European Search Report dated Aug. 9, 2019 issued in counterpart application No. 17831376.3-1219, 7 pages.

* cited by examiner

FIG. 1D
FIG. 1d-1
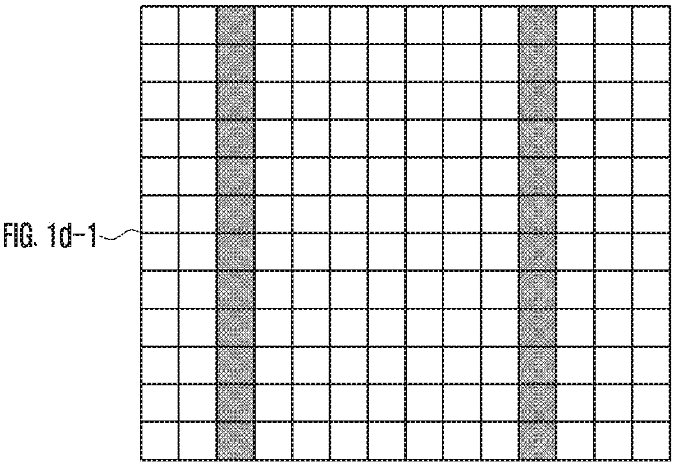
FIG. 1d-2
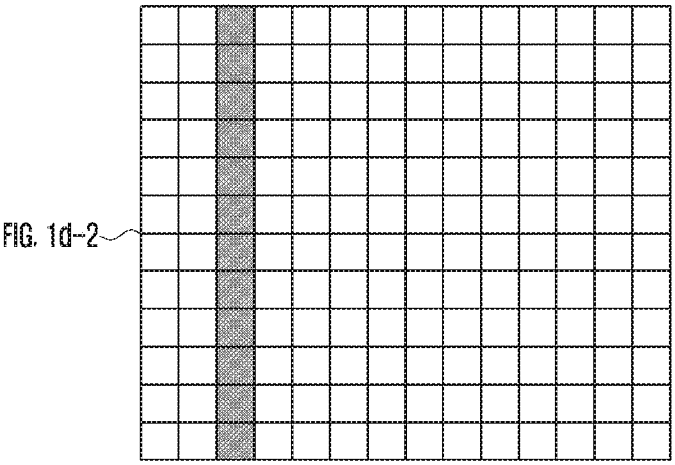
FIG. 1d-3
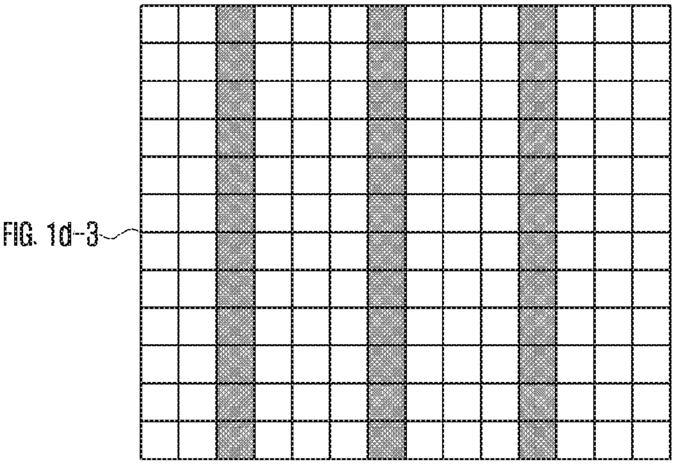

FIG. 1FAA
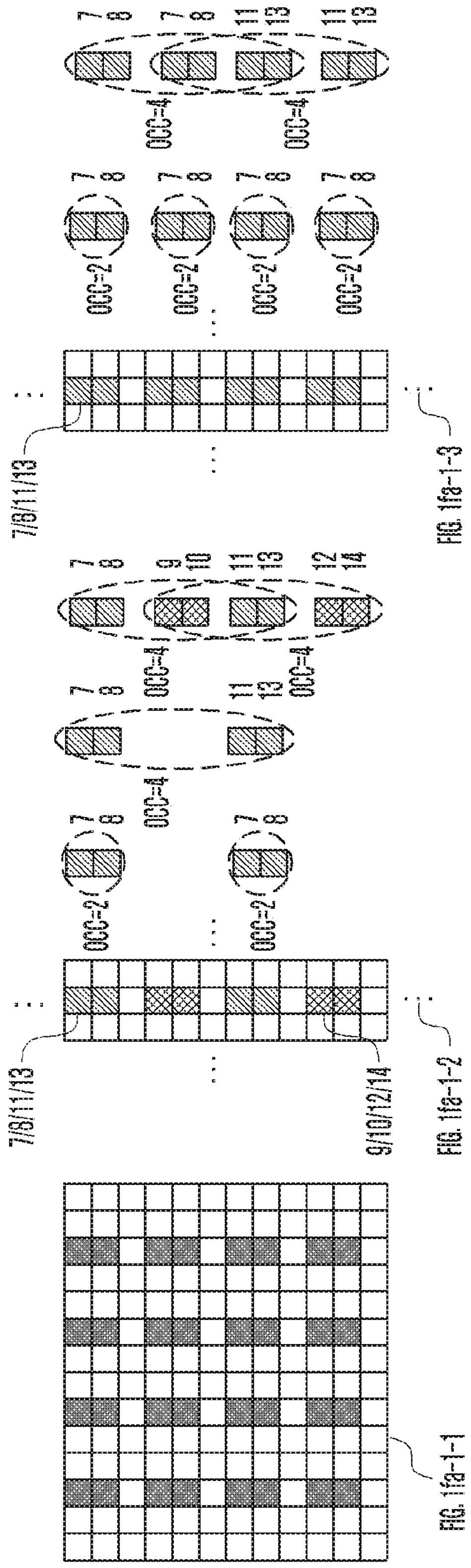

FIG. 1FAB
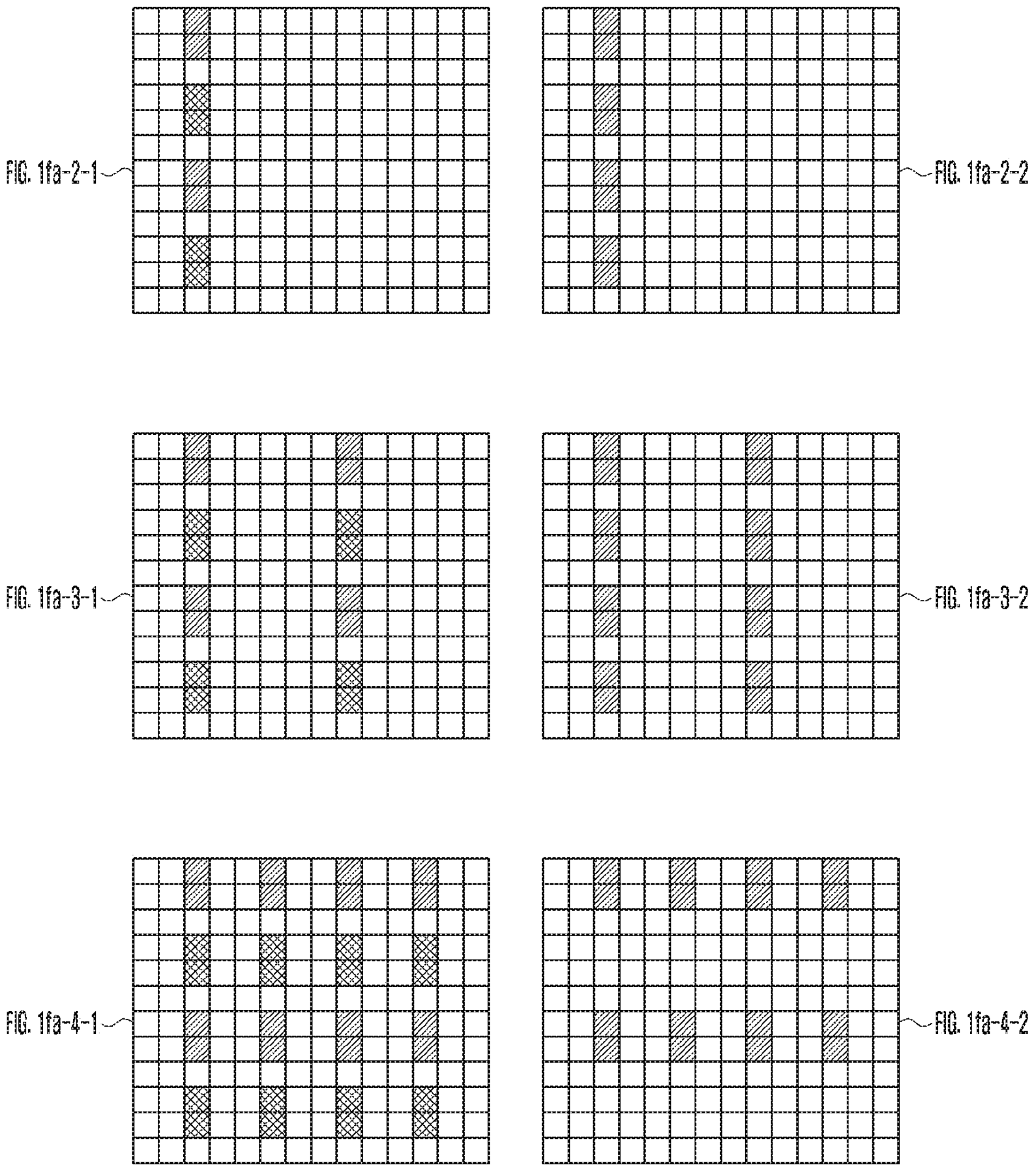

FIG. 1FBA
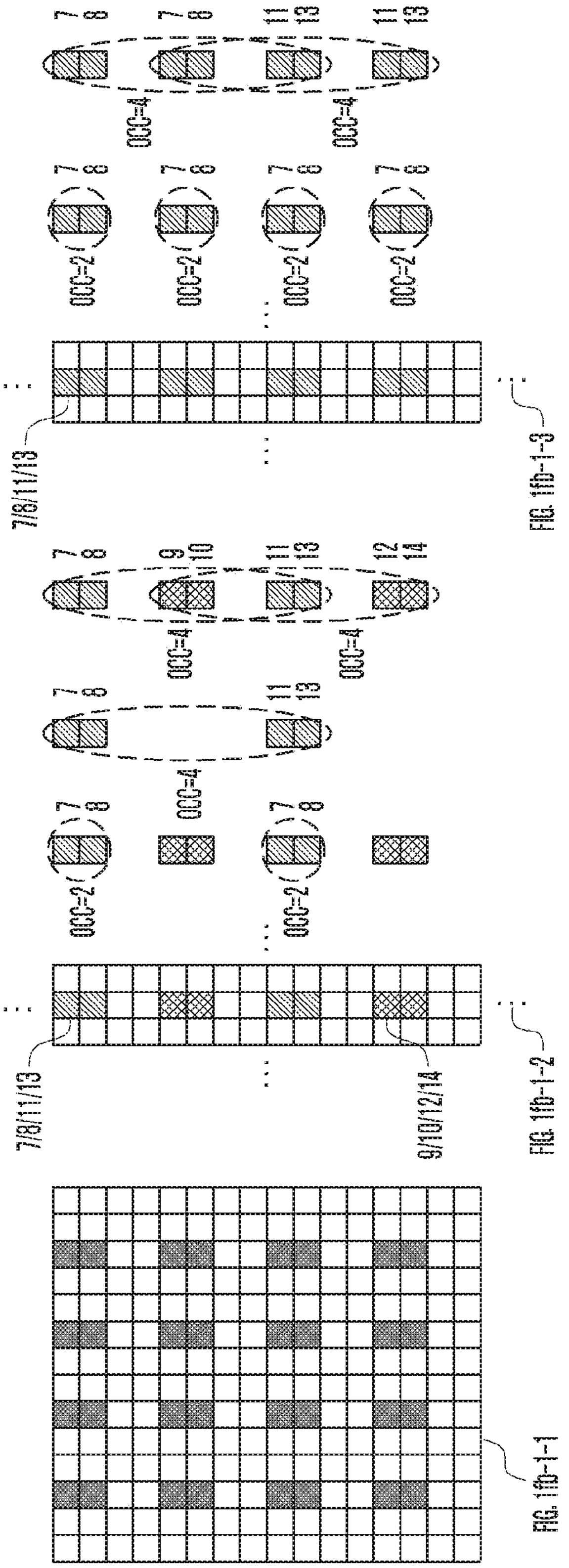

FIG. 1FBB

FIG. 1G
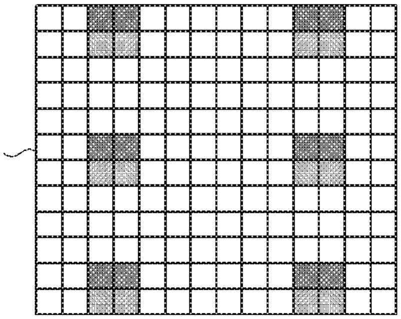
FIG. 1g-1
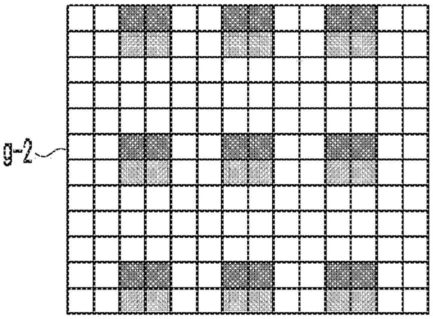
FIG. 1g-2
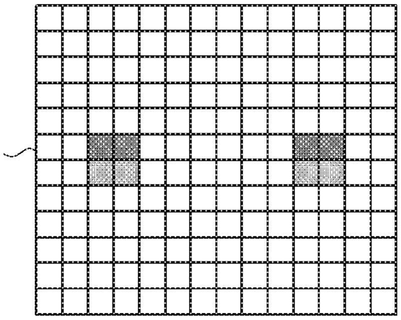
FIG. 1g-3-1
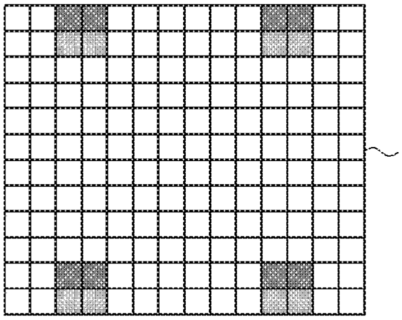
FIG. 1g-3-2
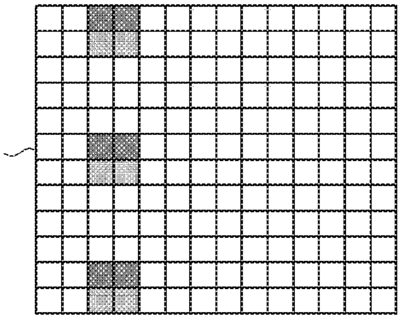
FIG. 1g-4-1
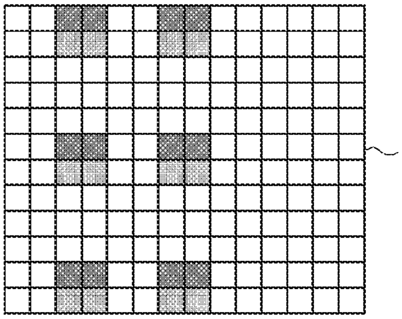
FIG. 1g-4-2

(a) BLOCK DIAGRAM OF CHANNEL-CODING WITHOUT OUTER CODE (b) BLOCK DIAGRAM OF CHANNEL-CODING WITH OUTER CODE

METHOD AND DEVICE FOR SETTING PLURALITY OF DMRS STRUCTURES IN WIRELESS CELLULAR COMMUNICATION SYSTEM

PRIORITY

This application is a National Phase Entry of PCT International Application No. PCT/KR2017/007864 which was filed on Jul. 21, 2017, and claims priority to Korean Patent Application Nos. 10-2016-0092713, 10-2016-0106711, 10-2016-0118399, 10-2017-0015794, and 10-2017-0057045, which were filed on Jul. 21, 2016, Aug. 23, 2016, Sep. 13, 2016, Feb. 3, 2017, and May 4, 2017, respectively, the content of each of which is incorporated herein by reference.

BACKGROUND

1. Field

The present disclosure relates to a wireless communication system and, more particularly, to a method and device for a base station to set a plurality of demodulation reference signal (DMRS) structures and determine uplink and downlink transmission timing for reducing a delay.

2. Description of Related Art

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system. In order to accomplish a higher data transfer rate, implementation of the 5G communication system at a super-high frequency (mmWave) band (e.g., such as a 60 GHz band) is being considered. In order to obviate a propagation loss of a radio wave and increase a delivery distance of a radio wave at the super-high frequency band, discussions are underway about various techniques such as a beamforming, a massive MIMO, a full dimensional MIMO (FD-MIMO), an array antenna, an analog beam-forming, and a large scale antenna for the 5G communication system. Additionally, for an improvement in the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like. Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, the Internet, which is a human centered connectivity network where humans generate and consume information, is now evolving to the Internet of things (IoT) where distributed entities, such as things, exchange and process information without human intervention. Further, the Internet of everything (IoE), which is a combination of IoT technology and big data processing technology through connection with a cloud server, has emerged. As technology elements, such as sensing technology, wired/wireless communication and network infrastructure, service interface technology, and security technology, have been demanded for IoT implementation, a sensor network, machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, advanced medical service, etc. through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

In addition, unlike the LTE system, the 5G wireless communication considers a system that operates in a higher frequency band as well as in a frequency band of 6 GHz or less. Since channel characteristics depend on the frequency band, the 5G system is required to newly design a reference signal in consideration of this. In addition, the 5G wireless communication considers importantly the support of low latency and high mobility, and it is important to minimize the overhead of the reference signal.

An object of the present disclosure is to support low latency and high mobility and also minimize the overhead of a reference signal by constructing a plurality of demodulation reference signal (DMRS) structures and providing a method for allowing a base station to set the DMRS structures in the 5G system that operates in a higher frequency band as well as in a frequency band of 6 GHz or less.

In addition, another object of the present disclosure is to minimize the overhead of a reference signal by providing a method for allowing a terminal to configure necessary information and feed it back such that a base station selects a DMRS suitable for a transmission environment from among a plurality of DMRS structures.

In addition, still another object of the present disclosure is to reduce a delay time for data transmission by provide a method for determining transmission timing such as HARQ ACK/NACK transmission timing or PUSCH transmission timing when a time required for signal processing of a base station and a terminal is reduced in the LTE system using FDD or TDD.

SUMMARY

In order to achieve the above objects, a method by a base station according to an embodiment of the present disclosure may comprise determining control information including at least one of first information for a number of a symbol and second information for a position on a time axis of the symbol for transmission of a demodulation reference signal (DMRS), transmitting the control information to a terminal, and transmitting the DMRS according to the determined control information to the terminal.

A base station according to an embodiment of the present disclosure may comprise a transceiver and a controller configured to determine control information including at least one of first information for a number of a symbol and second information for a position on a time axis of the symbol for transmission of a demodulation reference signal (DMRS), control the transceiver to transmit the control information to a terminal, and control the transceiver to transmit the DMRS according to the determined control information to the terminal.

A method by a terminal according to an embodiment of the present disclosure may comprise receiving, from a base station, control information including at least one of first information for a number of a symbol and second information for a position on a time axis of the symbol for transmission of a demodulation reference signal (DMRS), and receiving the DMRS according to the control information.

A terminal according to an embodiment of the present disclosure may comprise a transceiver configured to receive, from a base station, control information including at least one of first information for a number of a symbol and second information for a position on a time axis of the symbol for transmission of a demodulation reference signal (DMRS), and control the transceiver to receive the DMRS according to the control information.

In another embodiment of the present disclosure, a method by a terminal may include receiving a first signal in a (n−k)th subframe from a base station, identifying, in Table 3-7a below, a subframe for transmitting a second signal corresponding to the first signal, and transmitting the second signal in the identified subframe.

TABLE 3-7a

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 6, 4, 3 | — | — | — | — | 7, 6, 4, 3 | — | — |
| 3 | — | — | 7, 6, 5 | 5, 4 | 4, 3 | — | — | — | — | — |
| 4 | — | — | 11, 8, 7, 6 | 6, 5, 4, 3 | — | — | — | — | — | — |
| 5 | — | — | 12, 9, 8, 7, 5, 4, 3, 11, 6 | — | — | — | — | — | — | — |
| 6 | — | — | 6 | 4 | 4 | — | — | 6 | 3 | — |

In another embodiment of the present disclosure, wherein the identifying the subframe for transmitting the second signal in Table 3-7a may include identifying a reception timing of the first signal in Table 3-7a, and determining a transmission timing of the second signal corresponding to the reception timing of the first signal.

In another embodiment of the present disclosure, the first signal may include a physical downlink shared channel (PDSCH), and the second signal may include ACK (acknowledgement)/NACK (negative acknowledgement) information for the PDSCH.

In another embodiment of the present disclosure, a method of a base station may include transmitting a first signal in a (n−k)th subframe to a terminal, identifying, in Table 3-7a below, a subframe for receiving a second signal corresponding to the first signal, and receiving the second signal in the identified subframe.

TABLE 3-7a

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 6, 4, 3 | — | — | — | — | 7, 6, 4, 3 | — | — |
| 3 | — | — | 7, 6, 5 | 5, 4 | 4, 3 | — | — | — | — | — |
| 4 | — | — | 11, 8, 7, 6 | 6, 5, 4, 3 | — | — | — | — | — | — |
| 5 | — | — | 12, 9, 8, 7, 5, 4, 3, 11, 6 | — | — | — | — | — | — | — |
| 6 | — | — | 6 | 4 | 4 | — | — | 6 | 3 | — |

In another embodiment of the present disclosure, wherein the identifying the subframe for receiving the second signal in Table 3-7a may include determining a transmission timing of the first signal in Table 3-7a, and identifying a reception timing of the second signal corresponding to the transmission timing of the first signal.

Advantageous Effects of Invention

According to an embodiment of the present disclosure, provided is a method for constructing a plurality of demodulation reference signal (DMRS) structures and allowing a base station to set the DMRS structure suitable for a transmission environment. This makes it possible to effectively perform channel estimation according to the support of low latency and high mobility in a channel environment of the 5G wireless communication system. It is also possible to environment-adaptively perform DMRS transmission, minimize the overhead of a reference signal, and effectively transmit a radio resource.

In addition, according to another embodiment of the present disclosure, provided is a method for allowing a terminal to configure necessary information and feed it back such that a base station selects a DMRS suitable for a transmission environment from among a plurality of DMRS structures. Through this disclosure, it is possible to environment-adaptively perform DMRS transmission and minimize the overhead of a reference signal.

In addition, according to still another embodiment of the present disclosure, a method for determining transmission timing such as HARQ ACK/NACK transmission timing or data transmission timing is provided to reduce a delay time.

BRIEF DESCRIPTION OF DRAWINGS

FIGS. 1D, 1E, 1FAA, 1FAB, 1FBA, 1FBB and 1G are diagrams illustrating a plurality of DMRS structures according to the 1-1st embodiment of the present disclosure.

FIG. 1O is a diagram illustrating a method for mapping much more antenna ports to the unit DMRS structure proposed in FIG. 1M.

FIG. 3I is a diagram illustrating terminal operations according to the 3-5th, 3-6th, 3-7th, and 3-8th embodiments.

MODE FOR THE INVENTION

Figure 1A:
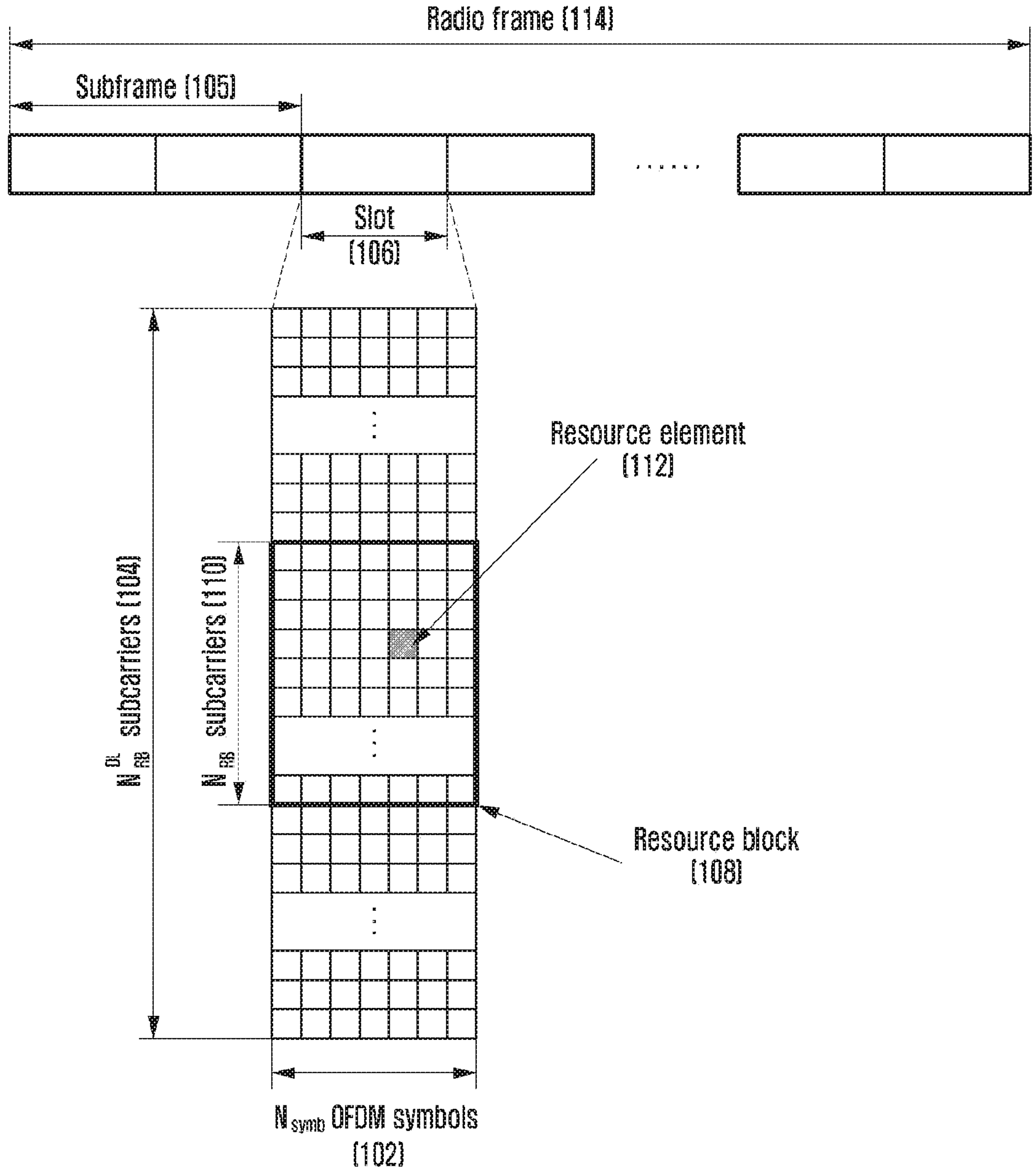
FIG. 1A is a diagram illustrating a downlink time-frequency domain transmission structure of an LTE or LTE-A system.

Hereinafter, embodiments of the present disclosure will be described in detail with reference to the accompanying drawings. In the following description, a detailed description of known functions and configurations incorporated herein will be omitted when it may make the subject matter of the present disclosure rather unclear. The following terms are defined in consideration of the functions of the present disclosure, and may be changed according to the intention of the user, the operator, or the like. Therefore, the definition should be based on the contents throughout this specification.

The advantages and features of the present disclosure and the manner of achieving them will become apparent with reference to the embodiments described in detail below and with reference to the accompanying drawings. The present disclosure may, however, be embodied in many different forms and should not be construed as being limited to the embodiments set forth herein. Rather, these embodiments are provided so that this disclosure will be thorough and complete and will fully convey the scope of the disclosure to those skilled in the art. The present disclosure is only defined by the scope of claims. Like reference numerals refer to like elements throughout the specification.

Wireless communication systems that have initially provided voice-oriented services are now evolving into broadband wireless communication systems that provide high-speed and high-quality packet data services, based on communication standards such as high speed packet access (HSPA), long term evolution (LTE, or referred to as evolved universal terrestrial radio access (E-UTRA)), or LTE-advanced (LTE-A) of the 3rd generation partnership project (3GPP), high rate packet data (HRPD) of 3GPP2, ultra mobile broadband (UMB), and 802.16e of institute of electrical and electronics engineers (IEEE). In addition, a 5G or new radio (NR) communication standard is being developed for the 5th generation wireless communication system.

1st Embodiment

In a wireless communication system, a base station should transmit a reference signal for channel estimation of a terminal. Using the reference signal, the terminal can perform channel estimation and demodulate a received signal. Also, the terminal can know a channel status through the reference signal and feed it back to the base station.

Normally, for the transmission of the reference signal, the transmission interval of the reference signal based on frequency and time is determined in consideration of the maximum delay spread and the maximum Doppler spread of a channel. As the transmission interval of the reference signal becomes narrower, the channel estimation performance is improved and thereby the demodulation performance of a signal can be improved. However, this results in increasing the overhead of the reference signal, thus restricting a data transmission rate.

A typical 4G LTE system that operates in a frequency band of 2 GHz uses the reference signals such as a cell-specific reference signal (CRS) and a demodulation reference signal (DMRS) in a downlink. If the interval of the reference signal is represented by a subcarrier interval 'm' of an orthogonal frequency division multiplexing (OFDM) signal in frequency and by a symbol interval 'n' of the OFDM signal in time, the transmission interval (m, n) based on frequency and time of the reference signal corresponding to antenna ports 1 and 2 is (3, 4) in case of the CRS assuming a normal cyclic prefix (CP). Also, in case of the DMRS assuming the normal CP, the transmission interval (m, n) based on frequency and time of the reference signal is (5, 7).

Unlike the LTE system, the 5G wireless communication considers a system that operates in a higher frequency band as well as in a frequency band of 6 GHz or less. Since channel characteristics depend on the frequency band, the 5G system is required to newly design the reference signal in consideration of this.

The LTE/LTE-A systems, which are representative examples of the broadband wireless communication system, employ an orthogonal frequency division multiplexing (OFDM) scheme in a downlink (DL) and employ a single carrier frequency division multiple access (SC-FDMA) scheme in an uplink (UL). The uplink refers to a radio link through which a terminal (also referred to as user equipment (UE) or a mobile station (MS)) transmits data or a control signal to a base station (BS, also referred to as eNode B or eNB), and the downlink refers to a radio link through which the base station transmits data or a control signal to the terminal. The multiple access scheme as above distinguishes data or control information of each user by allocating and operating time-frequency resources so that the time-frequency resources for carrying data or control information are not overlapped with respect to respective users, that is, orthogonality is established.

FIG. 1A is a diagram illustrating a basic structure of time-frequency domain which is a radio resource region for transmission of data or control channel in the downlink of the LTE/LTE-A system.

In FIG. 1A, the horizontal axis represents the time domain, and the vertical axis represents the frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms.

In addition, a radio frame 114 is a time domain section composed of ten subframes. The minimum transmission unit in the frequency domain is a subcarrier, and the bandwidth of the entire system transmission bandwidth is composed of a total of $N_{BW}$ subcarriers 104.

In the time-frequency domain, a basic unit of resources is a resource element (RE) 112, which may be represented by an OFDM symbol index and a subcarrier index. A resource block (RB) 108 or physical resource block (PRB) is defined as consecutive $N_{symb}$ OFDM symbols 102 in the time domain and consecutive $N_{RB}$ subcarriers 110 in the frequency domain. Thus, one RB 108 is composed of $N_{symb}\times N_{RB}$ REs 112.

In general, the minimum transmission unit of data is the RB unit. In the LTE system, $N_{symb}$ is 7, $N_{RB}$ is 12, and $N_{BW}$ and $N_{RB}$ are proportional to the bandwidth of the system transmission band. A data transmission rate increases in proportion to the number of RBs scheduled to the terminal. The LTE system defines and operates six transmission bandwidths. In case of an FDD system where the downlink and the uplink are separated by frequency, a downlink transmission bandwidth and an uplink transmission bandwidth may be different from each other. A channel bandwidth represents an RF bandwidth corresponding to the system transmission bandwidth.

Table 1-1 shows a relationship between the system transmission bandwidth and the channel bandwidth as defined in the LTE system. For example, an LTE system with a 10 MHz channel bandwidth has a transmission bandwidth formed of 50 RBs.

TABLE 1-1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Figure 1B:
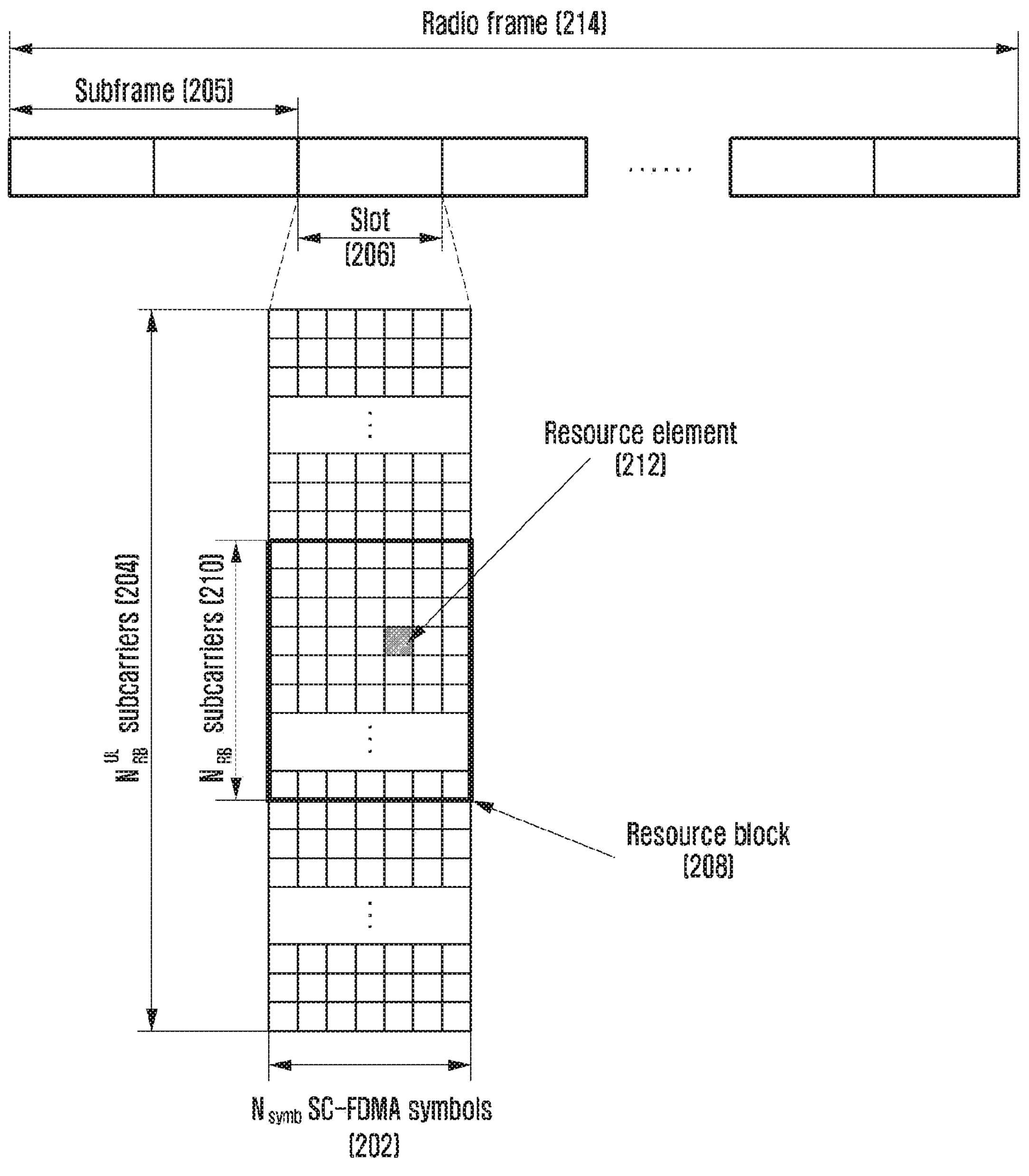
FIG. 1B is a diagram illustrating an uplink time-frequency domain transmission structure of an LTE or LTE-A system.

FIG. 1B is a diagram illustrating a basic structure of time-frequency domain which is a radio resource region for transmission of data or control channel in the uplink of the LTE/LTE-A system.

In FIG. 1B, the horizontal axis represents the time domain, and the vertical axis represents the frequency domain. The minimum transmission unit in the time domain is an SC-FDMA symbol 202. $N_{symb}^{UL}$ SC-FDMA symbols constitute one slot 206, and two slots constitute one subframe 205. The minimum transmission unit in the frequency domain is a subcarrier, and the entire system transmission bandwidth 204 is composed of a total of $N_{BW}$ subcarriers. $N_{BW}$ has a value proportional to the system transmission band.

In the time-frequency domain, a basic unit of resources is a resource element (RE) 212, which may be defined by an SC-FDMA symbol index and a subcarrier index. A resource block (RB) pair 208 is defined as consecutive $N_{symb}^{UL}$ SC-FDMA symbols in the time domain and consecutive $N_{SC}^{RB}$ subcarriers in the frequency domain. Thus, one RB is composed of $N_{symb}^{UL}\times N_{SC}^{RB}$ REs. Normally, the minimum transmission unit of data or control information is the RB unit. In case of PUCCH, it is mapped to a frequency region corresponding to 1 RB and transmitted during one subframe.

Figure 1C:
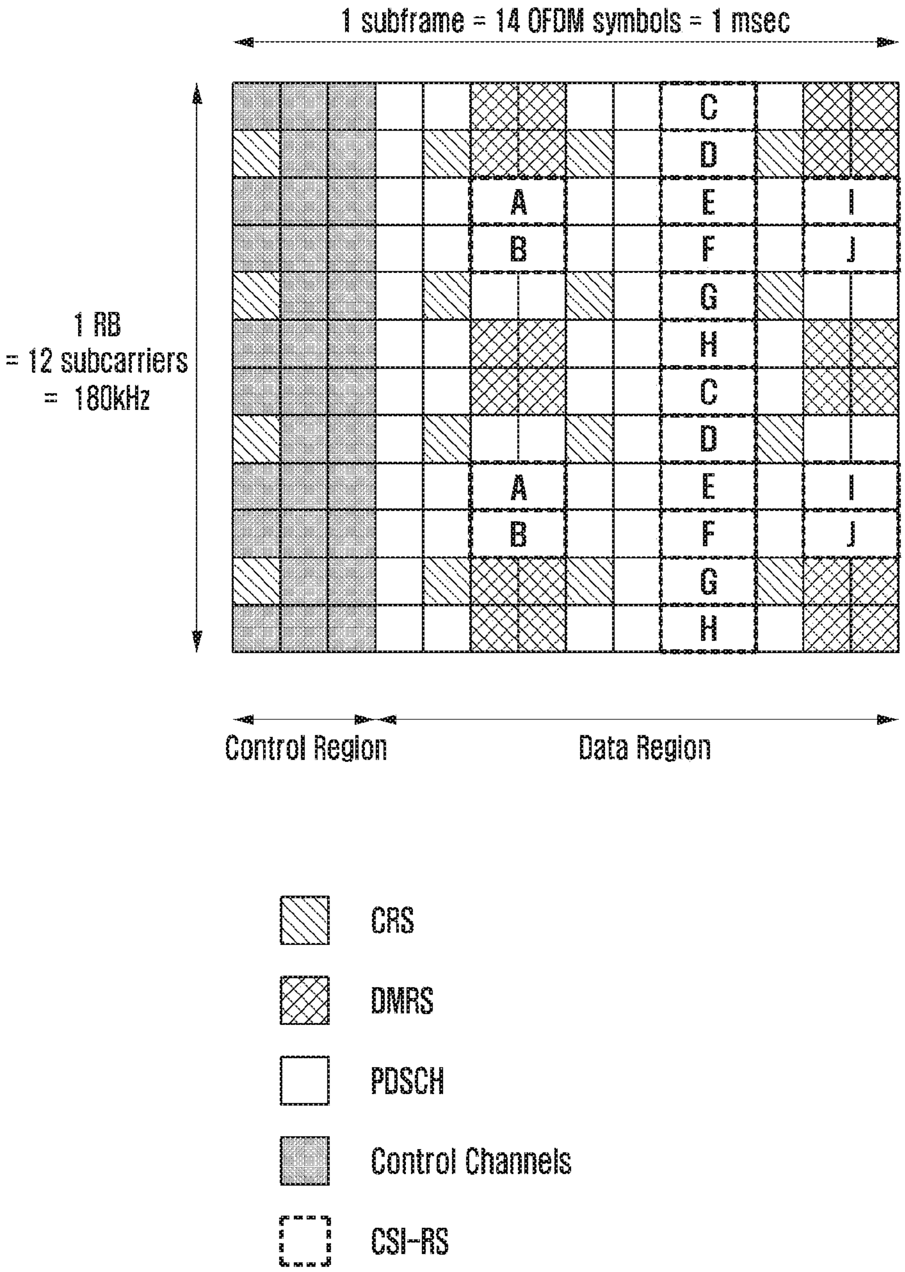
FIG. 1C is a diagram illustrating a radio resource of 1 RB which is a minimum unit of scheduling via downlink in an LTE or LTE-A system.

FIG. 1C is a diagram illustrating a radio resource of 1 RB which is a minimum unit of scheduling via downlink in an LTE or LTE-A system. As below, a plurality of different types of signals may be transmitted through radio resources shown in FIG. 1C.

1. Cell Specific RS (CRS): This is a reference signal transmitted periodically for all terminals belonging to one cell and can be used in common by a plurality of terminals.

2. Demodulation Reference Signal (DMRS): This is a reference signal transmitted for a specific terminal only in case of data transmission to that terminal. The DMRS may be composed of a total of 8 DMRS ports. In the LTE/LTE-A, ports 7 to 14 correspond to the DMRS ports, which maintain the orthogonality so that they do not interfere with each other by using code division multiplexing (CDM) or frequency division multiplexing (FDM).

3. Physical Downlink Shared Channel (PDSCH): This is a data channel transmitted in the downlink and used by a base station to transmit traffic to a terminal. This is transmitted through an RE which is not used for transmission of reference signals in the data region of FIG. 1C.

4. Channel Status Information Reference Signal (CSI-RS): This is a reference signal transmitted for terminals belonging to one cell and used for measuring a channel status. A plurality of CSI-RSs may be transmitted to one cell.

5. Other control channels (PHICH, PCFICH, and PDCCH): These provide control information necessary for a terminal to receive PDSCH or transmit ACK/NACK for operating hybrid automatic repeat request (HARQ) for uplink data transmission.

Among the above signals, the CRS and the DMRS are reference signals used for demodulating signals received through channel estimation. Since channel estimation performance directly affects demodulation performance, a transmission interval based on the frequency and time of the reference signal is determined and maintained. For example, if the interval of the reference signal is represented by a subcarrier interval 'm' of an OFDM signal in frequency and by a symbol interval 'n' of the OFDM signal in time, the transmission interval (m, n) based on frequency and time of the reference signal corresponding to antenna ports 1 and 2 is (3, 4) in case of the CRS assuming a normal CP. Also, in case of the DMRS assuming the normal CP, the transmission interval (m, n) based on frequency and time of the reference signal is (5, 7).

Unlike the LTE system, the 5G wireless communication considers a system that operates in a higher frequency band as well as in a frequency band of 6 GHz or less. Since channel characteristics depend on the frequency band, the 5G system is required to newly design a reference signal in consideration of this. In addition, the 5G wireless communication considers importantly the support of low latency and high mobility, and it is important to minimize the overhead of the reference signal. Accordingly, the present disclosure provides a method for constructing a plurality of demodulation reference signal (DMRS) structures and a method for setting this at a base station.

Now, embodiments of the present disclosure will be described in detail with reference to the accompanying drawings. Although embodiments of this disclosure will be described hereinafter using the LTE or LTE-A system as an example, the embodiments may be applied to other communication systems having a similar technical background or channel form, for example, to 5G (or new radio (NR)) mobile communication technology being developed after the LTE-A.

Specifically, the basic structure of the time-frequency domain for transmission of signals in the downlink and uplink may differ from those shown in FIGS. 1A and 1B. In addition, the types of signals transmitted in the downlink and uplink may be different. Thus, as will be apparent to those skilled in the art, embodiments of the present disclosure may be applied to other communication systems through some modifications without departing from the scope of the present disclosure.

In the following description, a detailed description of known functions and configurations incorporated herein will be omitted when it may make the subject matter of the present disclosure rather unclear. The following terms are defined in consideration of the functions of the present disclosure, and may be changed according to the intention of the user, the operator, or the like. Therefore, the definition should be based on the contents throughout this specification. Hereinafter, a base station (BS) which is an entity of allocating resources to a terminal may be at least one of an eNode B, a Node B, a radio access unit, a base station controller, or a node on a network. A terminal may include user equipment (UE), a mobile station (MS), a cellular phone, a smart phone, a computer, or a multimedia system capable of performing a communication function. In the present disclosure, a downlink (DL) refers to a wireless transmission path of a signal transmitted from the base station to the terminal, and an uplink (UL) is a wireless transmission path of a signal transmitted from the terminal to the base station.

A demodulation reference signal (DMRS) described below refers to a reference signal which UE-specific precoding is applied to and thus allows the terminal to perform demodulation without receiving additional precoding information. Although will be named hereinafter as used in the LTE system, the term DMRS may be expressed as any other term depending on a user's intention and purposes of using the reference signal. Specifically, the term DMRS is merely a specific example provided to facilitate understanding of the present disclosure and is not intended to limit the scope of the present disclosure. That is, it will be apparent to those skilled in the art that embodiments of the present disclosure can be applied to any reference signal based on the subject matter of the present disclosure.

In the 1-1st embodiment of the present disclosure, various DMRS structures according to use cases will be described. In the 1-2nd embodiment of the present disclosure, a method for a base station to set and transmit a suitable DMRS structure for a transmission environment among a plurality of DMRS structures will be described. In the 1-3rd embodiment of the present disclosure where a plurality of DMRS structures are supported, a method for terminals using different DMRS structures to support orthogonally multiple-user (MU) transmission will be described.

1-1st Embodiment

The 1-1st embodiment describes a method for constructing the structure of the DMRS, which is a reference signal of the present disclosure, variously according to transmission environments.

Referring to FIG. 1C, the LTE system has one fixed DMRS structure. When the number of transmission layers is two or less, 12 DMRS REs per RB are used for transmission. When the number of transmission layers exceeds two, 24 DMRS REs per RB are used for transmission.

As described above, unlike the LTE system, the 5G wireless communication considers a system that operates in a higher frequency band as well as in a frequency band of 6 GHz or less. Since channel characteristics depend on the frequency band, the DMRS of the 5G system needs to be designed differently from that of the LTE. In addition, the 5G system considers importantly the support of low latency and high mobility. Therefore, various DMRS structures according to transmission environments are required.

For example, in order to support low latency, the channel estimation should be performed quickly. For this purpose, the DMRS needs to be transmitted at the fore part of the transmission time axis, and channel tracking that varies quickly in time should be allowed to support high mobility. Further, the DMRS needs to be transmitted at a high density on one transmission time axis. This density refers to the amount of resources (e.g., the number of REs) for transmission of the DMRS in an arbitrary transmission unit.

In addition, for example, a reference signal such as the CRS may not be supported in the 5G system. Normally, the CRS has a high reference signal density and guarantees channel estimation performance even in a low signal to interference plus noise ratio (SINR) region (e.g., −10 to 0 dB). When the CRS is not transmitted, only the DMRS may make it difficult to guarantee the channel estimation performance in the low SINR region.

Accordingly, the present disclosure proposes a method for constructing the structure of the DMRS variously depending on transmission environments.

In order to construct various DMRS structures, it is first necessary to set a position where the DMRS can be transmitted. In an embodiment of the present disclosure, when a transmittable DMRS position is set, the base station can determine and transmit a DMRS structure required for at the set position. Also, in an embodiment of the present disclosure, the terminal needs to know such a transmittable DMRS position.

Unlike the LTE system, the 5G wireless communication system may be configured in various frame structures and operated in a variable transmission time interval (TTI), so the position setting for the DMRS needs to be separately notified to the terminal. Also, in the 5G wireless communication system, the number of time-based OFDM symbols constituting a subframe and the number of frequency-based subcarriers may differ from those of the LTE system. In most drawings of the present disclosure, the number of time-based OFDM symbols constituting a subframe and the number of frequency-based subcarriers constituting a resource block are illustrated as being set to be equal to those of the LTE, but such numbers may be set differently. For example, as shown in FIGS. 1FAA, 1FAB, 1FBA and 1FBB, one resource block may be composed of twelve subcarriers or sixteen subcarriers on the frequency.

Specifically, setting the DMRS transmittable position may be performed for each of a time position and a frequency position, and may be performed for a combination of a time position and a frequency position.

First, two methods may be considered for a time position that allows the DMRS to be transmitted. The first method is to set the time position of the DMRS transmission, based on the subframe. This method is to consider that the position setting for transmission resources is normally performed in the subframe unit.

For example, when a time duration corresponding to one subframe is denoted by x, a method of setting the DMRS position in a unit of y (=x/2) may be considered. Specifically referring to FIGS. 1FAA to 1FBA, when the time duration x is set to 14 OFDM symbols, the DMRS position may be set in a unit of 7 (=y), and settable time positions of the DMRS in one subframe may be the 3rd, 6th, 9th, and 12th OFDM symbols.

The second method is to set the time position of the DMRS transmission, based on a start point of allocated data channel (e.g., PDSCH). This method is to consider that the 5G wireless communication system, unlike the LTE system, can variously set a data channel transmission interval in a subframe. For example, based on the start point of the data channel, settable time positions of the DMRS may be the 1st, 4th, 7th, and 10th OFDM symbols.

Next, a frequency position that allows the DMRS to be transmitted may be set to have a density considering a channel environment of the 5G communication system that covers various numerologies. Here, the numerology may refer to a subcarrier spacing (e.g., a frequency difference between subcarriers), and the length of the subcarrier spacing may be in inverse proportion to the length of the symbol on the time axis.

For example, the DMRS transmission position on the frequency may be set such that the DMRS is transmitted through at least two consecutive subcarriers. For example, FIGS. 1FA-4-1 and 1FA-4-2 in FIG. 1FAB show two frequency positions capable of transmitting the DMRS.

As mentioned above, the DMRS transmittable position may be set as a combination of the time position and the frequency position. Actually, for convenience, the DMRS setting may be based on a subset of available combinations. In addition, the transmitted DMRS structure may be implicitly determined according to the above-discussed DMRS transmittable time position and the number of transmitted DMRS layers.

Specifically, the DMRS structure proposed in FIGS. 1FAA and 1FAB will be described.

When the DMRS is set for only one OFDM symbol located at the fore part of the time axis in one subframe in order to support low latency as shown in FIGS. 1FA-2-1 and 1FA-2-2, the terminal can identify the DMRS structure according to the number of layers. For example, when the number of transmitted layers is four or less, the reference signal may be more densely allocated on the frequency as shown in FIG. 1FA-2-2. On the other hand, when the number of transmitted layers is greater than four, a reference signal having a low density may be allocated on the frequency as shown in FIG. 1FA-2-1. However, the reference signal set to have a low density as shown in FIG. 1FA-2-1 may be difficult to guarantee the channel estimation performance.

In another example, when the DMRS is set for two OFDM symbols on the time in one subframe as shown in FIGS. 1FA-3-1 and 1FA-3-2. As described above, when the number of transmitted layers is four or less, the reference signal may be allocated more densely on the frequency as shown in FIG. 1FA-3-2. In addition, when the number of transmitted layers is greater than four, a reference signal having a low density may be allocated on the frequency as shown in FIG. 1FA-3-1.

In still another example, for supplement in an environment of strong Doppler Effect (hereinafter, also referred to as high Doppler), the DMRS may be set for four OFDM symbols on the time axis in one subframe as shown in FIGS. 1FA-4-1 and 1FA-4-2. When the number of transmitted layers is four or less, the reference signal may be allocated as shown in FIG. 1FA-4-2. In this case, if the reference signal is allocated more densely on the frequency, the overhead of the reference signal may become too large. When the number of transmitted layers is greater than four, the reference signal may be allocated as shown in FIG. 1FA-4-1. However, in high-speed transmission, a probability that the number of transmission layers is greater than four is very low.

When the number of transmitted layers is four or more, it is possible to operate with orthogonal cover code (OCC) being 4. When the number of transmitted layers is two or less, it is possible to operate with OCC being 2. The above example may be similarly applied to other DMRS structures. In addition, the example of the DMRS structure illustrated in FIGS. 1FBA and 1FBB may be similarly applied to a case where the number of frequency-based subcarriers is sixteen in one resource block.

Next, proposed is a method of performing operations using the DMRS such as Doppler frequency measurement, phase noise compensation, and frequency offset correction. In the LTE system, the above operations can be performed using the CRS. However, in the 5G communication system where there is no signal such as the CRS transmitted at every subframe in full bands, it may be difficult to perform the above-mentioned operations such as Doppler frequency measurement, phase noise compensation, and frequency offset correction.

In order to perform such operations, a reference signal with a high density on the time is required. However, when the DMRS is set, for example, to only one previous OFDM symbol on the time so as to support low latency, it is impossible to perform the above operations by using only the DMRS. Thus, the base station may set the DMRS with a high time-based density in on-demand manner and thereby perform operations such as Doppler frequency measurement, phase noise compensation, and frequency offset correction. Specifically, in order to perform such operations, the base station performs dynamic signaling, and the terminal performs operations such as Doppler frequency measurement, phase noise compensation, and frequency offset correction by using the DMRS set through the dynamic signaling. For example, for signaling, the base station may add one bit to dynamic control information (DCI). Supporting a plurality of DMRS structures in the 1-1st embodiment may be distinctive as follows, compared with supporting one fixed DMRS structure in the LTE system. First, unlike the LTE, the number of DMRS resource elements (REs) allocated per antenna port may not be fixed. For example, although in the LTE system the number of DMRS REs allocated per antenna port is fixed to twelve, the number of DMRS REs allocated per antenna port may be varied depending on which of various DMRS structures is set.

In addition, the number of supported antenna ports may be varied depending on which DMRS structure is set. For example, in an environment where the overhead of the reference signal needs to be reduced, it is difficult to support a high rank. Therefore, in this case, it is necessary to minimize the overhead of the reference signal by supporting only the minimum antenna port. Hereinafter, detailed examples of various proposed DMRS structures will be described.

For the above-discussed reasons, the 1-1st embodiment of this disclosure proposes various DMRS structures according to transmission environments. FIG. 1D is a diagram illustrating one example of various DMRS structures. The structure of FIG. 1D allows the DMRS to be transmitted through all subcarriers included in one OFDM symbol. However, the DMRS position proposed in the present disclosure is not limited to that shown in FIG. 1D.

Specifically, as shown in FIG. 1D-1, the DMRS may be located in each of the third OFDM symbol and the eleventh OFDM symbol. For example, for time balance, the DMRS may be transmitted through each position of the third OFDM symbol and the eleventh OFDM symbol in one subframe as shown in FIG. 1D-1. However, when the 5G system has a basic structure of time-frequency domain different from that of the LTE/LTE-A system, the DMRS position may be varied.

As another example, in order to support low latency, the DMRS may be transmitted only through a position of the third OFDM symbol in one subframe as shown in FIG. 1D-2. In this case, the terminal can demodulate a received signal quickly because channel estimation is allowed in a state where signals are received up to the third OFDM symbol.

As still another example, in order to support high mobility, the DMRS may be transmitted through three positions of different OFDM symbols in one subframe as shown in FIG. 1D-3.

Meanwhile, the DMRS signal may be generated, based on the pseudo-random sequence similar to the downlink DMRS in the LTE, or based on the Zadoff-Chu (ZC) sequence similar to the uplink DMRS in the LTE. For example, when the uplink and the downlink have the same DMRS structure, equally applying the DMRS signal generation to the uplink and the downlink allows uplink/downlink DMRS ports to be orthogonally supported.

Additionally, in FIG. 1D, it is possible to support a plurality of DMRS ports by applying the orthogonal cover code (OCC) on the frequency. When the OCC is applied on the frequency, there is an advantage that a power imbalance problem that may occur when the OCC is applied on the time does not occur. An example of this is shown in FIG. 1E.

Figure 1E:
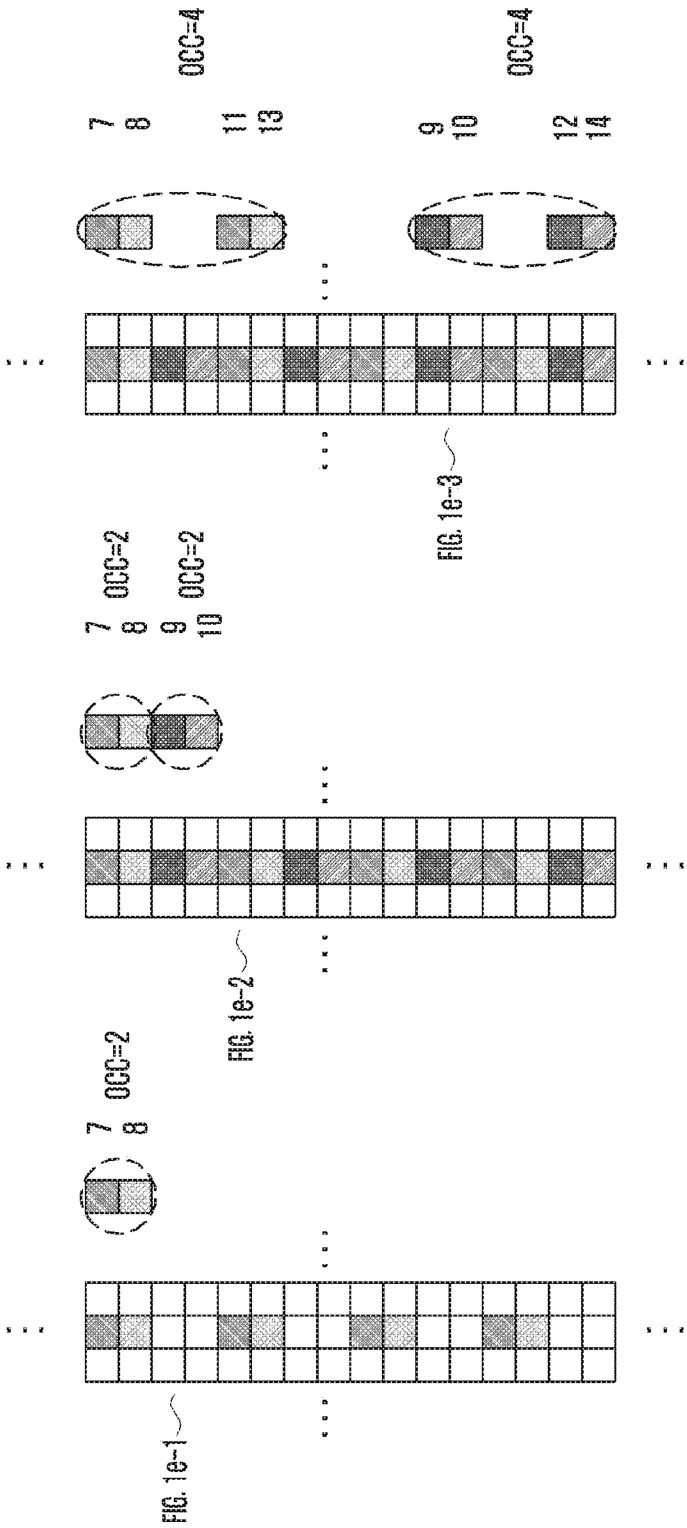
Figure 1F:
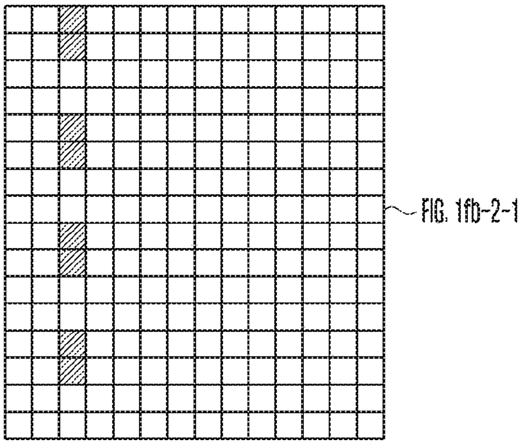
Figure 1F:
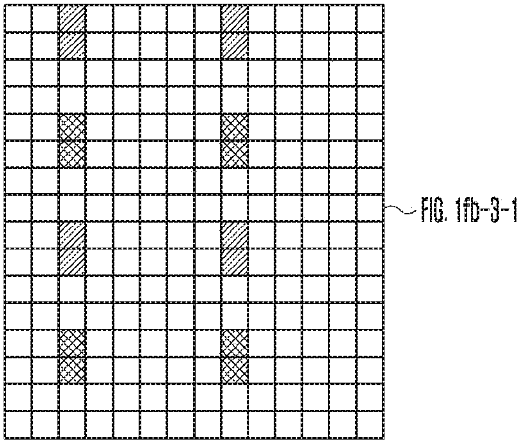
Figure 1F:
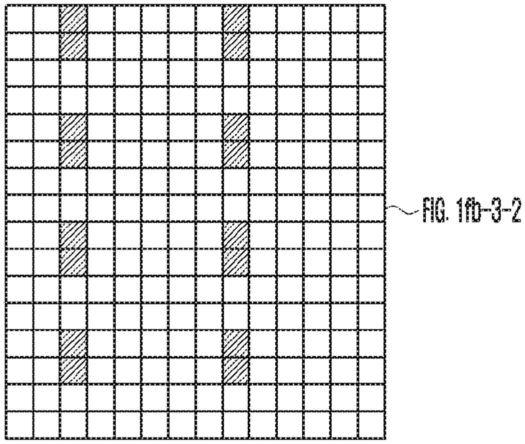
Figure 1F:
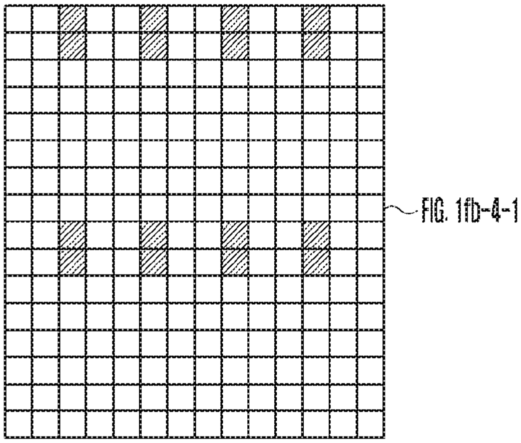

FIG. 1E shows an example in which the OCC is applied when there are sixteen frequency-based subcarriers in one resource block. In FIG. 1E, DMRS ports are numbered from the 7th port to the 14th port based on the LTE system, but this is only an example for explanation. The port number used in the 5G system may be different.

Specifically, FIG. 1E-1 shows an example of the OCC applied when two ports (port 7, port 8) are used to transmit the DMRS. As shown in FIG. 1E-1, the OCC having a length of 2 may be applied at positions where the ports 7 and 8 are indicated. Therefore, when the DMRS is transmitted using two ports as shown in FIG. 1E-1, the DMRS may not be transmitted for all resources included in one OFDM symbol.

Table 1-2 shows a sequence for the OCC. In Table 1-2, $\overline{w}_p(i)$ (i=0, 1, 2, 3) denotes a sequence value according to a sequence length. When the OCC size is 2, $\overline{w}_p(0)$ and $\overline{w}_p(1)$ are used. When the OCC size is 4, all of $\overline{w}_p(i)$ (i=0, 1, 2, 3) are used. As described above, Table 1-2 as well is numbered from the port 7 to the port 14 based on the LTE system, but this is only an example for explanation. The port number used in the 5G system may be different.

FIG. 1E-2 shows an example of the OCC applied when four ports 7, 8, 9 and 10 are transmitted. As shown in FIG. 1E-2, the OCC having a length of 2 may be applied at positions where the ports 7, 8, 9 and 10 are indicated. When four or more ports are transmitted as shown, the DMRS may be transmitted for all resources of the OFDM symbol. Next, FIG. 1E-3 shows an example of the OCC applied when eight ports are transmitted. When ports more than four ports are used as shown in FIG. 1E-3, the OCC length of 4 is used.

Although FIG. 1E shows examples of the OCC applied for cases where two, four, or eight ports are transmitted, the application of other number of ports smaller than eight can be easily extended from the examples of FIG. 1E. For example, in case where three ports are transmitted, only ports 7, 8 and 9 are transmitted as shown in FIG. 1E-1. Therefore, the ports 7 and 8 can be transmitted with the OCC of length 2 applied at the corresponding positions in FIG. 1E-1, but the OCC of length 2 is not applied to the port 9 because there is no other port at the corresponding position of FIG. 1E-1.

TABLE 1-2

| Antenna port p | [$\overline{w}_p(0)$ $\overline{w}_p(1)$ $\overline{w}_p(2)$ $\overline{w}_p(3)$] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Next, FIGS. 1FAA, 1FAB, 1FBA and 1FBB show second examples of various DMRS structures proposed. FIGS. 1FAA, 1FAB, 1FBA and 1FBB show structures modified from forms proposed in FIGS. 1D and 1E. Specifically, proposed is a structure capable of more efficient operation by considering the overhead of the reference signal than the method proposed in FIGS. 1D and 1E through the DMRS position configuration and antenna port mapping method on the frequency.

The DMRS signal may be generated based on the pseudo-random sequence similar to the downlink DMRS in the LTE, or may be generated based on the Zadoff-Chu (ZC) sequence similar to the uplink DMRS in the LTE. FIGS. 1FAA and 1FAB show a structure in case where the number of sub-carriers on the frequency constituting the resource block is 12, and FIGS. 1FBA and 1FBB show a structure in case where the number of subcarriers on the frequency constituting the resource block is 16.

First, FIGS. 1FAA and 1FAB are described. A method proposed in FIGS. 1FAA and 1FAB may use flexibly the DMRS position shown in FIG. 1F-1-1 according to transmission conditions. An OCC and antenna port mapping method may be as shown in FIGS. 1FA-1-2 and 1FA-1-3. In Table 1-2, $\overline{w}_p$ (i) (i=0, 1, 2, 3) denotes a sequence value according to a sequence length. When the OCC size is 2, $\overline{w}_p(0)$ and $\overline{w}_p(1)$ are used. When the OCC size is 4, all of $\overline{w}_p(i)$ (i=0, 1, 2, 3) are used. In FIGS. 1FA-1-2 and 1FA-1-3, the DMRS ports are numbered from the port 7 to the port 14 based on the LTE system, but this is only an example for explanation. The port number used in the 5G system may be different.

Referring to FIG. 1FA-1-2, the reference signal is not transmitted at a position denoted by a lattice pattern and may be transmitted only at a position denoted by a hatched pattern. In this case, two ports 7 and 8 may be transmitted with OCC=2 applied, and four ports 7, 8, 11 and 13 may be transmitted with OCC=4 applied. Contrary to this, when eight ports from port 7 to port 14 are transmitted, ports 7, 8, 11 and 13 may be transmitted with OCC=4 applied at positions denoted by a hatched pattern, and ports 9, 10, 12 and 14 may be transmitted with OCC=4 applied at positions denoted by a lattice pattern.

Referring to FIG. 1FA-1-3, two ports 7 and 8 can be transmitted with OCC=2 applied at positions denoted by a hatched pattern, and also four ports 7, 8, 11 and 13 may be transmitted with OCC=4 applied at positions denoted by a hatched pattern. FIG. 1FA-1-2 shows a method for minimizing the overhead of the reference signal in a good channel status, and FIG. 1FA-1-3 shows a method for improving the channel estimation performance by further using the reference signal in a poor channel status. Although the OCC is applied in the frequency domain in FIGS. 1FA-1-2 and 1FA-1-3, a method of applying the OCC is not limited thereto.

As described above, the method proposed in FIGS. 1FAA and 1FAB may use flexibly the DMRS position shown in FIG. 1F-1-1 according to transmission conditions. FIGS. 1FA-2-1, 1FA-2-2, 1FA-3-1, 1FA-3-2, 1FA-4-1, and 1FA-4-2 show examples of DMRS positions configurable according to transmission conditions. Related embodiments are as described above.

As described above, FIGS. 1FBA and 1FBB show the structure in case where the number of subcarriers constituting the resource block on the frequency is 16. A related operation method is the same as described in FIGS. 1FAA and 1FAB, and therefore a detailed description thereof will be omitted. The OCC and antenna port mapping method may be performed as shown in FIGS. 1FB-1-2 and 1FB-1-3, and a detailed operation is the same as in FIGS. 1FA-1-2 and 1FA-1-3. However, a method of applying the OCC in the present disclosure is not limited thereto.

The method proposed in FIGS. 1FBA and 1FBB may use flexibly the DMRS position shown in FIG. 1FB-1-1 depending on transmission conditions, and FIGS. 1FB-2-1, 1FB-3-1, 1FB-3-2, and 1FB-4-1 show examples of configurable DMRS positions.

Finally, FIG. 1G shows a third example of proposed various DMRS structures. FIG. 1G is a structure in which the DMRS has a form similar to that of the current LTE systems. Therefore, the OCC and antenna port mapping method applied in the DMRS of the LTE may be applied as it is. However, in the present disclosure, other DMRS structure may be considered depending on the channel environment in order to satisfy the next generation communication requirement. That is, the present disclosure proposes a method of constructing various DMRS structures in units of OFDM symbol according to the transmission environment by extending the existing DMRS structure of the LTE system.

FIG. 1G-1 shows DMRS positions that can be implemented in a normal channel status. FIG. 1G-2 shows a structure in which an additional DMRS is mapped on the time axis in order to support high mobility. FIGS. 1G-3-1 and 1G-3-2 show a method of reducing the DMRS density on the frequency axis in order to minimize the overhead of the reference signal in an environment with a small channel delay. Finally, in order to support low latency, DMRS structures as shown in FIGS. 1F-4-1 and 1F-4-2 may be used. When the position of the DMRS transmission is only in the front OFDM symbol as shown in FIG. 1G-4-1, only up to 4-layer transmission may be supported.

FIGS. 1D, 1FAA, 1FAB, 1FBA, 1FBB and 1G show various DMRS structures according to transmission environments. However, the DMRS structure in the present disclosure is not limited to the structures proposed in the 1-1st embodiment. Therefore, other DMRS structures different from those of FIGS. 1D, 1FAA, 1FAB, 1FBA, 1FBB and 1G may be applied to the 1-2nd and 1-3rd embodiments given below.

Although the 1-1st embodiment relates to the DMRS structure based on the downlink, the same DMRS structure may be set in the uplink in the 5G system. If the uplink and downlink have the same DMRS structure, the uplink and downlink DMRS ports are orthogonal. Thus, it may be possible to operate flexibly in an environment like time division duplex TDD).

1-1-1st Embodiment

The 1-1-1st embodiment proposes another method of setting the DMRS structure proposed in the above 1-1st embodiment. In the 1-1-1st embodiment, it is noted that the settable DMRS structures may be divided into a front-loaded DMRS and an extended/additional DMRS. First, the front-loaded DMRS may be defined by the following two criteria.

1. The Number of OFDM Symbols for Front-Loaded DMRS
   - Front-loaded DMRS is mapped over 1 or 2 adjacent OFDM symbol
   - Front-loaded DMRS is mapped on 1 OFDM symbol for low rank transmission.
   - Front-loaded DMRS is mapped on 2 adjacent OFDM symbols for high rank transmission.

2. The Location of Time for Front-Loaded DMRS

Opt. 1: The first symbol of front-loaded DM-RS is fixed regardless of the first symbol of NR-PDSCH.

Opt. 2: The first symbol of front-loaded DM-RS is no later than the first symbol of NR-PDSCH.

Specifically, the front-loaded DMRS may be configured in one or two adjacent OFDM symbols according to the number of transmission layers (ranks). Also, the front-loaded DMRS is located before the NR-PDSCH on the time axis, and its position may be fixed as described above, or the front-loaded RS may be located from the first symbol at which the NR-PDSCH starts.

The advantages and disadvantages of Opt. 1 and Opt. 2 are as follows. In case of Opt. 1, it may be assumed that the DMRS position is fixed and thus the DMRS of a neighboring cell is always transmitted at the same position. However, when a control channel region is set to be configurable, or in case of a subframe where a control channel is not transmitted, the DMRS of the data channel may not be located more ahead, incurring a decoding latency problem.

On the other hand, in case of Opt. 2, the front-loaded DMRS is always ahead of the data channel on the time axis, and thus there is an advantage in terms of a decoding latency issue. However, the position of the front-loaded DMRS is varied, that is, the DMRS position is not fixed, thereby causing a problem in inter-cell interference control and advanced receiver operation. It is therefore possible to consider further introducing network signaling. However, in general, a method of fixedly setting the DMRS position is advantageous for system operation.

Figure 1H:
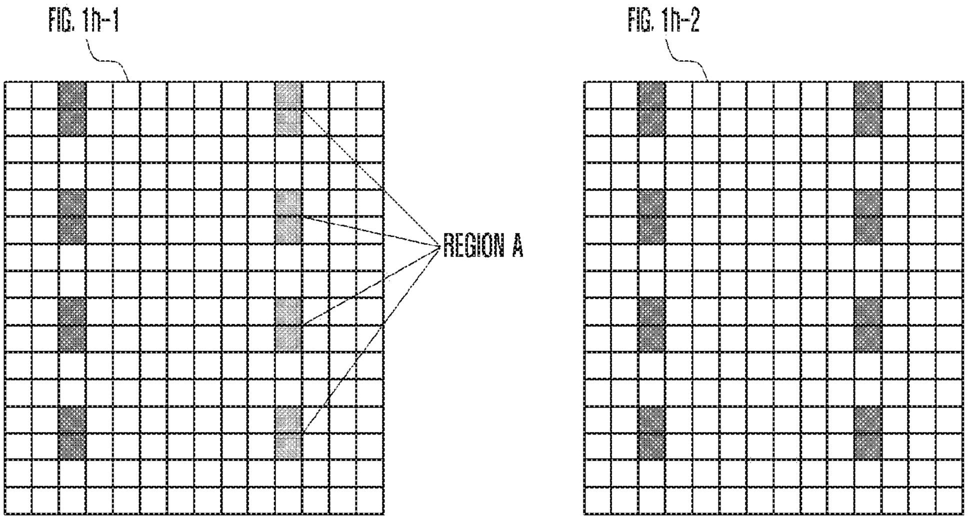
FIGS. 1HA and 1HB are diagrams illustrating examples of a method for supporting MU transmission orthogonally between terminals using different DMRS structures according to the 1-3rd embodiment of the present disclosure.
Figure 1H:
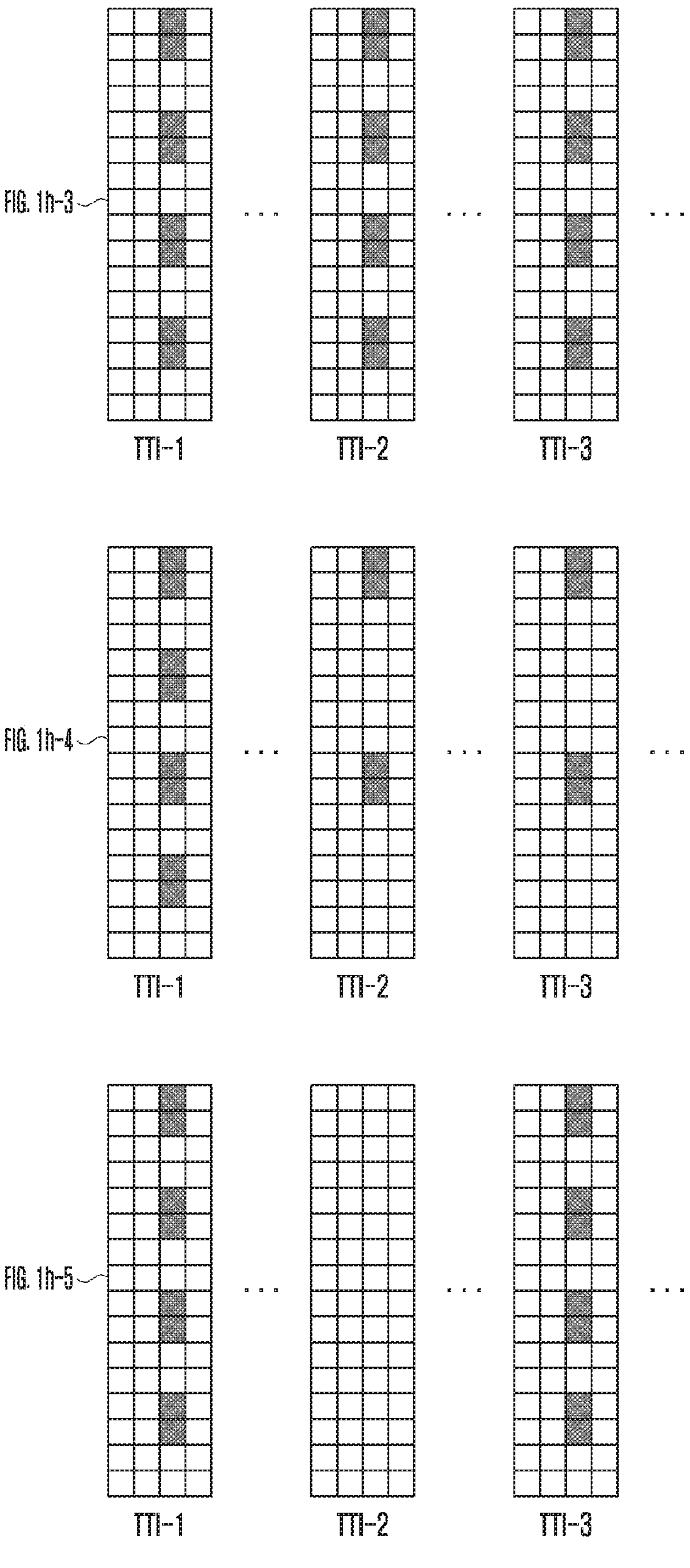

Therefore, for the above reasons, a detailed method of setting the front-load DMRS to a fixed position is proposed. FIG. 1K shows the position of the front-load DMRS in case where the slot length is 7 or 14 OFDM symbols. Here, setting the position of the front-load DMRS may be determined by a control channel region. For example, when the control channel region is composed of two OFDM symbols maximally, the front-load DMRS is located at the third OFDM symbol as shown in FIG. 1K-1. As another example, when the control channel region is composed of three OFDM symbols maximally, the front-load DMRS is located at the fourth OFDM symbol as shown in FIG. 1K-2.

When the position of the front-load DMRS is determined depending on the maximum size of the settable control channel region as described above, there may be a loss in reducing the decoding latency if some or all of the control channels are not set. Therefore, the present disclosure proposes another method of setting the position of the front-load DMRS by the extended method of Opt. 1.

For example, when the control channel region is composed of two OFDM symbols maximally, one setting of fixing the front-load DMRS to the third OFDM symbol as shown in FIG. 1K-1, and another setting of fixing the front-load DMRS to the first OFDM symbol as shown in FIG. 1K-3 may be used as one option. If these two settings are selectively used according to situations, the disadvantage of Option 1 may be compensated.

Specifically, setting the positions of a plurality of front-load DMRSs may be performed in various ways. For example, a semi-static setting method through upper layer signaling such as RRC may be considered. In addition, for example, a DMRS position may be set and transmitted via system information such as MIB or SIB. Also, for example, a method of dynamically setting the DMRS position through DCI may be considered. Alternatively, it is possible to set the position of the DMRS through semi-persistent scheduling (SPS).

Next, the extended/additional DMRS is explained. The front-loaded DMRS described above has difficulty in accurately estimating the channel since it is impossible to track the channel that changes rapidly in time in high-Doppler situation. In addition, it is impossible to perform a cross-correlation correction on the frequency offset only with the front-loaded DMRS. Therefore, for this reason, it is necessary to transmit additional DMRS later on the time axis than the transmission position of the front-loaded DMRS in one slot.

Figure 1I:
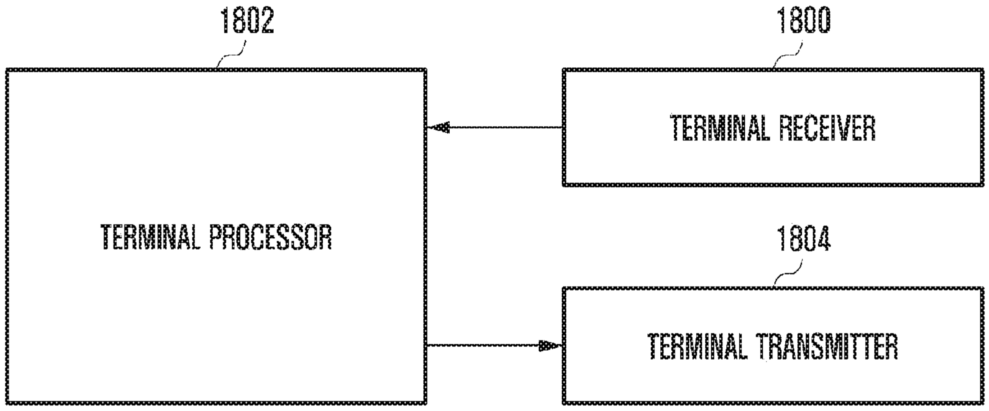
FIG. 1I is a block diagram illustrating an internal structure of a terminal according to an embodiment of the present disclosure.
Figure 1J:
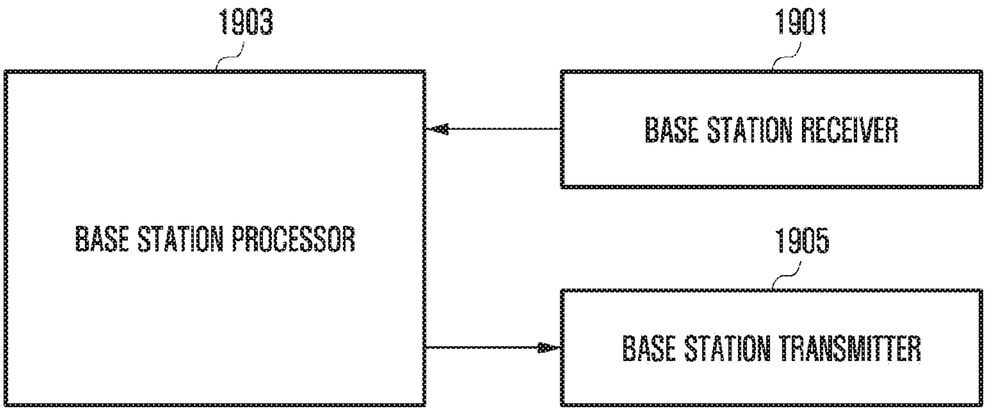
FIG. 1J is a block diagram illustrating an internal structure of a base station according to an embodiment of the present disclosure.
Figure 1K:
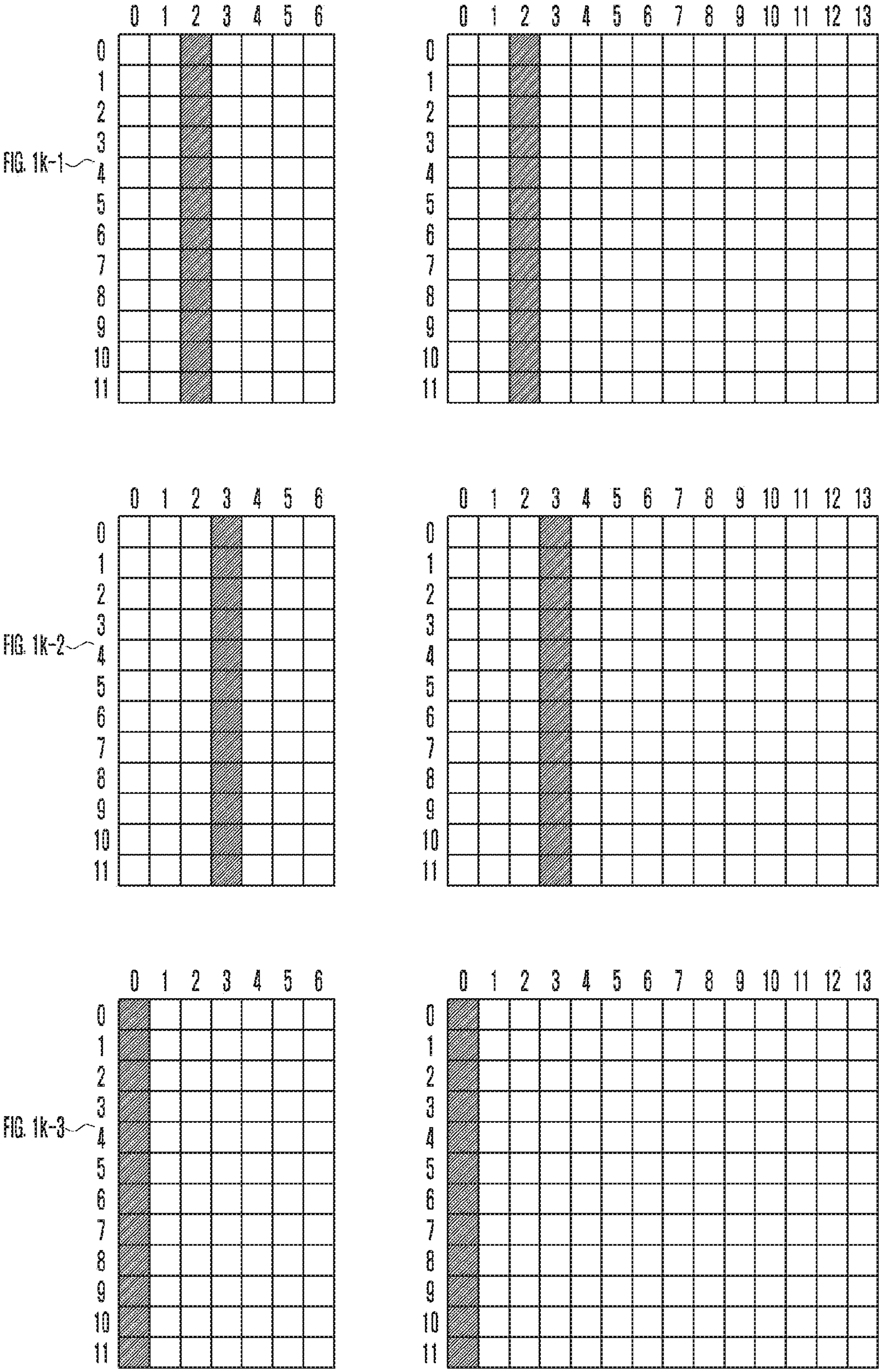
FIG. 1K is a diagram illustrating the position of a front-load DMRS in case where a slot length is 7 or 14 OFDM symbols.
Figure 1L:
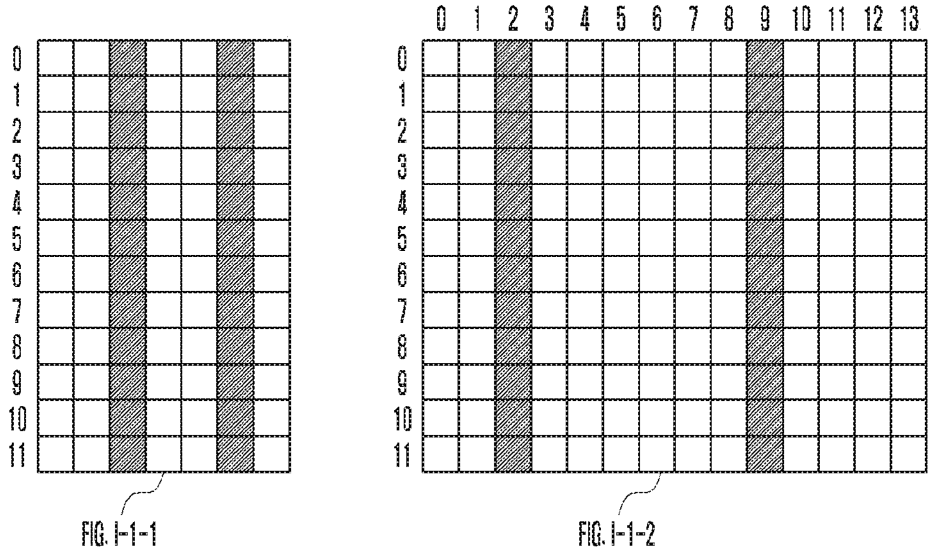
FIGS. 1LA, 1LB, 1LC, 1LD, 1LE, and 1LF are diagrams illustrating the transmission position of an extended/additional DMRS in case where a slot length is 7 or 14 OFDM symbols.
Figure 1L:
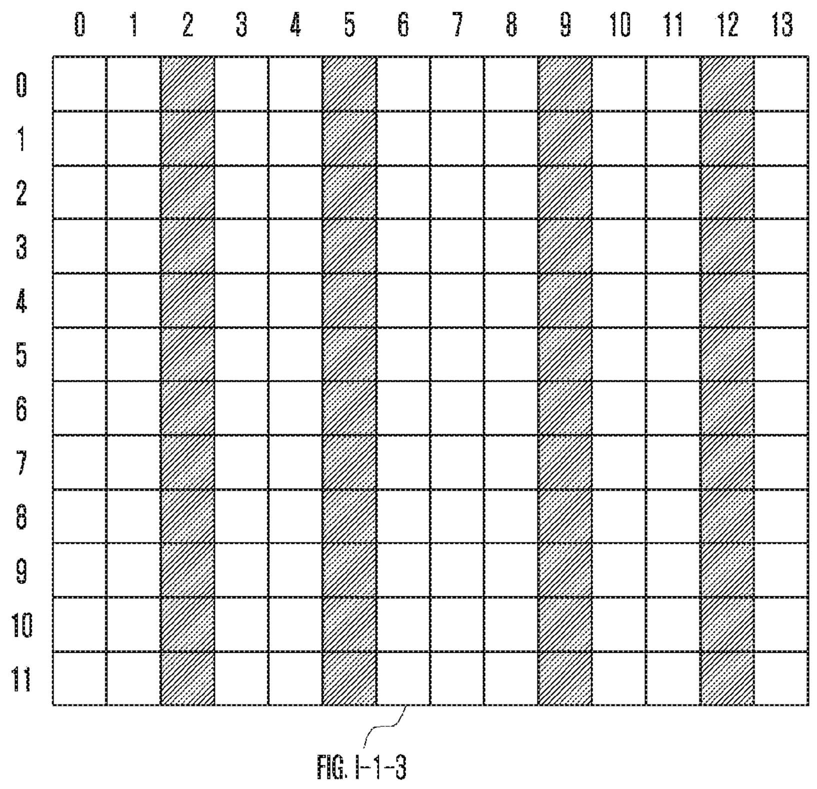
Figure 1L:
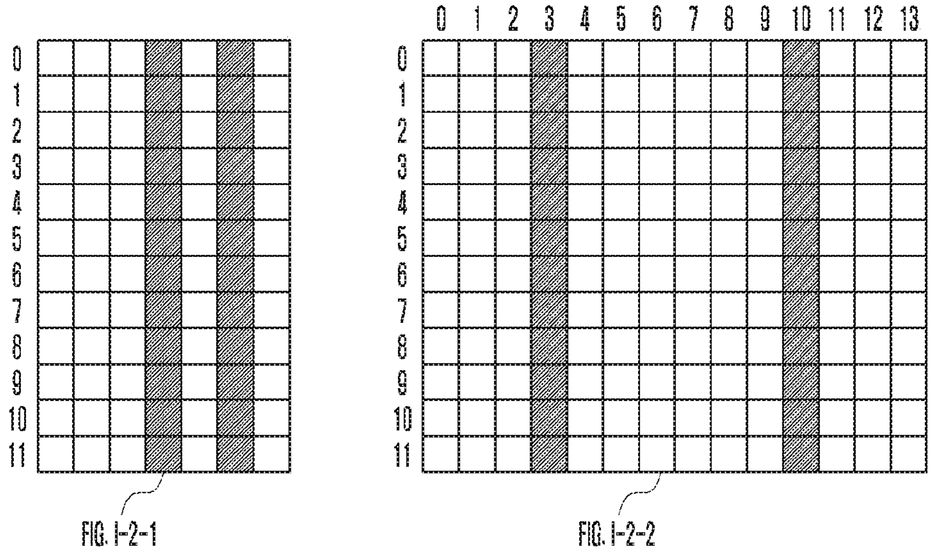
Figure 1L:
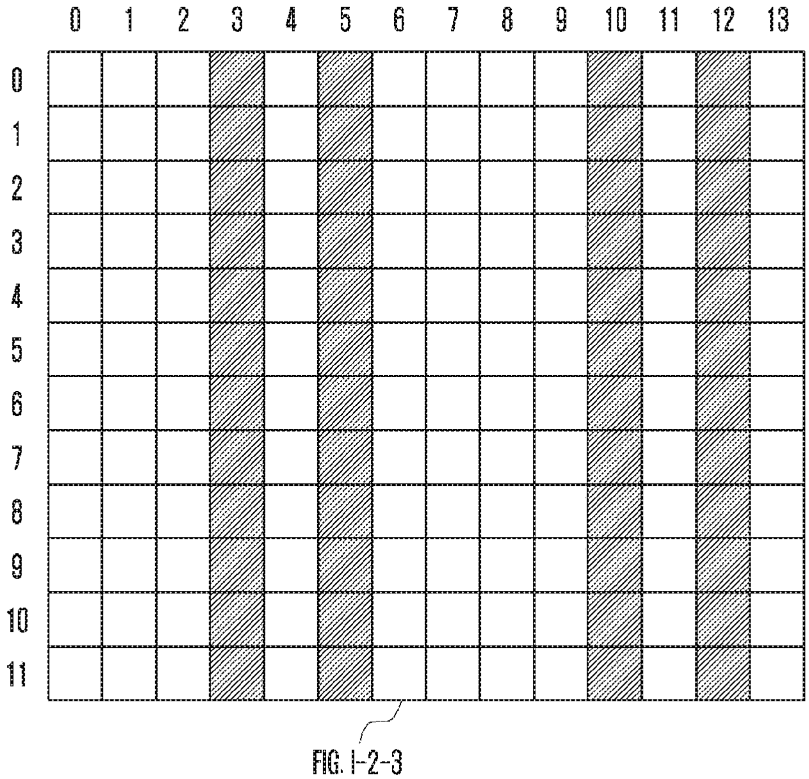
Figure 1L:
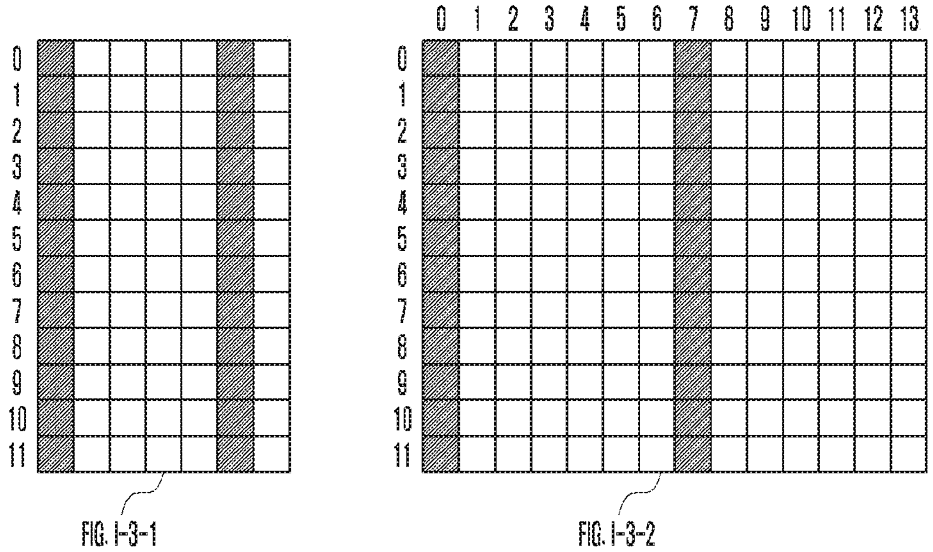
Figure 1L:
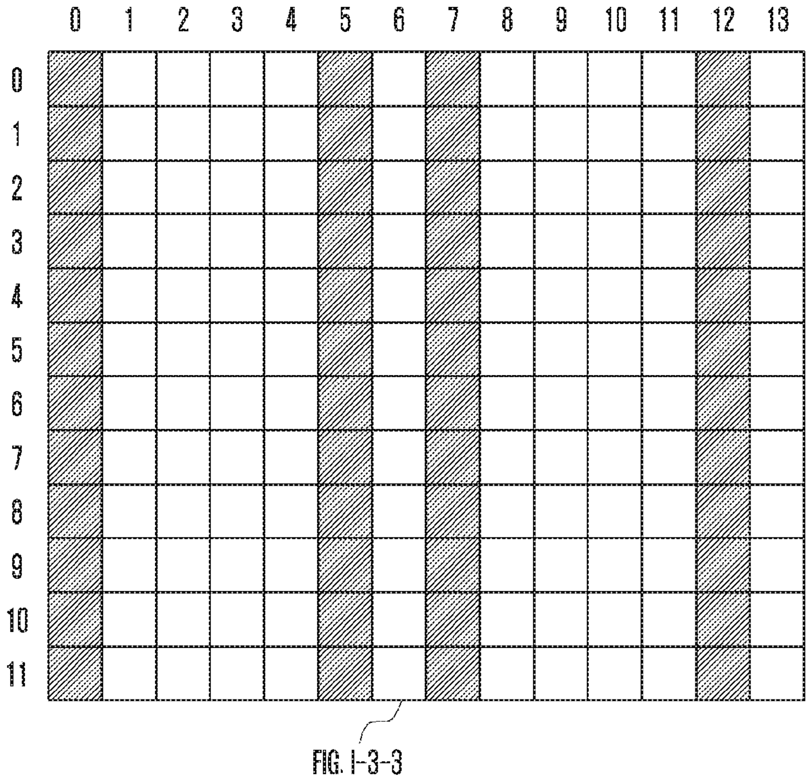

FIGS. 1LA to 1LF show the transmission positions of the extended/additional DMRS in case where the slot length is 7 or 14 OFDM symbols. FIGS. 1LA to 1LF show the extended/additional DMRSs with respect to FIGS. 1K-1, 1K-2 and 1K-3 where the positions of the front-loaded DMRS are set, respectively, as illustrated in FIG. 1K.

FIGS. 1LA and 1LB and FIGS. 1LC and 1LD illustrate an embodiment in which the extended/additional DMRS position is set by avoiding the CRS transmission position in the LTE system. This has an advantage of reducing the influence of interference in LTE-NR coexistence situations. However, in case of FIGS. 1LE and 1LF, the position of the front-loaded DMRS overlaps with the position of the CRS transmission position in the LTE system as in case of FIG. K-3.

As shown in FIGS. 1LA to 1LF, when the slot length is 7 OFDM symbols, the position of the extended/additional DMRS may be set to one. However, when the slot length is 14 OFDM symbols, the position of the extended/additional DMRS needs to be set to two, depending on the Doppler situation.

For example, referring to FIGS. 1LA and 1LB, the position of the extended/additional DMRS may be set as shown in FIG. L-1-2 in an environment where the channel changes rapidly, and the position of the extended/additional DMRS needs to be set as shown in FIG. L-1-3 in an environment where the channel changes very rapidly. In the above embodiment, FIG. 1K and FIGS. 1LA to LF show basic positions where the DMRS is set. If the DMRS transmission layer increases, the transmission position of the DMRS may be further set. This will be described in detail through DMRS port multiplexing in FIG. 1O below.

Additionally, in case of the extended/additional DMRS, the overhead issue of the DMRS may occur because multiple DMRSs are set on the time axis. In this case, it is possible to reduce the overhead of the DMRS by setting the DMRS to have a low density on the frequency axis. Through a unit DMRS structure to be proposed below, the above-described front-load DMRS and extended/additional DMRS may be operated more flexibly.

Specifically, the DMRS structure proposed by the present disclosure will be described with reference to FIG. 1M. In the present disclosure, a unit DMRS structure based on one OFDM symbol is proposed. Such a unit DMRS structure is advantageous to setting the position of the reference signal with respect to various transmission time intervals (TTIs), to supporting the low latency, and to setting the position of the reference signal for ultra-reliable low latency communication (URLLC), and may also be advantageous in terms of scalability such as antenna port expansion.

Figure 1M:
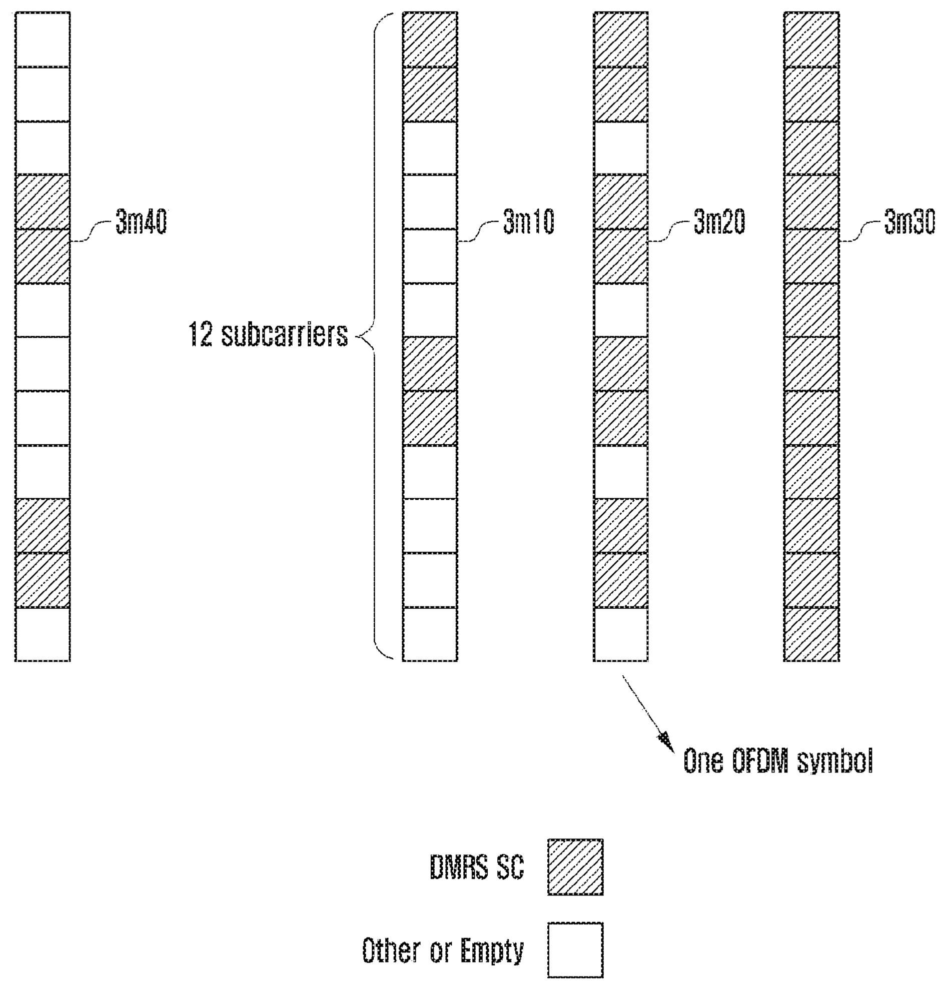
FIG. 1M is a diagram illustrating a DMRS structure according to an embodiment of the present disclosure.

As shown in FIG. 1M, twelve subcarriers may be included in one OFDM symbol on the basis of PRB which is the minimum transmission unit of data. As indicated by reference numerals 3*m*10, 3*m*20, and 3*m*30, the density of the DMRS subcarrier (SC) in one OFDM symbol is variable (configurable). The reference numerals 3*m*10 and 3*m*20 indicate the DMRS structures when there are four and eight DMRS SCs in twelve subcarriers, respectively. The reference numeral 3*m*30 indicates the DMRS structure when the DMRS SCs are composed of all twelve subcarriers.

In case of reference numerals 3*m*10 and 3*m*20, the use of an even number of DMRS SCs may be advantageous in that no orphan RE occurs when space frequency block coding (SFBC) is considered as a transmit diversity scheme. For example, if the SFBC is transmitted via two antenna ports, and if the RE for the DMRS transmission on the frequency does not exist in a multiple of two, it is possible to solve a problem that one RE (orphan RE) is not be used.

In case of reference numerals 3*m*10 and 3*m*20, SCs not used as the DMRS SC may be mapped to data or other reference signal or may be empty for DMRS power boosting. Here, a method of emptying the SC not used as the DMRS SC for the DMRS power boosting may be used for improving the performance of DMRS channel estimation in a low signal to noise ratio (SNR) region. The DMRS structure of FIG. 1M may be used not only for data channels but also for other channels (e.g., control channels).

In case of reference numerals 3*m*10 and 3*m*20, some of the subcarriers not used for DMRS transmission may be used as direct current (DC) subcarriers. However, in case of reference numeral 3*m*30, since the DMRS is transmitted in all the subcarriers, it is necessary to empty some of subcarriers in order to transmit the DC.

In addition, the DMRS structure of reference numeral 3*m*10 may be replaced with the structure of reference numeral 3*m*40 in consideration of the DC subcarrier. The DMRS SC indicated by reference numerals 3*m*10 to 3*m*40 may be generated based on the pseudo-random (PN) sequence or generated based on the Zadoff-Chu (ZC) sequence. The DMRS structures indicated by reference numerals 3*m*10 (or 3*m*40) and 3*m*20, which examples of a more detailed utilization method, may be used in the CP-OFDM system.

In addition, such structures may be used by being set to the same time-frequency position in the uplink and downlink. If the uplink and downlink have the same DMRS structure, the DMRS ports of the uplink and downlink are orthogonal. Thus, this allows better channel estimation in environments such as TDD, thereby improving interference removal performance.

On the contrary, the DMRS structure of reference numeral 3*m*30 is based on the Zadoff-Chu (ZC) sequence as similar to that of LTE and may be used in the DFT-s-OFDM system on the uplink. This enables operation for low peak-to-average power ratio (PAPR) as similar to case of LTE. However, the present disclosure is not limited to the DMRS structure utilization methods of reference numerals 3*m*10 to 3*m*40 described above. For example, the DMRS structure of reference numeral 3*m*30 may be used for both CP-OFDM and DFT-s-OFDM and for both uplink and downlink.

Figure 1N:
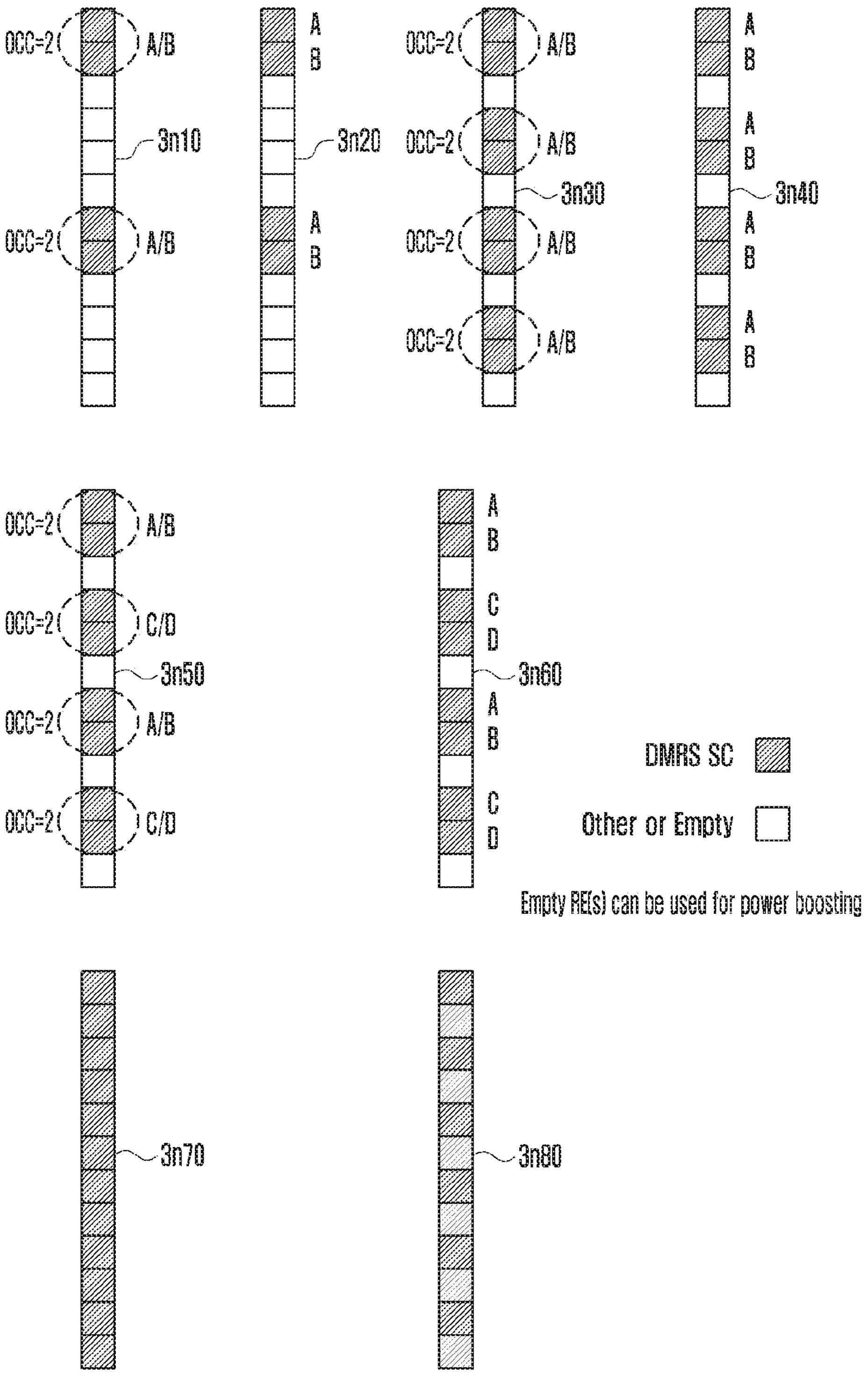
FIG. 1N is a diagram illustrating a method for mapping antenna ports to the unit DMRS structure proposed in FIG. 1M.
Figure 10:
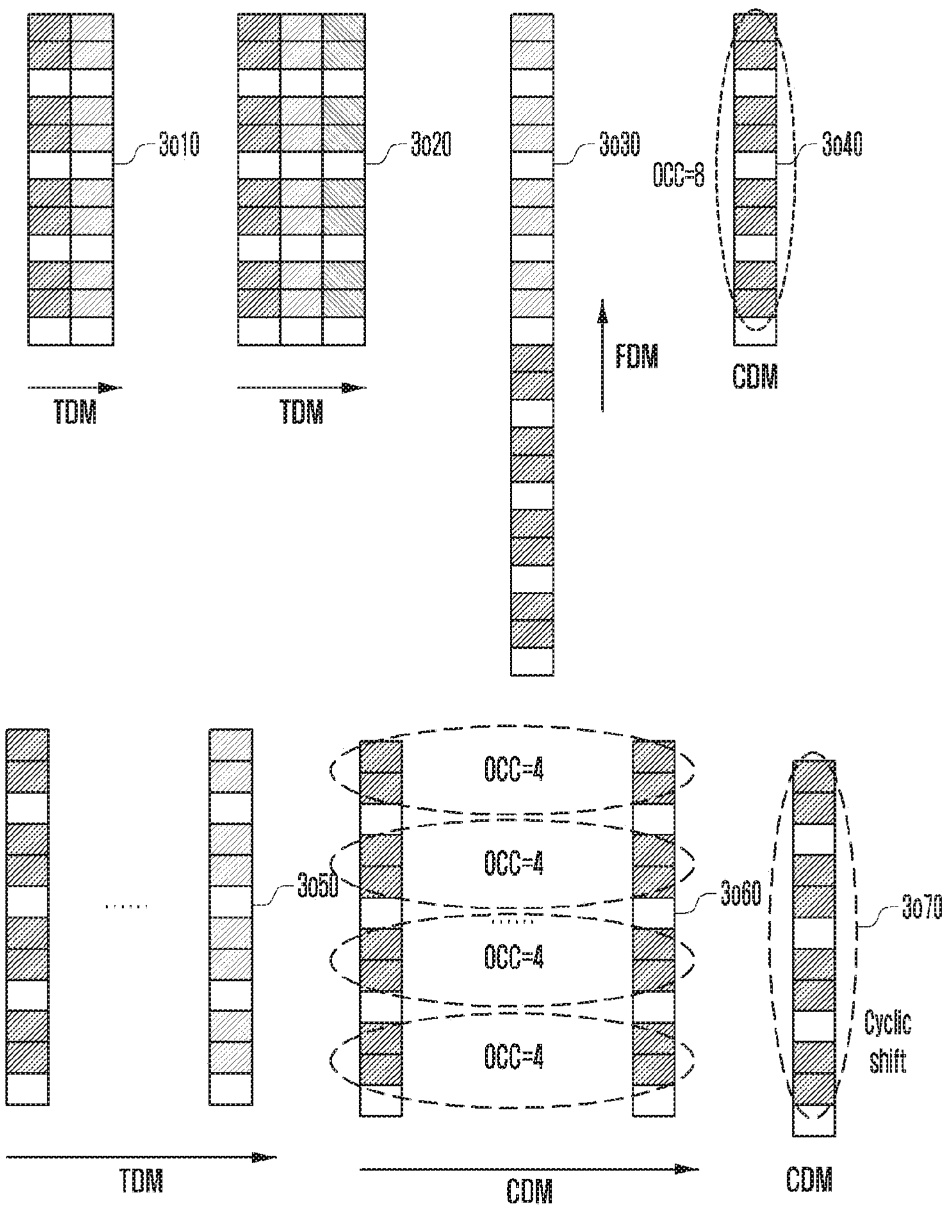

FIG. 1N shows a method of mapping an antenna port to the unit DMRS structure proposed in FIG. 1M. In FIG. 1N, the antenna ports (p) are represented by A, B, C, and D. However, the antenna ports may be represented by numbers or other letters. The mapping of the antenna port is to support the transmission and rank of multiple layers. Therefore, the antenna port mapping may be replaced with other term a layer transmission or rank support.

Specifically, reference numerals 3*n*10 and 3*n*20 indicate cases where two antenna ports are mapped to the DMRS structure of reference numeral 3*m*10. Reference numeral 3*n*10 shows a method of mapping two antenna ports (p) A and B in frequency division multiplexing (FDM)/code division multiplexing (CDM) by applying an orthogonal cover code (OCC) of length 2. In addition, reference numeral 3*n*20 shows a method of mapping the antenna ports (p) A and B in the FDM scheme without applying the OCC. As will be described later, similarly to 3*n*20, reference numerals 3*n*40 and 3*n*60 show examples of mapping the antenna ports in the FDD scheme without applying the OCC.

Next, reference numerals 3*n*30 and 3*n*40 indicate cases where two antenna ports are mapped to the DMRS structure of reference numeral 3*m*20. The DMRS of reference numeral 3*m*20 may improve the channel estimation performance by increasing the density of the reference signal, as compared with reference numeral 3*m*10. Reference numeral 3*n*30 shows a method of mapping two antenna ports (p) A and B in the FDM/CDM by applying the OCC of length 2, and reference numeral 3*n*40 shows a method of mapping such antenna ports A and B in the FDM scheme without applying the OCC.

Next, reference numerals 3*n*50 and 3*n*60 indicate cases where four antenna ports are mapped to the DMRS structure of reference numeral 3*m*20. In particular, if four antenna ports are supported, the subcarrier not used for DMRS transmission in the DMRS structure of reference numeral 3*m*20 may be empty and used for the DMRS power boosting in order to improve the channel estimation performance. Reference numeral 3*n*50 shows a method of mapping four antenna ports (p) A, B, C and D in the FDM/CDM by applying the OCC of length 2, and reference numeral 3*n*60 shows a method of mapping such antenna ports A, B, C and D in the FDM scheme without applying the OCC.

In case of reference numerals 3*n*10, 3*n*30, and 3*n*50, applying the OCC on the frequency axis has an advantage that a power imbalance problem does not occur. In case of the LTE system, applying the OCC on the time axis incurs a power imbalance problem, and there is a restriction that the OCC is differently applied in each of two PRBs.

Finally, reference numeral 3*n*70 shows the DMRS structure of reference numeral 3*m*30. Since all twelve subcarriers are used as the DMRS in case of reference numeral 3*m*30, a method of supporting orthogonal DMRS antenna ports by using the Zadoff-Chu may be considered. In this case, assuming that the subcarrier spacing is 15 kHz as in the LTE, up to eight orthogonal antenna ports may be supported by applying eight cyclic shift (CS) fields. Another method of utilizing the DMRS structure of 3*m*30 is to support four orthogonal antenna ports in FDM with four-subcarrier spacing.

The present disclosure is not limited to methods of mapping the antenna port to the DMRS structure proposed by reference numerals 3*n*10 to 3*n*70. For example, in case of reference numeral 3*m*30, FDM is applied to the DMRS SC as shown in reference numeral 3*n*80 and up to eight orthogonal antenna ports may be support by applying four cyclic shift fields. The operating method as shown in 3*n*80 uses all subcarriers in one OFDM symbol in case of supporting a high rank, but has, in an environment using a low rank, an advantage that only some subcarriers in one OFDM symbol is used as a reference signal and the other may be used for data transmission. For example, in case of transmission of rank 4 or less in 3*n*80, orthogonality may be supported by four CSs using only the reference signals of odd subcarriers, and the remaining six even subcarriers may be used for data transmission.

In FIG. 1O, a method of mapping a larger number of antenna ports to the proposed unit DMRS structure than in FIG. 1M. In order to map a larger number of antenna ports than in FIG. 1N, the TDM, FDM and CDM may be further applied to the unit DMRS structure.

First, reference numeral 3o10 shows that TDM is applied to reference numeral 3m20 to allow mapping eight antenna ports maximally. Reference numeral 3o20 shows the extension to mapping of sixteen antenna ports by using TDM of three OFDM symbols on time. In case of extending the orthogonal antenna ports by using TDM, the RS density on the frequency is maintained, but the density of the DMRS is increased in the transmission unit. In order to maintain a low density of the DMRS in the transmission unit, it is considered that the higher rank is supported in an environment that the channel condition is very good and the channel selectivity of the channel on the frequency is low. Thus, a method of extending the orthogonal antenna port by using FDM or CDM may be considered.

Reference numeral 3o30 shows a method of mapping up to eight antenna ports by applying FDM to reference numeral 3m20 on the frequency. Also, as shown in reference numeral 3o40, it is possible to map up to eight antenna ports by applying an OCC length of 8 to reference numeral 3m20.

Next, when all the subcarriers are composed of DMRS SC as shown in 3m30, various antenna port extensions are possible according to the antenna port mapping method applied to 3m30 as described above. If the ZC sequence is made CS by assuming the subcarrier spacing of 15 kHz in 3n30 and thereby eight orthogonal antenna ports are supported, the extension to sixteen orthogonal antenna ports is possible by applying TDM as shown in 3o10.

If FDM is used with four-subcarrier spacing in 3m30, up to four orthogonal antenna ports may be supported. However, further considering FDM as in 3o30, FDM is used with eight-subcarrier spacing and thereby up to eight orthogonal antenna ports may be supported.

The present disclosure is not limited to the antenna port extending method shown in FIG. 1O. Any combination of TDM, FDM and CDM may be applied, and it is possible to extend orthogonal antenna ports in various ways. For example, when the number of antenna ports is extended by using only TDM in case of 3o10 or 3o20 as described above, there is a disadvantage that the density of the DMRS increases in the transmission unit. To overcome this, TDM may be applied to two consecutive slots as shown in 3o50, or CDM with an OCC length of 4 may be applied to two consecutive slots as shown in 3o60.

In cases of 3o50 and 3o60, the description has been made based on two slots. However, the time unit in which TDM or CDM is applied is not limited to a slot. Also, unlike the method of mapping up to 8 antenna ports by applying the OCC length 8 as in 3o40, if the DMRS is generated with the ZC sequence, it is possible to support additional antenna ports by using CS as shown in 3o70. In case of using CS instead of OCC as shown in 3o70, there is an advantage that the RS density on the frequency is maintained.

1-2nd Embodiment

The 1-2nd embodiment relates to a method of setting a DMRS structure suitable for a transmission environment among a plurality of DMRS structures. When various DMRS structures are supported as in the 1-1st embodiment of the present disclosure, and when a DMRS structure suitable for a transmission environment is settable as in the 1-2nd embodiment, the base station can optimize the overhead of the reference signal by differently setting the DMRS structure according to the transmission environment.

Specifically, it is necessary to improve the channel estimation performance by setting the DMRS structure with a high overhead of a reference signal in a low SNR or high-speed transmission environment. On the other hand, in a high SNR or low-speed transmission environment, it is necessary to improve the transmission efficiency by setting the DMRS structure with a low overhead of a reference signal. As such, by transmitting the reference signal adaptively to the transmission environment, an unnecessary overhead of the reference signal may be minimized and thereby the system performance may be maximized.

Hereinafter, a method for the base station to set the DMRS structure suitable for the transmission environment is described in detail. The DMRS structure suitable for the transmission environment proposed in the present disclosure may be set semi-statically or dynamically by the base station. Alternatively, the DMRS structure suitable for the transmission environment may be set implicitly.

First, a method of semi-statically setting the DMRS structure suitable for the transmission environment is described. The simplest method of semi-statically setting the DMRS structure is to set the DMRS structure through higher layer signaling.

Specifically, by setting DMRS-StructureId in the RRC as shown in Table 1-3 below, information on different DMRS structures may be signaled. In Table 1-3, maxDMRS-Structure denotes the number of settable DMRS structures, and each set value may indicate different DMRS structures. As such, the DMRS structure may be set semi-statically via the RRC, and the terminal according to an embodiment of the present disclosure may know the currently transmitted DMRS structure based on the value set in the RRC.

TABLE 1-3

```
-- ASN1START
-- ASN1START
DMRS-StructureId ::=        INTEGER (0..maxDMRS-Structure)
-- ASN1STOP
```

For example, referring to the 1-1-1st embodiment, the DMRS structure may be divided into two structures, i.e., the front-loaded DMRS and the extended/additional DMRS. In this case, the value of maxDMRS-Structure in Table 1-3 may be set to 1. For example, it may be set that if the value of maxDMRS-Structure is 0, it indicates the front-loaded DMRS, and if the value of maxDMRS-Structure is 1, it indicates the extended/additional DMRS. In Table 1-3, DMRS-sturctureID may be changed to DMRS-configureID or other term.

In another example, when the structure of the extended/additional DMRS is more than one, the value of maxDMRS-Structure may be increased more than 1. In addition, when the DMRS density on the frequency is adjusted in the Unit DMRS structure as described in the 1-1-1st embodiment, the maxDMRS-Structure value may be set to a greater value.

In still another example, the DMRS density on the time/frequency may be set through additional configuration, separately from setting the front-loaded DMRS and the extended/additional DMRS. Specifically, it may be set as shown in Table 1-4.

TABLE 1-4

```
-- ASN1START
DMRS-StructureId ::=
INTEGER (0..maxDMRS-Structure)
DMRS-timeDensityId ::=
INTEGER (0..maxDMRS-Time)
```

TABLE 1-4-continued

```
DMRS-frequencyDensityId ::=
INTEGER (0..maxDMRS-Freqeuncy)
-- ASN1STOP
```

As another example, a method of dynamically setting a DMRS structure suitable for a transmission environment by the base station will be described. If information about the DMRS is set in the MAC CE in a manner similar to the method of setting the DMRS information in the RRC, it is possible to set information about the DMRS structure more dynamically.

As another example, the simplest method of dynamically setting the DMRS structure is to insert information about the DMRS structure in the DCI to be transmitted. In this case, a DCI format in which a field for dynamically operating the DMRS structure is not applied for the basic operation may be defined separately. If the DMRS structure is set using the DCI, the DMRS structure can be changed dynamically, which is advantageous in improving the transmission efficiency. On the other hand, there is a disadvantage that DCI overhead occurs to operate it.

Hereinafter, a method of setting the DMRS structure by using the DCI will be described in detail. As various reference signal structures are supported, the number of bits required for signaling various reference signal structures may increase in the DCI. In general, as shown in Table 1-5 or Table 1-6, information about the DMRS structure may be included in the DCI field by using one or two bits. For example, Table 1-5 shows an example of operating two types of reference signal structure by using one bit.

TABLE 1-5

| Indication | RS density | Use case |
|---|---|---|
| '0' | Low density | Low latency/Low Doppler/ Low delay/High SINR |
| '1' | High density | High Doppler/High delay/ Low SINR |

In addition, Table 1-6 shows an example of operating four types of reference signal structure by using two bits. In Table 1-6, the low density2 field may be set, if necessary, as a field indicating no transmission of the DMRS. A related utilization will be described in the 1-3rd embodiment. As described in the 1-1st embodiment, the DMRS structure may be determined by a combination of the signaling of Table 1-5 or Table 1-6 and the number of DMRS transmission layers used.

TABLE 1-6

| Indication | RS density | Use case |
|---|---|---|
| '00' | Low density1 | Low latency/Low Doppler |
| '01' | Low density2 | Low delay/High SINR[Other option: No RS configuration] |
| '10' | Medium density | Medium SINR |
| '11' | High density | High Doppler/High delay/Low SINR |

As the method of inserting information about the DMRS structure in the DCI to be transmitted, it is possible to specifically signal a time position where the DMRS can be transmitted as described in the 1-1st embodiment, unlike a method of signaling the RS density by using Table 1-5 or Table 1-6.

In the 1-1st embodiment, proposed for setting a position on time where the DMRS can be transmitted are methods of setting the DMRS transmittable time position on the basis of subframe and on the basis of a start point of allocated data channel (e.g., PDSCH). In such cases, it is possible to signal information about the DMRS transmittable time position in the DCI.

For example, in the method of setting the DMRS transmittable time position on the basis of subframe, the position of the DMRS may be set in units of y=x/2 when a value representing a subframe duration is defined as x. In this case, it is possible to indicate whether the DMRS density is high or low in y units using only 1 or 2 bits.

Specifically, a lower DMRS density on the time axis may be a DMRS composed of one OFDM symbol, and a higher DMRS density on the time axis may be a DMRS composed of two OFDM symbols. Also, the DMRS structure may be determined by a combination of this and the number of DMRS transmission layers used. The details are as described in the 1-1st embodiment.

On the other hand, inserting a field indicating the DMRS structure in the DCI at the time of each transmission may be inefficient. Therefore, a method of transmitting the field indicating the DMRS structure through the DCI based on a predetermined time interval may be considered. However, in this case, since the structure of the reference signal can be changed only when the field indicating the DMRS structure is transmitted, more dynamic operation of the DMRS structure may be difficult as compared with the method of indicating the DMRS structure at each transmission.

Finally, another method of implicitly setting the DMRS structure suitable for a transmission environment at the base station will be described. A first method is to set different DMRS structures according to the transmission mode (TM).

Specifically, TM A may be set as a reference signal having a high density, TM B may be set as a reference signal having an average density on the time axis, and TM C may be set as a reference signal having a low density on the time axis. In this case, TM A may be set as TM for supporting high mobility and TM C may be set as TM for supporting low latency.

Alternatively, it is possible to define two DCI formats in one TM. One of the two formats may be set as a structure of a reference signal for transmitting the characteristics of the TM, and the other may be set as a reference signal having a high density by operation in a fallback mode similar to the DCI format 1A in the LTE. In this case, from the currently set TM mode or DCI format information, the terminal can determine which DMRS structure is applied.

A second method is to vary the structure of the reference signal to be applied according to the modulation and coding scheme (MCS). Specifically, a reference signal having a high density may be mapped to improve channel estimation performance in a region where a low MCS is set, and a reference signal having a low density may be mapped in a region where a high MCS is set. In this case, from the received MCS information, the terminal can implicitly know the structure of the reference signal transmitted.

A third method is to set different DMRS structures according to a frame structure. Specifically, the self-contained frame structure, the DMRS is set to one OFDM symbol at the fore part on time as in FIG. 1FA-2-1 or 1FA-2-2, and in a general frame structure, the DMRS may be set to two OFDM symbols on time as in FIG. 1FA-3-1 or 1FA-3-2.

As another setting method, in case of identifying the PDCCH in the common search space based on the LTE system, the structure of the reference signal for the PDSCH connected thereto may be mapped to have a high density. Similarly, in case of identifying the PDCCH in the UE-specific search space, the reference signal for the PDSCH connected thereto may be mapped to a reference signal having a low density as compared with the PDCCH connected to the common search space. This is to improve the channel estimation performance because the common search space contains important information that all terminals should see. In this case, the terminal can implicitly recognize the structure of the reference signal from the search space.

1-3rd Embodiment

When various DMRS structures are supported unlike the existing LTE system, the 1-3rd embodiment proposes a method of supporting transmission between terminals (multiple-user (MU)) using different DMRS structures while maintaining orthogonality of such DMRSs. Even in the 5G system, terminals performing MU transmission are required to use the structure of a specific reference signal to prevent the above problem. In this case, flexibility of MU transmission may be limited. Therefore, two methods are proposed to maintain the orthogonality between MU terminals when MU transmission is performed between terminals using different DMRS structures.

A first method is to perform rate matching on overlap parts in order to maintain orthogonality when different DMRS structures are overlapped. This method will be described in detail with reference to FIG. 1H. FIGS. 1H-1 and 1H-2 show a method in which the base station performs rate matching with respect to a region A in FIG. 1H-1 when the terminals using different DMRS structures perform MU transmission.

This method has a drawback that the base station should additionally signal information about rate matching to the terminal. The number of bits required for signaling may differ depending on the number of supported DMRS structures. Basically, when several DMRS structures are supported, the number of signaling bits needed to inform the DMRS structures of the other MU terminals is increased. However, when the DMRS structures are simplified to two or four types as described in Table 1-4 and Table 1-5 in the 1-2nd embodiment, signaling of one or two bits is sufficient to inform the terminal about the DMRS structures of the other MU terminals. In addition, there is an advantage of being able to perform power boosting on the reference signal by considering rate matching of other terminal in a reference signal region where different DMRS structures are overlapped. However, contrary to the LTE system, this method causes no transparent MU operation to the terminals.

A second method is to insert an additional reference signal in a reference signal region where the DMRS structures are overlapped, in order to maintain orthogonality. That is, the second method is to set and transmit the same DMRS structure.

Referring to FIG. 1H, when the terminals using different DMRS structures as shown in FIGS. 1H-1 and 1H-2 perform MU transmission, the base station inserts the reference signal in a region A of FIG. 1H-1. This means that the base station using the DMRS structure of FIG. 1H-1 performs transmission by using the DMRS structure of FIG. 1H-2. Contrary to the first method, this method has an advantage of requiring no additional signaling to the terminal using FIG. 1H-1.

On the other hand, it may be varied depending on implementation that the terminal will or will not additionally use the reference signal included in the region A based on FIG. 1H-1. If the terminal using FIG. 1H-1 is a terminal requiring low latency, the reference signal for the region A may not be used for fast signal processing. However, in this case, additional signaling may be needed to indicate this. For example, the base station transmits information about the ACK/NACK timing to the terminal through the DCI, so that the terminal can determine whether to use the reference signal for the region A on the basis of FIG. 1H-1.

FIGS. 1H-3, 1H-4 and 1H-5 show a method of changing a DMRS density when a variable transmission time interval (variable TTI) is applied. Also, proposed is a method of maintaining the orthogonality of the DMRSs of the MU terminals.

Specifically, FIG. 1H-3 shows a case where several TTIs are combined and transmitted. In this case, it may be assumed that the same precoding is applied to the DMRS during the transmission of several TTIs. In particular, when the TTI duration is short, it may be inefficient in terms of overhead of the reference signal to transmit the DMRS with the same density on the frequency as shown in FIG. 1H-3. Therefore, an example of changing the DMRS density is shown in FIGS. 1H-4 and 1H-5 as a method of reducing the overhead of the reference signal.

First, as shown in FIG. 1H-4, a method of setting the DMRS for lowering the overhead of the reference signal in TTI-1 and TTI-2 is possible. In another method as shown in FIG. 1H-5, the DMRS may not be transmitted in TTI-2. As such, in a TTI where the DMRS density is changed, orthogonality may not be maintained when different terminals use different DMRS structures for MU transmission. In this case, the above-described two methods for maintaining orthogonality can be applied when different DMRS structures are overlapped.

Specifically, in case of applying a rate matching method, the base station signals the rate matching information to the terminal before each TTI by using the DCI. Contrary to this, in case of applying the second method, the base station may set the same DMRS structure to different terminals in TTI-2 without additional signaling, for example, as in case of MU transmission in TTI-2 of FIGS. 1H-4 and 1H-5. For example, the DMRS structure in TTI-1 can be transmitted in TTI-2.

In addition, proposed is a method of efficiently supporting MU of terminals using different OCC lengths. For example, a case where terminals using an OCC of length 2 and an OCC of length 4 perform MU transmission is described. For example, when 2-layer transmission is performed using the OCC of length 4 based on Table 1-2, the 2-layer transmission may be performed through ports 7 and 11 or through ports 8 and 13. This enables more orthogonal MU pairing in comparison with a method of 2-layer transmission using ports 7 and 8 or using ports 11 and 13.

As described above, numbering from port 7 to port 14 based on the LTE system in Table 1-2 is an example for explanation. The port numbering used in the 5G system may be different from this. Therefore, the above-proposed method can be applied based on the OCC sequence corresponding to each port in Table 1-2.

The terminal and the base station each having a transmitter, a receiver, and a processor for implementing the above-described embodiments of the present disclosure are shown in FIGS. 1I and 1J, respectively. The above-described 1-1st to 1-3rd embodiments show transmission/reception methods of the base station and terminal for configuring a plurality of DMRS structures and performing a related operation. The receiver, the processor, and the transmitter in each of the base station and the terminal should operate in accordance with such embodiments.

Specifically, FIG. 1I is a block diagram illustrating an internal structure of a terminal according to an embodiment of the present disclosure. As shown FIG. 1H, the terminal of the present disclosure may include a terminal receiver 1800, a terminal transmitter 1804, and a terminal processor 1802. In embodiments of the present disclosure, the terminal receiver 1800 and the terminal transmitter 1804 may be collectively referred to as a transceiver.

The transceiver may transmit and receive signals to and from the base station. These signals may include control information and data. For this, the transceiver may include an RF transmitter for up-converting and amplifying the frequency of a signal to be transmitted, an RF receiver for low-noise amplifying a received signal and down-converting the frequency, and the like. In addition, the transceiver may receive a signal through a radio channel, output the received signal to the terminal processor 1802, and transmit a signal, output from the terminal processor 1802, through a radio channel.

The terminal processor 1802 may control the terminal to operate in accordance with the above-described embodiments of the present disclosure. For example, the terminal receiver 1800 may receive a reference signal from the base station, and the terminal processor 1802 may control to interpret a method of analyzing the reference signal. Also, the terminal transmitter 1804 may transmit the reference signal in this manner.

FIG. 1J is a block diagram illustrating an internal structure of a base station according to an embodiment of the present disclosure. As shown in FIG. 1I, the base station of the present disclosure may include a base station receiver 1901, a base station transmitter 1905, and a base station processor 1903. In embodiments of the present disclosure, the base station receiver 1901 and the base station transmitter 1905 may be collectively referred to as a transceiver.

The transceiver may transmit and receive signals to and from the terminal. These signals may include control information and data. For this, the transceiver may include an RF transmitter for up-converting and amplifying the frequency of a signal to be transmitted, an RF receiver for low-noise amplifying a received signal and down-converting the frequency, and the like.

In addition, the transceiver may receive a signal through a radio channel, output the received signal to the base station processor 1903, and transmit a signal, output from the base station processor 1903, through a radio channel. The base station processor 1903 may control the base station to operate in accordance with the above-described embodiments of the present disclosure. For example, the base station processor 1903 may determine the structure of a reference signal and control to generate configuration information of the reference signal to be delivered to the terminal. Then, the base station transmitter 1905 may deliver the reference signal and the configuration information to the terminal, and the base station receiver 1901 may receive the reference signal.

In addition, according to an embodiment of the present disclosure, the base station processor 1903 may control processing for supporting orthogonal MU transmission between terminals using different DMRS structures. In addition, information necessary for control may be transmitted to the terminal through the base station transmitter 1905.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure. Further, the disclosed embodiments may be implemented in combination as needed. For example, the 1-1st, 1-2nd and 1-3rd embodiments of the present disclosure may be combined, at least in part, with each other for the operations of the base station and terminal. Also, although the above embodiments are presented on the basis of the FDD LTE system, such embodiments or modifications thereof based on the same technical idea may be implemented in other systems such as the TDD LTE system, the 5G or NR system, and the like.

2nd Embodiment

In a wireless communication system, a base station should transmit a reference signal for channel estimation of a terminal. Using the reference signal, the terminal can perform channel estimation and demodulate a received signal. Also, the terminal can know a channel status through the reference signal and feed it back to the base station. Normally, for the transmission of the reference signal, the transmission interval of the reference signal based on frequency and time is determined in consideration of the maximum delay spread and the maximum Doppler spread of a channel. As the transmission interval of the reference signal becomes narrower, the channel estimation performance is improved and thereby the demodulation performance of a signal can be improved. However, this results in increasing the overhead of the reference signal, thus restricting a data transmission rate.

A typical 4G LTE system that operates in a frequency band of 2 GHz uses the reference signals such as a cell-specific reference signal (CRS) and a demodulation reference signal (DMRS) in a downlink. If the interval of the reference signal is represented by a subcarrier interval 'm' of an orthogonal frequency division multiplexing (OFDM) signal in frequency and by a symbol interval 'n' of the OFDM signal in time, the transmission interval (m, n) based on frequency and time of the reference signal corresponding to antenna ports 1 and 2 is (3, 4) in case of the CRS assuming a normal cyclic prefix (CP). Also, in case of the DMRS assuming the normal CP, the transmission interval (m, n) based on frequency and time of the reference signal is (5, 7).

Unlike the LTE system, the 5G wireless communication considers a system that operates in a higher frequency band as well as in a frequency band of 6 GHz or less. Since channel characteristics depend on the frequency band, the 5G system is required to newly design a reference signal in consideration of this. In addition, the 5G wireless communication considers importantly the support of low latency and high mobility, and it is important to minimize the overhead of the reference signal.

In the wireless communication system, the base station should transmit a reference signal to the terminal in order to measure a downlink channel status. In case of the long term evolution advanced (LTE-A) system of 3GPP, the terminal measures a channel status between the base station and the terminal by using a CRS or a channel status information reference signal (CSI-RS) transmitted by the base station.

As the channel status, some factors should be considered, for example, the amount of interference in downlink. The amount of interference in downlink includes an interference signal and a thermal noise caused by antennas included in each of neighboring base stations and plays an important role in determining a channel condition of downlink.

For example, when one transmission antenna included in a certain base station transmits a signal to one reception antenna included in a certain terminal, the terminal should determine, using the reference signal received from the base station, the energy per symbol receivable through downlink and the amount of interference to be received along with the symbol in an interval of receiving the symbol, and then determine Es/Io. The determined Es/Io is converted into a data transmission rate or corresponding value and notified to the base station in the form of a channel quality indicator (CQI), so that the base station can determine a transmission rate for data transmission to the terminal in downlink.

In case of the LTE-A system, the terminal sends, as feedback, information about the downlink channel status to the base station so that the base station may utilize it in downlink scheduling. That is, the terminal measures the channel status by using the reference signal transmitted from the base station through downlink, and sends the measured channel status information to the base station in the form defined by the LTE/LTE-A standard.

In the LTE/LTE-A, there are three types of the channel state information (CSI) provided as feedback by the terminal, as follows.

Rank Indicator (RI): The number of spatial layers that can be received by the terminal in the current channel status.

Precoder Matrix Indicator (PMI): An indicator for a precoding matrix preferred by the terminal in the current channel status.

Channel Quality Indicator (CQI): The maximum data rate that can be received by the terminal in the current channel status. The CQI can be replaced by a SINR, a maximum error correction code rate and modulation scheme, data efficiency per frequency, etc. each of which can be utilized similar to the maximum data rate.

The RI, PMI, and CQI are related to each other. For example, the precoding matrix supported by LTE/LTE-A is defined differently for each rank. Therefore, the PMI value when the RI has a value of 1 and the PMI value when the RI has a value of 2 are interpreted differently even if the values are the same.

In addition, the terminal determines the CQI, based on the assumption that the rank value and the PMI value notified to the base station by the terminal are applied to the base station. For example, when the terminal notifies RI_X, PMI_Y, and CQI_Z to the base station, it means that the terminal can receive data according to the data rate corresponding to CQI_Z when rank is RI_X and precoding is PMI_Y. As such, when calculating the CQI, the terminal assumes a transmission scheme to be performed by the base station, so that the optimized performance can be obtained when the base station actually performs transmission in the transmission scheme.

In LTE/LTE-A, periodic feedback of the terminal is set to one of the following four feedback modes depending on what information is contained:

1. Reporting mode 1-0: RI, wideband CQI (wCQI)
2. Reporting mode 1-1: RI, wCQI, PMI
3. Reporting mode 2-0: RI, wCQI, subband CQI (sCQI)
4. Reporting mode 2-1: RI, wCQI, sCQI, PMI Feedback timing of each kind of information for the above four feedback modes is determined by values of $N_{pd}$, $N_{OFFSET,CQI}$, $M_{RI}$, $N_{OFFSET,RI}$, etc. delivered via a higher layer signal. In the feedback mode 1-0, the transmission period of wCQI is $N_{pd}$ subframes, and the feedback timing is determined with a subframe offset value of $N_{OFFSET,CQI}$. Also, the transmission period of RI is $N_{pd} \cdot M_{RI}$ subframes, and the offset is $N_{OFFSET,CQI}+N_{OFFSET,RI}$.

Figure 2A:
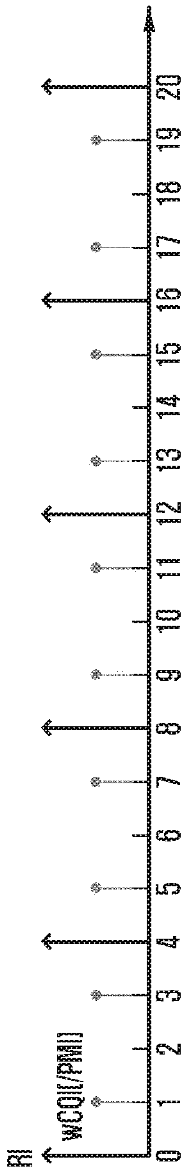
FIGS. 2A, 2B, and 2C are diagrams illustrating radio resource configurations of an LTE system.

FIG. 2A is a diagram showing the feedback timing of RI and wCQI when $N_{pd}=2$, $M_{RI}=2$, $N_{OFFSET,CQI}=1$, and $N_{OFFSET,RI}=-1$. In FIG. 2A, each timing represents a subframe index.

The feedback mode 1-1 has the same feedback timing as in the mode 1-0, but having a difference that wCQI and PMI are transmitted together at the wCQI transmission timing with respect to a situation of one antenna port, two antenna ports, or four antenna ports.

In the feedback mode 2-0, the feedback period for sCQI is $N_{pd}$ subframes, and the offset value is $N_{OFFSET,CQI}$. The feedback period for wCQI is $H \cdot N_{pd}$ subframes, and the offset value is $N_{OFFSET,CQI}$ as in case of the offset value of sCQI. Herein, H is defined as $H=J \cdot K+1$, K is transmitted via a higher layer signal, and J is a value determined according to a system bandwidth. For example, the J value for a 10 MHz system is defined as 3. As a result, the wCQI is transmitted once every H times sCQI transmission. The period of RI is $M_{RI} \cdot H \cdot N_{pd}$ subframes and the offset is $N_{OFFSET,CQI}+N_{OFFSET,RI}$.

Figure 2B:
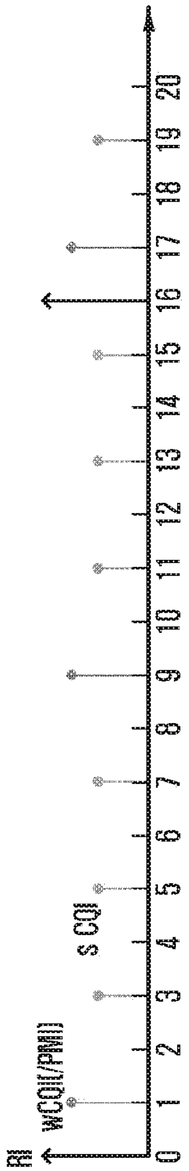

FIG. 2B is a diagram showing the feedback timing of RI, sCQI and wCQI when $N_{pd}=2$, $M_{RI}=2$, J=3 (10 MHz), K=1, $N_{OFFSET,CQI}=1$, and $N_{OFFSET,RI}=-1$. The feedback mode 2-1 has the same feedback timing as in the mode 2-0, but having a difference that PMI is transmitted together at the wCQI transmission timing with respect to a situation of one antenna port, two antenna ports, or four antenna ports.

The above-described feedback timing is case where the number of CSI-RS antenna ports is one, two, or four. As another example, in case of the terminal assigned CSI-RS for four or eight antenna ports, two pieces of PMI information are fed back unlike the feedback timing. In this case, that is, in case where CSI-RS for four or eight antenna ports is assigned to the terminal, the feedback mode 1-1 may be divided into two submodes.

For example, in the first submode, RI is transmitted together with first PMI information, and second PMI information is transmitted together with wCQI. Herein, the feedback period and the offset for the wCQI and the second PMI are defined as $N_{pd}$ and $N_{OFFSET,CQI}$, respectively, and the feedback period and the offset value for the RI and the first PMI information are defined as $M_{RI} \cdot N_{pd}$ and $N_{OFFSET,CQI}+N_{OFFSET,RI}$, respectively.

If both first PMI(i1) and second PMI(i2) are reported from the terminal to the base station, the terminal and the base station confirms that precoding matrix W(i1, i2) corresponding to a combination of the first and second PMIs in a codebook of precoding matrices shared with each other is a precoding matrix preferred by the terminal.

In other words, assuming that a precoding matrix corresponding to the first PMI is W1 and a precoding matrix corresponding to the second PMI is W2, the terminal and the base station share information that the precoding matrix preferred by the terminal is determined as a product of two matrices, W1W2.

When the feedback mode for eight CSI-RS antenna ports is 2-1, precoding type indicator (PTI) information is added to the feedback information. In this case, the PTI is fed back together with the RI, and its period is $M_{RI} \cdot H \cdot N_{pd}$ subframes, and the offset is defined as $N_{OFFSET,CQI}+N_{OFFSET,RI}$.

Specifically, when the PTI is 0, all of the first PMI, the second PMI, and the wCQI are fed back. In this case, the wCQI and the second PMI are transmitted together at the same timing, the period is $N_{pd}$, and the offset is given as $N_{OFFSET,CQI}$. The period of the first PMI is $H'\cdot N_{pd}$, and the offset is $N_{OFFSET,CQI}$. Here, H' is transmitted via a higher layer signal.

On the other hand, if the PTI is 1, the wCQI is transmitted together with the second broadband PMI, and the sCQI is fed back together with the second subband PMI at a separate timing. In this case, the first PMI is not transmitted, and then reported after the second PMI and the CQI are calculated assuming the first PMI reported most recently in case where the PTI is 0. The period and offset of the PTI and the RI are the same as in case where the PTI is 0. The period of the sCQI is defined as $N_{pd}$ subframes, and the offset is defined as $N_{OFFSET,CQI}$. The wCQI and the second PMI are fed back with the period of $H\cdot N_{pd}$ and the offset of $N_{OFFSET,\ CQI}$, and H is defined as in case where the number of CSI-RS antenna ports is 2.

Figure 2C:
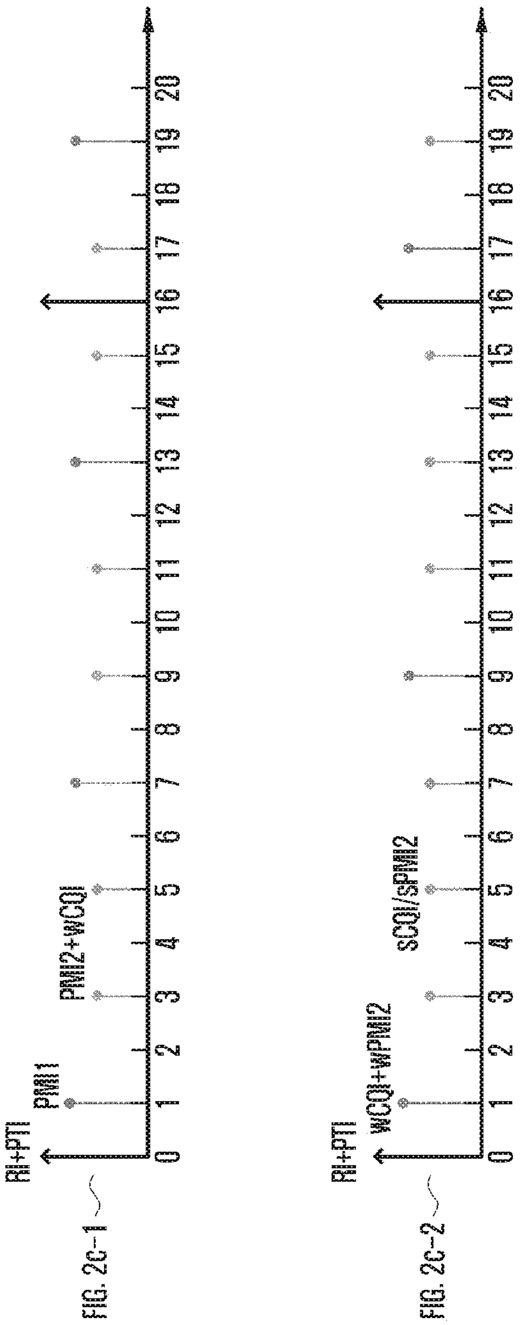

FIGS. 2C-1 and 2C-2 are diagrams showing the feedback timing in cases of PTI=0 and PTI=1, respectively, where $N_{pd}$=2, $M_{RI}$=2, J=3 (10 MHz), K=1, H'=3, $N_{OFFSET,CQI}$=1, and $N_{OFFSET,RI}$=1.

The LTE/LTE-A supports not only cyclic feedback but also aperiodic feedback of the terminal. When the base station desires to acquire aperiodic feedback information of a specific terminal, the base station performs uplink data scheduling of the terminal by setting an aperiodic feedback indicator included in downlink control information (DCI) for uplink data scheduling of the terminal to perform a specific aperiodic feedback.

If the terminal receives an indicator set to perform aperiodic feedback at the nth subframe, the terminal inserts aperiodic feedback information in data transmission at the (n+k)th subframe and performs uplink transmission. Herein, k which is a parameter defined in the 3GPP LTE Release 11 standard is 4 in case of frequency division duplexing (FDD), is and defined as Table 2-1 in case of time division duplexing (TDD). Table 2-1 shows k values for each subframe number n in the TDD UL/DL configuration.

TABLE 2-1

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

If the aperiodic feedback is set, the feedback information includes RI, PMI, and CQI as in case of the periodic feedback, and the RI and the PMI may not be fed back according to the feedback setting. The CQI may include both wCQI and sCQI or may include only wCQI information.

Unlike the LTE system, the 5G wireless communication considers a system that operates in a higher frequency band as well as in a frequency band of 6 GHz or less. Since channel characteristics depend on the frequency band, the 5G system is required to newly design a reference signal in consideration of this. In addition, the 5G wireless communication considers importantly the support of low latency and high mobility, and it is important to minimize the overhead of the reference signal. Therefore, unlike the LTE system, the 5G system may support a plurality of reference signals suitable for transmission environments.

When many reference signals are supported, the terminal may need additional feedback information for selecting a reference signal suitable for a transmission environment as well as RI, PMI, and CQI. Accordingly, the present disclosure provides a method for the terminal to send feedback information necessary for selecting a reference signal to the base station so as to enable environment-adaptive transmission of the reference signal.

Now, embodiments of the present disclosure will be described in detail with reference to the accompanying drawings. Although embodiments of this disclosure will be described hereinafter using the LTE or LTE-A system as an example, the embodiments may be applied to other communication systems having a similar technical background or channel form, for example, to 5G (or new radio (NR)) mobile communication technology being developed after the LTE-A. Specifically, a method of periodic or aperiodic feedback of channel information may be different from that in the LTE described above. Although the present disclosure is described with reference to DMRS, it may be applied to other reference signals. Thus, as will be apparent to those skilled in the art, embodiments of the present disclosure may be applied to other communication systems through some modifications without departing from the scope of the present disclosure.

In the following description, a detailed description of known functions and configurations incorporated herein will be omitted when it may make the subject matter of the present disclosure rather unclear. The following terms are defined in consideration of the functions of the present disclosure, and may be changed according to the intention of the user, the operator, or the like. Therefore, the definition should be based on the contents throughout this specification. Hereinafter, a base station (BS) which is an entity of allocating resources to a terminal may be at least one of an eNode B, a Node B, a radio access unit, a base station controller, or a node on a network. A terminal may include user equipment (UE), a mobile station (MS), a cellular phone, a smart phone, a computer, or a multimedia system capable of performing a communication function. In the present disclosure, a downlink (DL) refers to a wireless transmission path of a signal transmitted from the base station to the terminal, and an uplink (UL) is a wireless transmission path of a signal transmitted from the terminal to the base station.

The feedback information for selecting a reference signal suitable for a transmission environment to be described below is expressed by the term pilot density indicator (PDI). However, the term of the PDI may be expressed as any other term depending on the intent of the user and the intended use of the reference signal. For example, the PDI may be replaced with the term such as reference-signal density indicator (RDI), Doppler frequency indicator (DFI), delay spread indicator (DSI), or SINR indicator (SI). Specifically, the term PDI is merely a specific example provided to facilitate understanding of the present disclosure and is not intended to limit the scope of the present disclosure. That is, it will be apparent to those skilled in the art that embodiments of the present disclosure can be applied to any reference signal based on the subject matter of the present disclosure.

In the 2-1st embodiment of the present disclosure, feedback information that can be included in the PDI will be described. In the 2-2nd embodiment of the present disclosure, a feedback method of the PDI will be described. In the 2-3rd embodiment of the present disclosure, an operating method of the base station using the PDI will be described.

2-1st Embodiment

In the 2-1st embodiment, information that can be included in the PDI, which is feedback information proposed in the present disclosure, will be described. As described above, several structures of reference signals required according to transmission environments can be supported.

Specifically, in an environment where the degree of Doppler Effect is high, it is necessary to enhance the channel estimation performance by increasing the density of the reference signal on the transmission time axis. On the other hand, in an environment where the degree of the Doppler Effect is low (hereinafter, also referred to as low Doppler), it is necessary to reduce the overhead of the reference signal by decreasing the density of the reference signal on the transmission time axis. In addition, in a high delay environment, it is necessary to improve the channel estimation performance by increasing the density of the reference signal on the transmission frequency axis. On the other hand, in a low delay environment, it is necessary to reduce the overhead of the reference signal by decreasing the density of the reference signal on the transmission frequency axis. Also, in a low SNR (Signal to Interference plus noise ratio) environment, the structure of the reference signal having a high density is required in order to guarantee the channel estimation performance. In a high SNR environment, it is needed to reduce the overhead by decreasing the density of the reference signal.

All of the Doppler information, the channel delay information, and the SINR information that determine the structure of the reference signal can be found by the terminal through measurement. Therefore, in the PDI which is feedback information proposed in the present disclosure, the Doppler information, the channel delay information, and the SINR information may be included. However, information that can be included in the PDI of the present disclosure is not limited to the above information.

The terminal can report information about the reference signal structure preferred in a channel environment by providing feedback of the measured Doppler information, channel delay information, and SINR information. In the present disclosure, the PDI may include all or some of the Doppler information, the channel delay information, and the SINR information.

Specifically, described hereinafter is which reference signal structure is suitable for a situation, based on the information included in the PDI.

First, when the PDI includes the Doppler information, the terminal can determine the structure of a reference signal suitable for a channel environment by measuring the Doppler frequency. For example, the terminal can measure the Doppler frequency by performing a time correlation on the basis of the reference signal. If the Doppler frequency (Hz) is greater than X as shown in Equation 1 below, it can be indicated that transmission of a reference signal having a high density on the transmission time axis is required.

$$\text{Doppler frequency} > X \quad \text{[Equation 1]}$$

In Equation 1, X (Hz) represents a threshold for the Doppler frequency. Also, the Doppler frequency may be expressed as Doppler frequency=f*cv/c where f is the carrier frequency (Hz), v (m/s) is the terminal speed, and c is the speed of light ($\approx 3*10^8$ m/s). Therefore, it can be seen that the Doppler frequency is influenced by the carrier frequency and the terminal speed.

For example, when f=2.5 GHz and v=350 km/h, the Doppler frequency is 810 Hz. For example, when the Doppler frequency is 800 Hz or higher which is considered as a high Doppler environment, the threshold X for the Doppler frequency may be set to 800 Hz.

Unlike the LTE system, the 5G system considers the terminal speed up to 500 km/h. Therefore, the above method of adaptively changing the structure of a reference signal in consideration of the terminal speed may be very effective. In the present disclosure, when the Doppler frequency is greater than X as shown in Equation 1, a one-bit indicator may be fed back to indicate that transmission of a reference signal with a high density on the time axis is required.

Next, when the channel delay information is included in the PDI, the terminal can determine the structure of a reference signal suitable for a channel environment by measuring a channel delay. For example, the terminal can measure the channel delay information through various methods based on a reference signal.

For example, the terminal can measure a power delay profile (PDP) by performing correlation on the frequency based on a reference signal. From the PDP information, delay spread information such as root mean square (RMS) delay spread or maximum delay spread may be obtained. If the delay spread (sec) is greater than Y as shown in Equation 2 below, it can be indicated that transmission of a reference signal with a high density on the transmission frequency is required.

$$\text{Delay spread} > Y \quad \text{[Equation 2]}$$

In Equation 2, Y (sec) represents a threshold for the delay spread. Also, the delay spread may be the RMS delay spread or the maximum delay spread. If the RMS delay spread is used as a reference, Y is set based on the RMS delay spread value and may be set differently based on the maximum delay spread value.

Normally, the reference signal in the existing LTE system is designed assuming the worst case for the channel delay. Therefore, in a low channel delay environment, a reference signal having a lower density on the frequency is used to improve transmission efficiency.

In addition, the 5G system not only considers frequency bands of 6 GHz or lower, but also considers higher frequency bands, thus considering various kinds of subcarrier spacing. Therefore, unlike the conventional LTE system, it is needed to newly design the density of the reference signal on the frequency.

In the present disclosure, when the delay spread is greater than Y as in Equation 2, a one-bit indicator is fed back to indicate that transmission of a reference signal with a high density on the frequency axis is required. However, if the reference signal is designed assuming the worst case for the channel delay even in the 5G system, an additional indication regarding the delay information may not be required.

Finally, when the channel SINR information is included in the PDI, the terminal can determine the structure of a reference signal suitable for a channel environment through SINR measurement. For example, the terminal can measure the SINR through various methods based on a received signal. If the SINR is greater than Z as shown in Equation 3 below, the structure of a reference signal having a high density can be indicated.

$$\text{SINR} > Z \quad \text{[Equation 3]}$$

In Equation 3, Z represents a threshold for SNR. Normally, in a low SINR range (−10 to 0 dB), it is important to maintain the system performance by improving the channel estimation performance through the use of a reference signal having a high density. In one embodiment, the threshold Z for the SINR may be set to 0 dB.

In the present disclosure, when the SINR is greater than Z as in Equation 3, a one-bit indicator may be fed back to indicate that a reference signal having a high density is preferred. However, in Equation 3, the SINR may be replaced with the CQI index or the maximum error correction code rate and modulation scheme, the data efficiency per frequency, etc. defined in Table 7.2.3-1 of 3GPP LTE standard TS.36.213.

If the SINR is replaced with the CQI index in Equation 3, there is an advantage of being able to feed back the structure information of the reference signal implicitly through CQI feedback without using additional bits. In one embodiment, in case of feeding back the lowest CQI index, it can be indicated that a reference signal having a high density is preferred.

In the 2-1st embodiment, some kinds of information included in the PDI which is feedback information proposed by the present disclosure, and a method of determining, through each kind of information included in the PDI, which reference signal structure is preferred by the terminal, that is, transmission of which reference signal structure is needed in the current situation are described through Equations 1 to 3. Depending on such situations, information necessary for the terminal to feed back to the base station may be set with 1 to 3 bits.

However, in case of setting several threshold values in Equations 1 to 3 as necessary, the reference signal structure preferred by the terminal may be further subdivided according to the threshold values. In this case, the number of bits of information necessary for the terminal to feed back to the base station may increase.

For example, if two thresholds X1 and X2 for the Doppler frequency are set as shown in Equation 4, the reference signal structures preferred by the terminal may be classified into three types.

[Equation 4]

$$\text{Doppler frequency} > X1 \quad (4\text{-}1)$$

$$X2 \leq \text{Doppler frequency} \leq X1 \quad (4\text{-}2)$$

$$\text{Doppler frequency} < X2 \quad (4\text{-}3)$$

When there are three reference signal structures according to the density on the transmission time axis in Equation 4, Equation 4-1 indicates that a reference signal with the highest density is preferred on the transmission time axis, Equation 4-2 indicates that a reference signal with a medium density is preferred on the transmission time axis, and Equation 4-3 indicates that a reference signal with a low density is preferred on the transmission time axis. Such a method may also be applied to Equations 2 and 3.

2-2nd Embodiment

In the 2-2nd embodiment, a method for the terminal to feed back a pilot density indicator (PDI), which is feedback information proposed by the present disclosure, to the base station will be described. A case of feeding back the PDI together with the RI, the PMI, and the CQI, which are channel status information fed back to the base station by the terminal in LTE/LTE-A, is considered.

First, in case of using aperiodic feedback, the base station may insert PDI information in uplink data of the terminal by setting an aperiodic feedback indicator included in downlink control information for uplink data scheduling of the terminal to perform a PDI feedback.

Next, a case of using aperiodic feedback is considered. In case of aperiodic feedback, the number of bits usable for feedback may be limited. Therefore, information required for feedback may be limited to 1 to 3 bits by using Equations 1 to 3 of the above-described 2-1st embodiment. PDI feedback methods proposed by the present disclosure may be classified as follows, based on the CQI feedback of the LTE system.

Figure 2D:
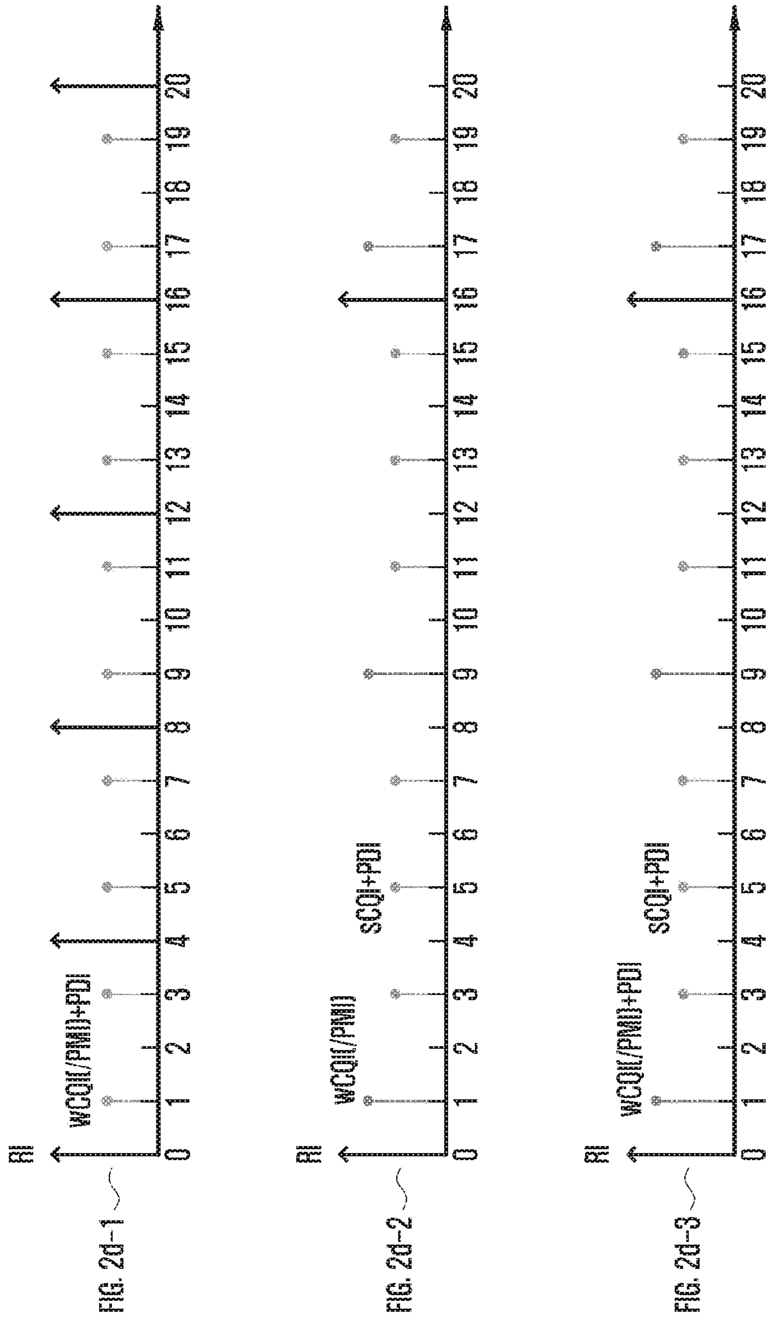
FIG. 2D is a diagram illustrating feedback timing of information necessary for selecting a reference signal according to the 2-2nd embodiment of the present disclosure.

1. Feedback based on wideband CQI (wCQI)
2. Feedback based on subband CQI (sCQI)
3. Separate feedback for wCQI and sCQI Based on the assumption of FIG. 2A, FIG. 2D-1 shows a case of feedback based on the wCQI among the above PDI feedback methods. FIG. 2D-1 shows that the PDI is transmitted together whenever the wCQI is fed back. In this case, a reference signal suitable for a channel status may be determined on the basis of the entire band.

Based on the assumption of FIG. 2B, FIG. 2D-2 shows a case of feedback based on the sCQI among the above PDI feedback methods. In this case, a reference signal suitable for a channel status may be determined on the basis of the subband.

Based on the assumption of FIG. 2B, FIG. 2D-3 shows a case where the PDI feedback is separately performed for the wCQI and the sCQI. In this case, a reference signal suitable for a channel status may be determined on the basis of the wideband or the subband.

2-2nd Embodiment

In the 2-2nd embodiment, the operation of the base station will be described when the PDI, which is the feedback information proposed in the present disclosure, is fed back from the terminal to the base station. The base station can distinguish which environment the supportable reference signal is suitable for, as shown in Table 2-2 or Table 2-3 below.

Table 2-2 shows a case of operating the structure of the reference signal in two types, and Table 2-3 shows a case of operating the structure of the reference signal in four types. For example, if two structures of the reference signal are supportable, it is possible to know an environment suitable for each of two reference signals through Table 2-2.

TABLE 2-2

| RS density | Use case |
|---|---|
| Low density | Low latency/Low Doppler/Low delay/High SINR |
| High density | High Doppler/High delay/ Low SINR |

As another example, when there are four supportable structures of the reference signal, it is possible to know an environment suitable for each reference signal through Table 2-3.

TABLE 2-3

| Indication | RS density | Use case |
|---|---|---|
| '00' | Low density1 | Low latency/Low Doppler |
| '01' | Low density2 | Low delay/High SINR |

TABLE 2-3-continued

| Indication | RS density | Use case |
|---|---|---|
| '10' | Medium density | Medium SINR |
| '11' | High density | High Doppler/High delay/Low SINR |

Figure 2E:
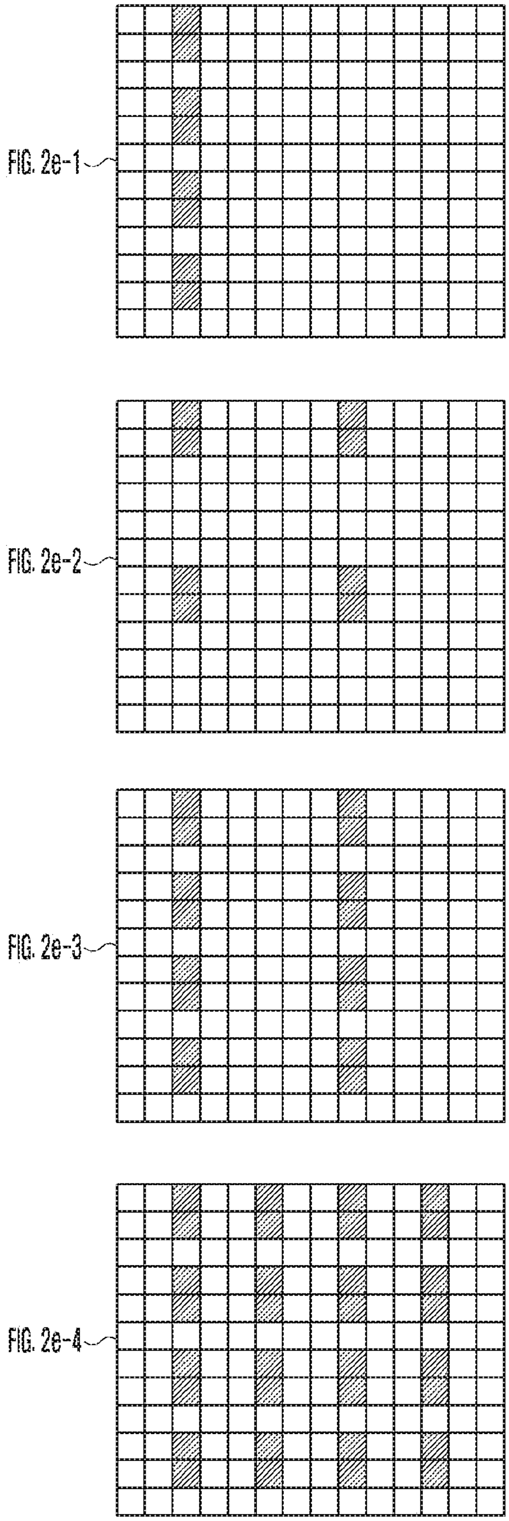
FIG. 2E is a diagram illustrating a method for distinguishing reference signals based on feedback of information necessary for selecting a reference signal according to the 2-3rd embodiment of the present disclosure.

Specifically, the structures of the reference signal for Table 2-3 are shown in FIG. 2E. When the transmission environment requires low latency or is a low-Doppler environment, it is possible to use the structure of a reference signal having a low density on the time axis as shown in FIG. 2E-1. On the contrary, when the transmission environment is a low delay environment, it is possible to use the structure of a reference signal having a low density on the frequency as shown in FIG. 2E-2. On the other hand, in a high delay environment, it is possible to use the structure of a reference signal having a high density on the frequency as shown in FIG. 2E-3. In a high Doppler environment or a low SINR environment, it is possible to use the structure of a reference signal having a high density as shown in FIG. 2E-4.

In other words, it is possible to interpret as follows. The structure of FIG. 2E-1 shows the structure of a reference signal corresponding to low latency/low Doppler. The structure of FIG. 2E-2 shows the structure of a reference signal corresponding to low delay/high SINR. The structure of FIG. 2E-3 shows the structure of a reference signal corresponding to high delay/high SINR. The structure of FIG. 2E-4 shows the structure of a reference signal corresponding to high Doppler/low SINR.

In the 2-3rd embodiment, a method of determining the structure of the reference signal suitable for the current environment when the base station receives the PDI, which is the feedback information proposed by the present disclosure, from the terminal is described. However, the method of determining the structure of the reference signal suitable for the transmission environment through PDI reception may vary depending on the structure of the reference signal supported by the base station as described above.

2-4th Embodiment

In the present disclosure, a method of feeding back information about a reference signal preferred by the terminal when several reference signals are supported has been proposed. In the 2-4th embodiment, when there are several supportable reference signals, a method of setting the type or number of reference signals supportable to a specific terminal through UE capability is proposed.

Specifically, the base station can notify the types of settable reference signals to the terminal through UE capability signaling, and the terminal can feed back information about the reference signal preferred by the terminal from among the settable reference signal types. Since the base station notifies the types of settable reference signals to the terminal through UE capability signaling, there is an advantage that the terminal can easily select the preferred reference signal from among the settable reference signal types.

For example, the type or number of settable reference signal structures may vary depending on a slot structure. Specifically, different types of reference signals may be used for a structure of using 14 symbols as one slot and a structure of using 7 symbols as one slot. Further, in the structure of a mini slot, the structure or type of the reference signal different from the above slot structure may be used.

Also, in terms of terminal, the types of usable reference signals may be limited depending on terminal implementation. Specifically, in case of a specific terminal in which the channel estimation method for the reference signal is restricted, all the reference signal structures may not be supported.

Therefore, as in the above-proposed method, the method in which the base station notifies the types of settable reference signals to the terminal through UE capability signaling and the terminal selects the preferred reference signal from among the usable reference signal types is needed in an environment in which various reference signals are supported. Herein, the UE capability signaling may be set in a radio resource control (RRC) signaling which is a higher layer signal.

Figure 2F:
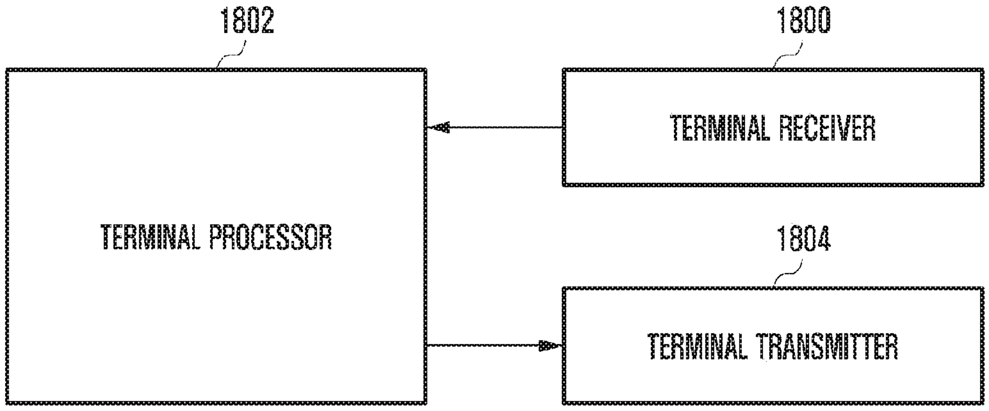
FIG. 2F is a block diagram illustrating an internal structure of a terminal according to embodiments of the present disclosure.
Figure 2G:
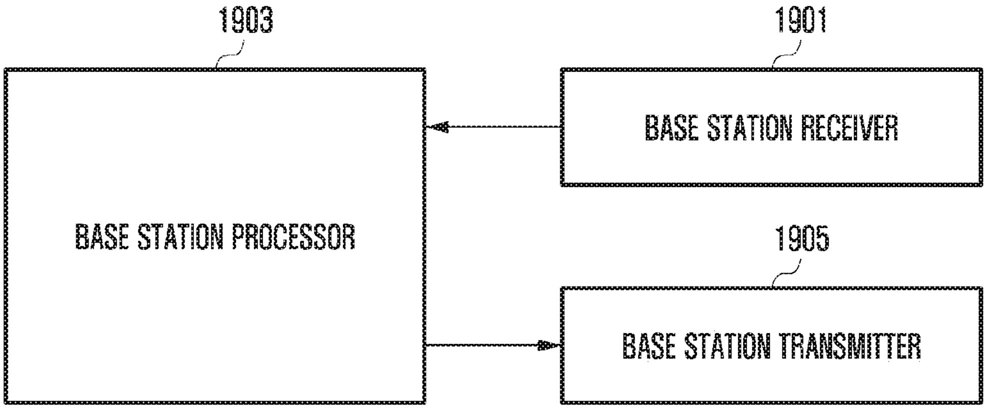
FIG. 2G is a block diagram illustrating an internal structure of a base station according to embodiments of the present disclosure.

The terminal and the base station each having a transmitter, a receiver, and a processor for implementing the above-described embodiments of the present disclosure are shown in FIGS. 2F and 2G, respectively. The above-described 2-1st to 2-3rd embodiments show methods of the base station and terminal for transmitting or receiving the pilot density indictor (PDI) which is feedback information proposed therein. The receiver, the processor, and the transmitter in each of the base station and the terminal should operate in accordance with such embodiments.

Specifically, FIG. 2F is a block diagram illustrating an internal structure of a terminal according to an embodiment of the present disclosure. As shown FIG. 2F, the terminal of the present disclosure may include a terminal receiver 1800, a terminal transmitter 1804, and a terminal processor 1802.

In embodiments of the present disclosure, the terminal receiver 1800 and the terminal transmitter 1804 may be collectively referred to as a transceiver. The transceiver may transmit and receive signals to and from the base station. These signals may include control information and data. For this, the transceiver may include an RF transmitter for up-converting and amplifying the frequency of a signal to be transmitted, an RF receiver for low-noise amplifying a received signal and down-converting the frequency, and the like.

In addition, the transceiver may receive a signal through a radio channel, output the received signal to the terminal processor 1802, and transmit a signal, output from the terminal processor 1802, through a radio channel.

The terminal processor 1802 may control the terminal to operate in accordance with the above-described embodiments of the present disclosure. For example, the terminal processor 1802 measures and interprets information that can be included in the PDI. In addition, the terminal processor 1802 may control the terminal transmitter 1804 to transmit the PDI information to the base station. Also, according to an embodiment, the terminal processor 1802 may determine and control the transmission timing of the PDI periodically or aperiodically.

FIG. 2G is a block diagram illustrating an internal structure of a base station according to an embodiment of the present disclosure. As shown in FIG. 2G, the base station of the present disclosure may include a base station receiver 1901, a base station transmitter 1905, and a base station processor 1903. In embodiments of the present disclosure, the base station receiver 1901 and the base station transmitter 1905 may be collectively referred to as a transceiver.

The transceiver may transmit and receive signals to and from the terminal. These signals may include control information and data. For this, the transceiver may include an RF transmitter for up-converting and amplifying the frequency of a signal to be transmitted, an RF receiver for low-noise amplifying a received signal and down-converting the frequency, and the like.

In addition, the transceiver may receive a signal through a radio channel, output the received signal to the base station processor 1903, and transmit a signal, output from the base station processor 1903, through a radio channel.

The base station processor 1903 may control the base station to operate in accordance with the above-described embodiments of the present disclosure. For example, the base station receiver 1901 receives the PDI fed back by the terminal. The base station processor 1903 may analyze the PDI information received from the terminal and determine which reference signal structure is suitable for a transmission environment. Then, the base station processor 1903 controls the base station transmitter 1905 to transmit a reference signal corresponding to a reference signal structure selected based on the PDI. Also, according to an embodiment of the present disclosure, the base station processor 1903 may perform and control setting for receiving the PDI periodically or aperiodically.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Further, the disclosed embodiments may be implemented in combination as needed. For example, the 2-1st, 2-2nd and 2-3rd embodiments of the present disclosure may be combined, at least in part, with each other for the operations of the base station and terminal. Also, although the above embodiments are presented on the basis of the FDD LTE system, such embodiments or modifications thereof based on the same technical idea may be implemented in other systems such as the TDD LTE system, the 5G or NR system, and the like.

3rd Embodiment

In the wireless communication system, especially, in the conventional LTE system, hybrid automatic repeat request (HARQ) acknowledgment (ACK) or negative acknowledgment (NACK) information indicating success or failure of data transmission on uplink is transmitted to the base station after 3 ms from the reception of downlink data. For example, in response to a physical downlink shared channel (PDSCH) received in the subframe n from the base station to the terminal, HARQ ACK/NACK information is delivered to the base station through a physical uplink control channel (PUCCH) or a physical uplink shared channel (PUSCH) in the subframe n+4.

Also, in the frequency division duplex (LTE) system, the base station may transmit downlink control information (DCI) including uplink resource allocation information to the terminal or request retransmission through a physical hybrid ARQ indicator channel (PHICH). When the terminal receives such uplink data transmission scheduling in the subframe n, the terminal performs uplink data transmission, i.e., PUSCH transmission, in the subframe n+4. This example is the case in the LTE system using FDD, and the HARQ ACK/NACK transmission timing or the PUSCH transmission timing is varied in the LTE system using time division duplex (TDD), depending on uplink-downlink subframe configuration, which is performed in accordance with a predetermined rule.

In the LTE system using FDD or TDD, the HARQ ACK/NACK transmission timing or the PUSCH transmission timing is predetermined according to case where the time required for signal processing of the base station and the terminal is about 3 ms. However, if the signal processing time is reduced to about 1 ms or 2 ms, a delay time for data transmission will be reduced. The reduction of the signal processing time to 1 ms or 2 ms may be accomplished by limiting the number of allocated physical resource blocks (PRBs), the modulation and coding scheme (MCS), the transport block size (TBS), and the like.

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, implementation of the 5G communication system at a super-high frequency (mmWave) band (e.g., such as a 60 GHz band) is being considered. In order to obviate a propagation loss of a radio wave and increase a delivery distance of a radio wave at the super-high frequency band, discussions are underway about various techniques such as a beamforming, a massive MIMO, a full dimensional MIMO (FD-MIMO), an array antenna, an analog beam-forming, and a large scale antenna for the 5G communication system.

Additionally, for an improvement in the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like.

Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, the Internet, which is a human centered connectivity network where humans generate and consume information, is now evolving to the Internet of things (IoT) where distributed entities, such as things, exchange and process information without human intervention. Further, the Internet of everything (IoE), which is a combination of IoT technology and big data processing technology through connection with a cloud server, has emerged. As technology elements, such as sensing technology, wired/wireless communication and network infrastructure, service interface technology, and security technology, have been demanded for IoT implementation, a sensor network, machine-to-machine (M2M) communication, machine type communication (MTC), and so forth have been recently researched.

Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, advanced medical service, etc. through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

As such, a plurality of services can be provided to a user in the communication system. For this, a method and apparatus for providing each service within the same time interval in accordance with the service characteristics.

Now, embodiments of the present disclosure will be described in detail with reference to the accompanying drawings.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card. Also, in embodiments, the unit may include one or more processors.

In the wireless communication system including the 5th generation, at least one service of enhanced mobile broadband (eMBB), massive machine type communications (mMTC), and ultra-reliable and low latency communications (URLLC) may be provided to the terminal. These services may be provided to the same terminal during the same time interval. In non-limiting embodiments, the eMBB may be a service for high-speed transmission of high-capacity data, the mMTC may be a service for terminal power minimization and multiple-terminal access, and the URLLC may be a service for high reliability and low latency. The above three services may be a major scenario in the LTE system or in the 5G/NR (new radio, next radio) system after LTE. In embodiments, a method and apparatus for coexistence of eMBB and URLLC or coexistence of mMTC and URLLC will be described.

When the base station has scheduled data corresponding to the eMBB service to the terminal in a specific transmission time interval (TTI), and when a situation of having to transmit URLLC data in the above TTI occurs, the URLLC data may be transmitted without transmitting a part of eMBB data in a frequency band where the eMBB data is transmitted by scheduling. In this case, the terminal scheduled for the eMBB and the terminal scheduled for the URLLC may be the same terminal or different terminals.

In such a case, because a part of already-scheduled eMBB data is not transmitted, there is a possibility that the eMBB data is damaged. In this case, a method of receiving a signal and processing the received signal at the terminal scheduled for the eMBB or the terminal scheduled for the URLLC is required.

Accordingly, in embodiments of the present disclosure, when information according to the eMBB and the URLLC is scheduled simultaneously by sharing some or all of the frequency bands, when information according to the mMTC and the URLLC is scheduled simultaneously, when information according to the mMTC and the eMBB is scheduled simultaneously, or when information according to the eMBB, the URLLC, and the mMTC is scheduled simultaneously, a method for coexistence between heterogeneous services by transmitting information according to each service will be described.

Hereinafter, a base station (BS) which is an entity of allocating resources to a terminal may be at least one of an eNode B, a Node B, a radio access unit, a base station controller, or a node on a network. A terminal may include user equipment (UE), a mobile station (MS), a cellular phone, a smart phone, a computer, or a multimedia system capable of performing a communication function.

In the present disclosure, a downlink (DL) refers to a wireless transmission path of a signal transmitted from the base station to the terminal, and an uplink (UL) is a wireless transmission path of a signal transmitted from the terminal to the base station. Although embodiments of this disclosure will be described hereinafter using the LTE or LTE-A system as an example, the embodiments may be applied to other communication systems having a similar technical background or channel form, for example, to 5G (or new radio (NR)) mobile communication technology being developed after the LTE-A. In addition, as will be apparent to those skilled in the art, embodiments of the present disclosure may be applied to other communication systems through some modifications without departing from the scope of the present disclosure.

The LTE/LTE-A systems, which are representative examples of the broadband wireless communication system, employ an orthogonal frequency division multiplexing (OFDM) scheme in a downlink (DL) and employ a single carrier frequency division multiple access (SC-FDMA) scheme in an uplink (UL).

The uplink refers to a radio link through which a terminal (also referred to as user equipment (UE) or a mobile station (MS)) transmits data or a control signal to a base station (BS, also referred to as eNode B or eNB), and the downlink refers to a radio link through which the base station transmits data or a control signal to the terminal. The multiple access scheme as above distinguishes data or control information of each user by allocating and operating time-frequency resources so that the time-frequency resources for carrying data or control information are not overlapped with respect to respective users, that is, orthogonality is established.

The LTE system adopts a hybrid automatic repeat request (HARQ) scheme in which, when a decoding failure occurs in the initial transmission, the physical layer retransmits the corresponding data. In the HARQ scheme, if the receiver fails to correctly decode data, the receiver transmits information (i.e., negative acknowledgment (NACK)) indicating a decoding failure to the transmitter so that the transmitter can retransmit the corresponding data in the physical layer. The receiver combines the data retransmitted by the transmitter with the previously decoded data to improve data reception performance. In addition, when correctly decoding the data, the receiver transmits information (i.e., acknowledgment (ACK)) indicating a successful decoding to the transmitter so that the transmitter can transmit new data.

Figure 3A:
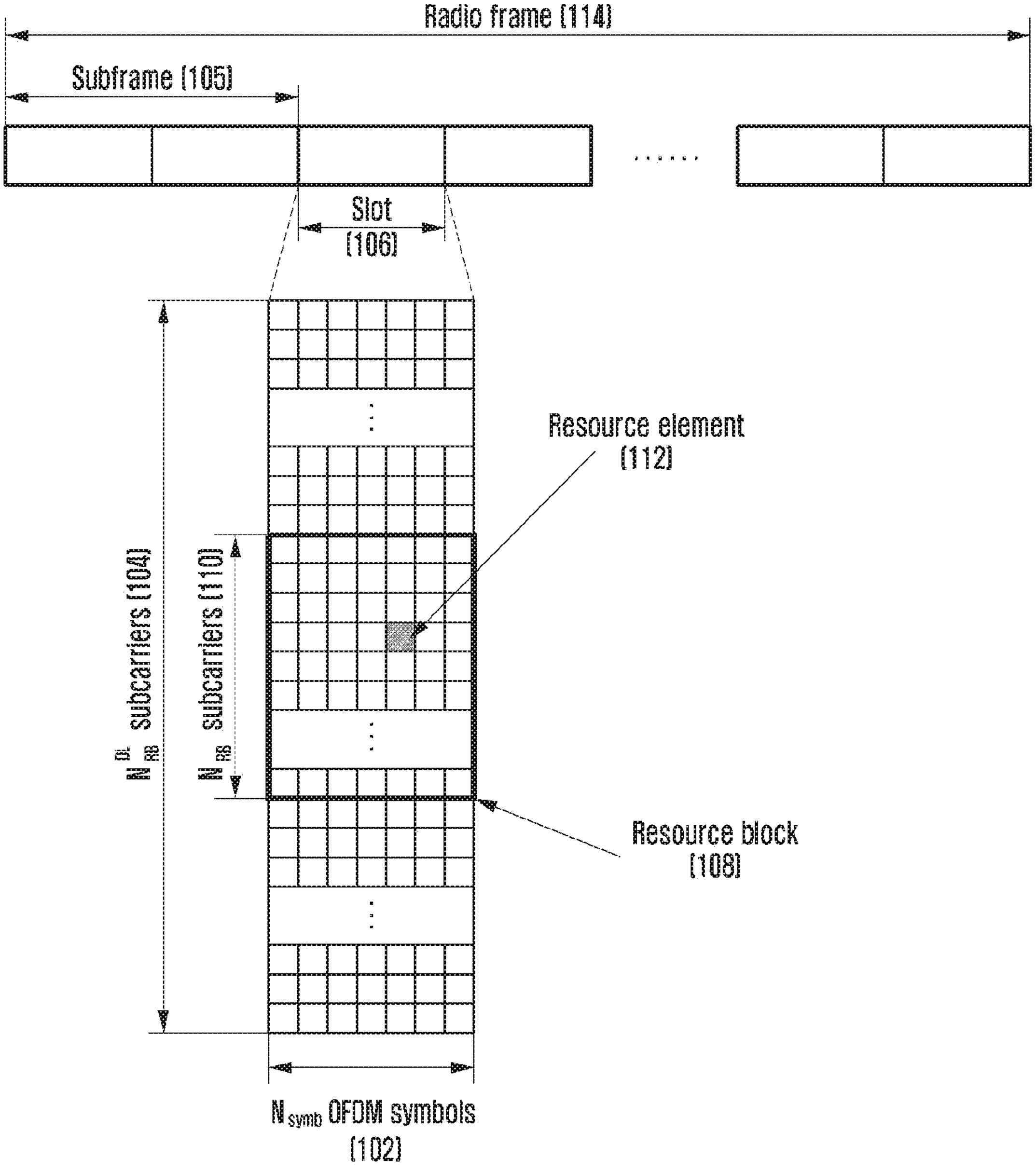
FIG. 3A is a diagram illustrating a downlink time-frequency domain transmission structure of an LTE or LTE-A system.

FIG. 3A is a diagram illustrating a basic structure of time-frequency domain which is a radio resource region for transmission of data or control channel in the downlink of the LTE system or similar system.

In FIG. 3A, the horizontal axis represents the time domain, and the vertical axis represents the frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms. In addition, a radio frame 114 is a time domain section composed of ten subframes. The minimum transmission unit in the frequency domain is a subcarrier, and the bandwidth of the entire system transmission bandwidth is composed of a total of $N_{BW}$ subcarriers 104. However, such specific values may be applied variably.

In the time-frequency domain, a basic unit of resources is a resource element (RE) 112, which may be represented by an OFDM symbol index and a subcarrier index. A resource block (RB) 108 or physical resource block (PRB) is defined as consecutive $N_{symb}$ OFDM symbols 102 in the time domain and consecutive $N_{RB}$ subcarriers 110 in the frequency domain. Thus, one RB 108 is composed of $N_{symb} \times N_{RB}$ REs 112.

In general, the minimum transmission unit of data is the RB unit. In the LTE system, $N_{symb}$ is 7, $N_{RB}$ is 12, and $N_{BW}$ and $N_{RB}$ are proportional to the bandwidth of the system transmission band. A data transmission rate increases in proportion to the number of RBs scheduled to the terminal. The LTE system defines and operates six transmission bandwidths. In case of an FDD system where the downlink and the uplink are separated by frequency, a downlink transmission bandwidth and an uplink transmission bandwidth may be different from each other. A channel bandwidth represents a radio frequency (RF) bandwidth corresponding to the system transmission bandwidth.

Table 3-1 shows a relationship between the system transmission bandwidth and the channel bandwidth as defined in the LTE system. For example, an LTE system with a 10 MHz channel bandwidth has a transmission bandwidth formed of 50 RBs.

TABLE 3-1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within the first N OFDM symbols in the subframe. In general, N={1, 2, 3}. Therefore, the value of N is varied for each subframe according to the amount of control information to be transmitted in the current subframe. The control information includes a control channel transmission interval indicator indicating how many OFDM symbols are used for transmission of control information, scheduling information for downlink data or uplink data, an HARQ ACK/NACK signal, and the like.

In the LTE system, the scheduling information for downlink data or uplink data is transmitted from the base station to the terminal through downlink control information (DCI). The DCI defines various formats and is operated by applying a defined DCI format depending on whether the scheduling information is UL grant for uplink data or DL grant for downlink data, whether the control information is small-sized compact DCI, whether spatial multiplexing using multiple antennas is applied, or whether the DCI is for power control. For example, DCI format 1, which is scheduling control information (DL grant) for downlink data, is configured to include at least the following control information.

Resource allocation type 0/1 flag: This notifies whether a resource allocation type is type 0 or type 1. Type 0 is to allocate resources in units of resource block group (RBG) by applying bitmap method. In the LTE system, a basic unit of scheduling is an RB represented by time and frequency domain resources, and the RBG composed of a plurality of RBs becomes a basic unit of scheduling in type 0. Type 1 allocates a specific RB within the RBG.

Resource block assignment: This notifies an RB allocated to data transmission. The resources to be represented are determined according to the system bandwidth and the resource allocation type.

Modulation and coding scheme (MCS): This indicates the modulation scheme used for data transmission and the size of a transport block which is data to be transmitted.

HARQ process number: This indicates an HARQ process number.

New data indicator: This indicates whether HARQ transmission is initial transmission or retransmission.

Redundancy version: This indicates a redundancy version of HARQ.

Transmit power control (TPC) command for physical uplink control channel (PUCCH): This indicates a TPC command for PUCCH which is an uplink control channel.

After passing a channel coding and modulation process, the DCI is transmitted through a physical downlink control channel (PDCCH) (hereinafter, also referred to as control information) or an enhanced PDCCH (EPDCCH) (hereinafter, also referred to as enhanced control information).

Generally, the DCI is scrambled with a specific radio network temporary identifier (RNTI) (or a terminal identifier) independently for each terminal, and a cyclic redundancy check (CRC) is added and channel-coded. Then each DCI is configured as an independent PDCCH and transmitted. In the time domain, the PDCCH is mapped and transmitted during a control channel transmission interval. A frequency domain mapping position of the PDCCH is determined by an identifier (ID) of each terminal and spread over the entire system transmission band.

Downlink data is transmitted through a physical downlink shared channel (PDSCH) which is a physical channel for downlink data transmission. The PDSCH is transmitted after the control channel transmission interval. The scheduling information such as a specific mapping position in the frequency domain, a modulation scheme, and the like is determined based on the DCI transmitted through the PDCCH.

Through the MCS among the control information configuring the DCI, the base station notifies, to the terminal, a modulation scheme applied to the PDSCH to be transmitted and a size of data (transport block size (TBS)) to be transmitted. In embodiments, the MCS may be formed of 5 bits or more or less. The TBS corresponds to a size before channel coding for error correction is applied to data (transport block (TB)) to be transmitted by the base station.

The modulation schemes supported by the LTE system are quadrature phase shift keying (QPSK), 16 quadrature amplitude modulation (16QAM), and 64QAM, and the respective modulation orders correspond to 2, 4, and 6. That is, transmitted are 2 bits per symbol for QPSK modulation, 4 bits per symbol for 16QAM modulation, and 6 bits per symbol for 64QAM modulation. Also, depending on system modifications, other modulation schemes more than 256QAM may be used.

Figure 3B:
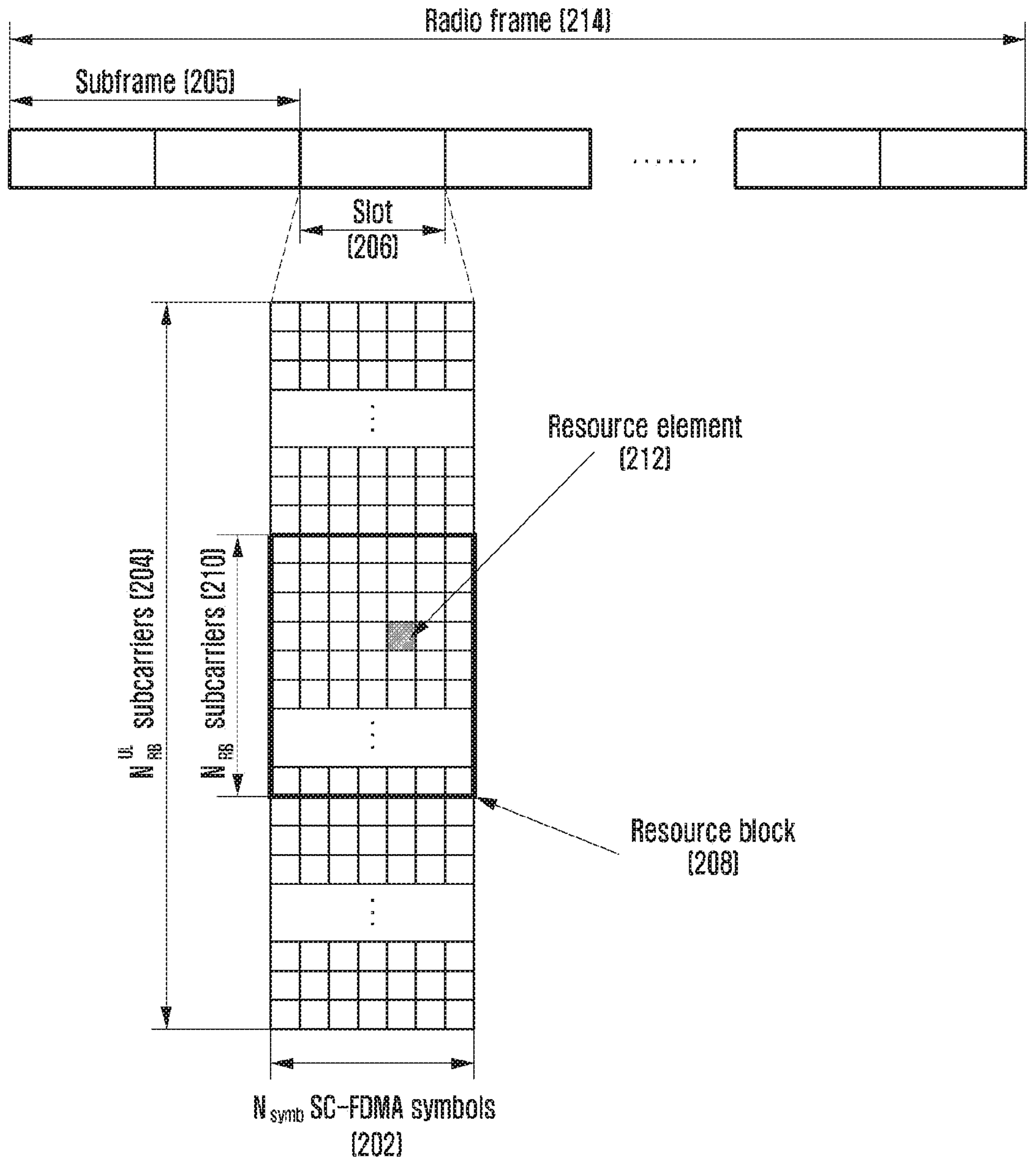
FIG. 3B is a diagram illustrating an uplink time-frequency domain transmission structure of an LTE or LTE-A system.

FIG. 3B is a diagram illustrating a basic structure of time-frequency domain which is a radio resource region for transmission of data or control channel in the uplink of the LTE-A system.

In FIG. 3B, the horizontal axis represents the time domain, and the vertical axis represents the frequency domain. The minimum transmission unit in the time domain is an SC-FDMA symbol 202. $N_{symb}^{UL}$ SC-FDMA symbols constitute one slot 206, and two slots constitute one subframe 205. The minimum transmission unit in the frequency domain is a subcarrier, and the entire system transmission bandwidth 204 is composed of a total of $N_{BW}$ subcarriers. $N_{BW}$ has a value proportional to the system transmission band.

In the time-frequency domain, a basic unit of resources is a resource element (RE) 212, which may be defined by an SC-FDMA symbol index and a subcarrier index. A resource block (RB) pair 208 is defined as consecutive $N_{symb}^{UL}$ SC-FDMA symbols in the time domain and consecutive $N_{SC}^{RB}$ subcarriers in the frequency domain. Thus, one RB is composed of $N_{symb}^{UL}$ $N_{SC}^{RB}$ REs. Normally, the minimum transmission unit of data or control information is the RB unit. In case of PUCCH, it is mapped to a frequency region corresponding to 1 RB and transmitted during one subframe.

In the LTE system, a timing relationship between a PDSCH, which is a physical channel for downlink data transmission, or a PDCCH/EPDDCH including a semi-persistent scheduling release (SPS release), and a PUCCH or PUSCH which is an uplink physical channel for transmission of corresponding HARQ ACK/NACK is defined. For example, in an LTE system that operates in a frequency division duplex (FDD), the HARQ ACK/NACK corresponding to the PDSCH or PDCCH/EPDCCH including SPS release transmitted in the n−4th subframe is transmitted as the PUCCH or PUSCH in the nth subframe.

In the LTE system, the downlink HARQ adopts an asynchronous HARQ scheme in which a data retransmission time point is not fixed. That is, when the base station receives the HARQ NACK from the terminal as feedback to the initial transmission data, the base station freely determines a transmission time point of retransmission data by a scheduling operation. The terminal decodes received data for HARQ operation, buffers data determined to be an error, and then performs combining with retransmission data.

The HARQ ACK/NACK information of the PDSCH transmitted in the subframe n−k is transmitted from the terminal to the base station in the subframe n via the PUCCH or PUSCH. Here, k is defined differently according to FDD or TDD of the LTE system and its subframe setting.

For example, in case of the FDD LTE system, the k is fixed to 4. On the other hand, in case of the TDD LTE system, the k may be varied according to the subframe setting and the subframe number. Also, in case of data transmission through a plurality of carriers, the value of k may be applied differently depending on TDD configuration of each carrier. In case of the TDD, the value of k is determined according to TDD UL/DL configuration as shown in Table 3-2 below.

TABLE 3-2

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, contrary to the downlink HARQ, the uplink HARQ adopts a synchronous HARQ scheme in which the data transmission time point is fixed. That is, an uplink/downlink timing relationship among a physical uplink shared channel (PUSCH) which is a physical channel for uplink data transmission, a downlink control channel (PDCCH) which precedes the PUSCH, and a physical hybrid indicator channel (PHICH) which is a physical channel for transmission of downlink HARQ ACK/NACK corresponding to the PUSCH may be transmitted and received in accordance with the following rule.

Upon receiving the PDCCH including uplink scheduling control information or the PHICH for transmission of downlink HARQ ACK/NACK from the base station in the subframe n, the terminal transmits uplink data corresponding to the control information in the subframe n+k through the PUSCH. Here, k is defined differently according to FDD or TDD of the LTE system and its setting. For example, in case of the FDD LTE system, k is fixed to 4. On the other hand, in case of the TDD LTE system, k may be varied according to the subframe setting and the subframe number. Also, in case of data transmission through a plurality of carriers, the value of k may be applied differently depending on TDD configuration of each carrier. In case of the TDD, the value of k is determined according to TDD UL/DL configuration as shown in Table 3-3 below.

TABLE 3-3

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Meanwhile, the HARQ-ACK information of the PHICH transmitted in the subframe i is related to the PUSCH transmitted in the subframe i−k. In case of the FDD system, k is given as 4. That is, the HARQ-ACK information of the PHICH transmitted in the subframe i in the FDD system is related to the PUSCH transmitted in the subframe i−4. In case of the TDD system, if a terminal having no configuration of enhanced interference mitigation and traffic adaptation (EIMTA) is configured for only one serving cell or has the same TDD UL/DL configuration, the value of k may be given as shown in Table 3-4 when the TDD UL/DL configuration is 1 to 6.

TABLE 3-4

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

That is, for example, in the TDD UL/DL configuration 1, the PHICH transmitted in the subframe 6 may be the HARQ-ACK information of the PUSCH transmitted in the subframe 2 which is four subframes before.

In case of the TDD UL/DL configuration 0, if the HARQ-ACK is received in the PHICH resource corresponding to $I_{PHICH}$=0, the PUSCH indicated by the HARQ-ACK information is what transmitted in the subframe i−k, and the value of k is given according to Table 3-4. Also, in case of the TDD UL/DL configuration 0, if the HARQ-ACK is received in the PHICH resource corresponding to $I_{PHICH}$=1, the PUSCH indicated by the HARQ-ACK information is what transmitted in the subframe i−6.

The description of the wireless communication system is based on the LTE system, but this disclosure is not limited to the LTE system and may be applied to various wireless communication systems such as NR and 5G. Also, in case of being applied to other wireless communication systems, the value of may be changed even in a system using a modulation scheme corresponding to FDD.

Figure 3C:
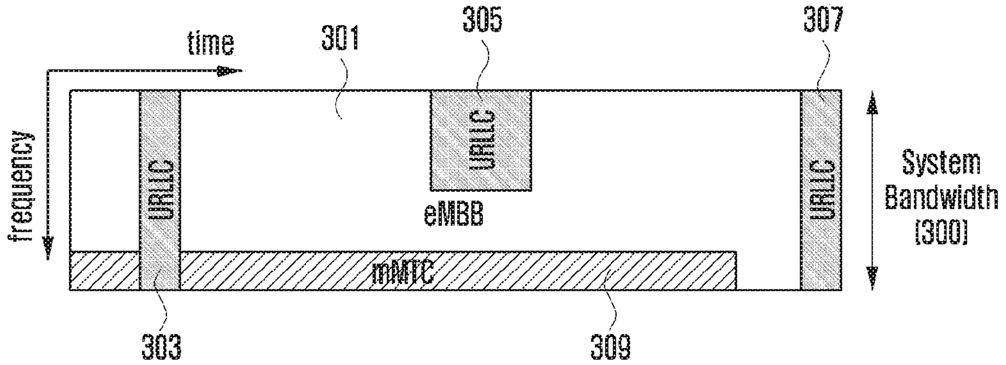
FIG. 3C is a diagram illustrating data for eMBB, URLLC, and mMTC allocated in frequency-time resources in a communication system.
Figure 3D:
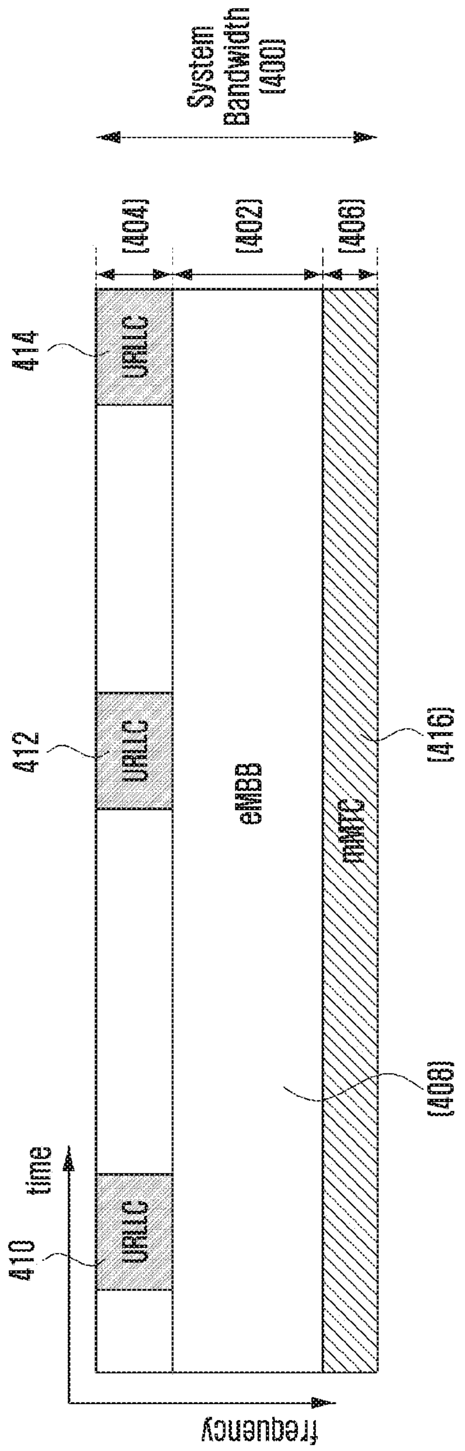
FIG. 3D is a diagram illustrating data for eMBB, URLLC, and mMTC allocated in frequency-time resources in a communication system.

FIGS. 3C and 3D show data for eMBB, URLLC, and mMTC, which are services considered in the 5G or NR system, allocated in frequency-time resources.

Referring to FIGS. 3C and 3D, frequency and time resources are allocated for transmission of information in each system.

First, FIG. 3C shows data for the eMBB, the URLLC, and the mMTC are allocated in the entire system frequency band 300. If the URLLC data 303, 305 and 307 are generated and need to be transmitted while the eMBA 301 and the mMTC 309 are allocated and transmitted in a specific frequency band, already-allocated portions for the eMBB 301 and the mMTC 309 may be emptied, or the URLLC data 303, 305 and 307 may be transmitted without transmitting the eMBB 301 and the mMTC 309.

Since the URLLC needs to reduce the delay time, the URLLC data 303, 305 and 307 may be allocated to portions of the resource to which the eMBB 301 is allocated. Of course, when the URLLC is further allocated and transmitted in the resource to which the eMBB is allocated, the eMBB data may not be transmitted in overlapped frequency-time resources, and thus the transmission performance of the eMBB data may be lowered. That is, in the above case, a failure in eMBB data transmission may occur due to URLLC allocation.

In FIG. 3D, the entire system frequency band 400 may be divided into subbands 402, 404 and 406, each of which may be used for transmitting services and data. Information related to configuration of such subbands may be predetermined or transmitted to the terminal by the base station through the upper signaling.

Alternatively, the base station or network node may arbitrarily configure the subbands and provide services to the terminal without separate transmission of subband configuration information. In FIG. 3D, the subband 402 is used for eMBB data transmission, the subband 404 is used for URLLC data transmission, and the subband 406 is used for mMTC data transmission.

In embodiments, the length of a transmission time interval (TTI) used in the URLLC transmission may be shorter than the TTI length used in the eMBB or mMTC transmission. In addition, a response of information related to the URLLC can be transmitted faster than the eMBB or mMTC, so that information can be transmitted and received with a low delay.

Figure 3E:
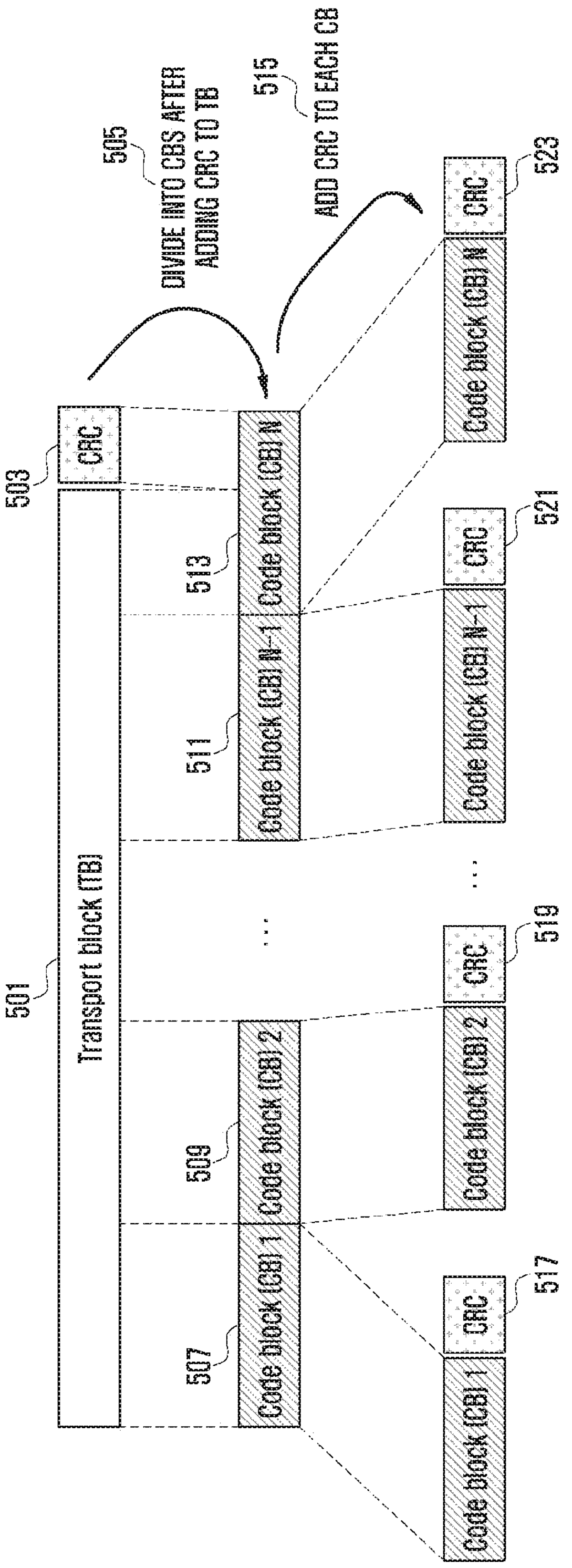
FIG. 3E is a diagram illustrating a structure of dividing one transport block into several code blocks and adding CRC according to an embodiment.

FIG. 3E is a diagram illustrating a structure of dividing one transport block into several code blocks and adding CRC according to an embodiment.

Referring to FIG. 3E, a cyclic redundancy check (CRC) 503 may be added to the last or first part of one transport block (TB) 501 to be transmitted in uplink or downlink. The CRC may have 16 bits, 24 bits, a predetermined number of bits, or a variable number of bits depending on a channel condition, and may be used to determine whether channel coding is successful.

The TB 501 with the CRC 503 added may be divided (505) into a plurality of code blocks (CBs) 507, 509, 511, and 513. The code block may have a predetermined maximum size. In this case, the last code block 513 may be smaller than the other code blocks, or may be adjusted to have the same length by adding 0, 1, or a random value.

CRCs 517, 519, 521, and 523 may be added (515) to the divided code blocks, respectively. The CRC may have 16 bits, 24 bits, or a predetermined number of bits, and may be used to determine whether channel coding is successful. However, the CRC 503 added to the TB and the CRCs 517, 519, 521, and 523 added to the code blocks may be omitted depending on the type of a channel code to be applied to the code block. For example, when a low-density parity-check (LDPC) code rather than a turbo code is applied to the code block, the CRCs 517, 519, 521, and 523 to be inserted to the respective code blocks may be omitted. Alternatively, even when the LDPC is applied, the CRCs 517, 519, 521, and 523 may be added to the code blocks. Also, when polar codes are used, such CRCs may be added or omitted.

Figure 3F:
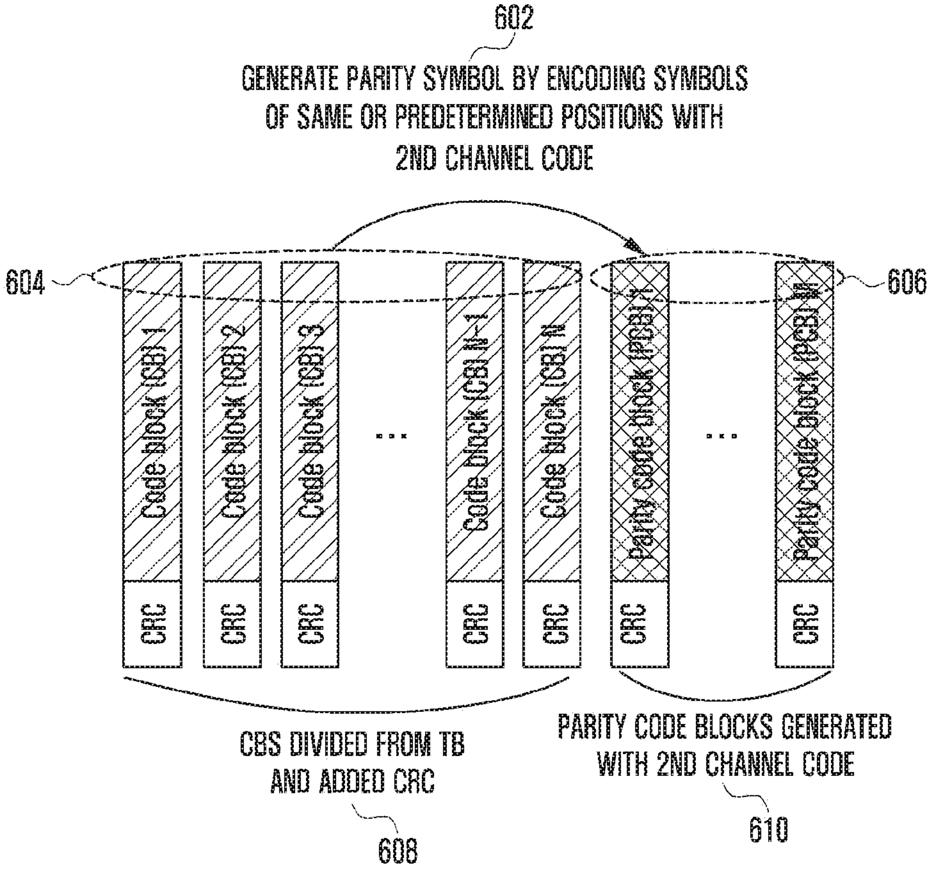
FIG. 3F is a diagram illustrating a transmission scheme using an outer code according to an embodiment.
Figure 3G:
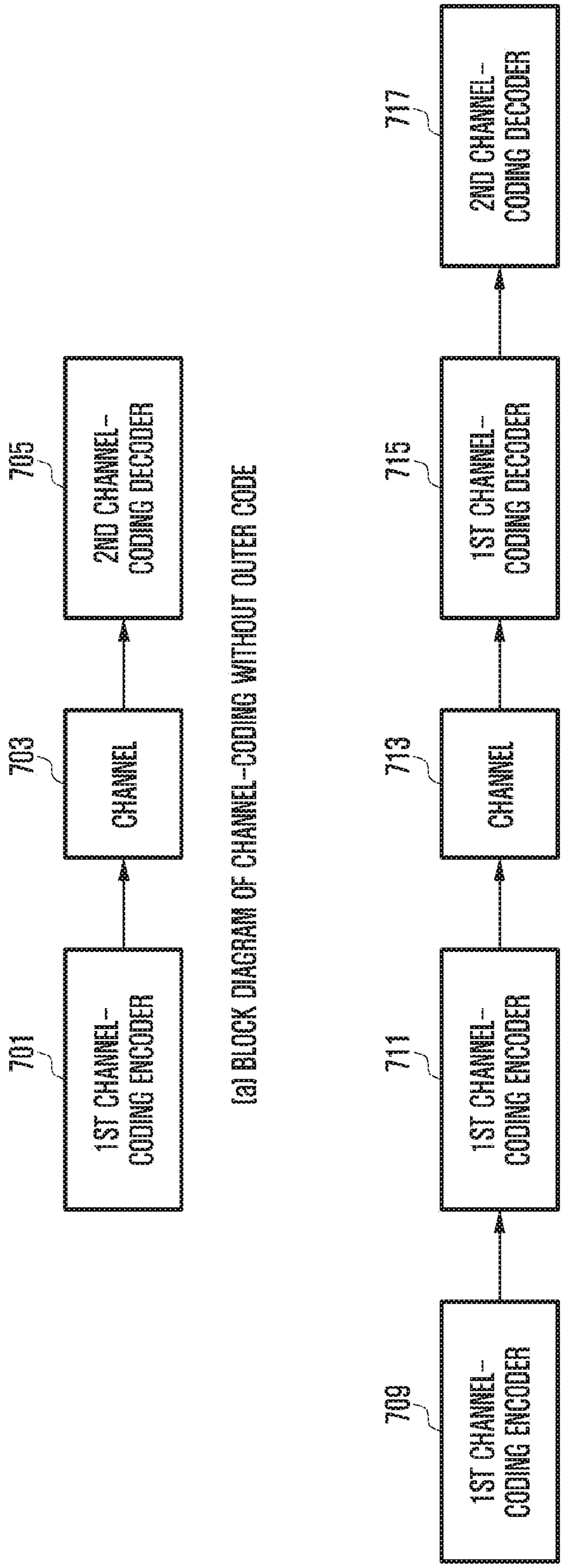
FIG. 3G is a block diagram illustrating a communication system with or without an outer code applied according to an embodiment.

FIG. 3F is a diagram illustrating a transmission scheme using an outer code, and FIG. 3G is a block diagram illustrating the structure of a communication system using the outer code.

Referring to FIGS. 3F and 3G, a method of transmitting a signal by using an outer code is as follows.

In FIG. 3F, one transport block is divided into a plurality of code blocks, and bits or symbols 604 located at the same position in the respective code blocks are encoded with a second channel code to generate (602) parity bits or symbols 606. Thereafter, CRCs may be added to the respective code blocks and the parity code blocks generated by encoding with the second channel code, respectively (608, 610). The addition or not of the CRC may be determined depending on the type of the channel code. For example, if the turbo code is used as the first channel code, the CRCs 608 and 610 are added, but then the respective code blocks and parity code blocks may be encoded with the first channel code.

When the outer code is used, data to be transmitted passes through a second channel-coding encoder 709. The channel code used for the second channel-coding may be, for example, a Reed-Solomon code, a Bose-Chaudhuri-Hocquenghem code, a Raptor code, or a parity bit generation code. The bits or symbols passed through the second channel-coding encoder 709 pass through a first channel-coding encoder 711. The channel code used for the first channel-coding includes a convolutional code, an LDPC code, a turbo code, and a polar code.

When the channel-coded symbols are received by the receiver through a channel 713, the receiver may sequentially operate a first channel-coding decoder 715 and a second channel-coding decoder 717, based on the received signal. The first channel-coding decoder 715 and the second channel-coding decoder 717 may perform operations corresponding to the first channel-coding encoder 711 and the second channel-coding encoder 709, respectively.

On the other hand, in case of using no outer code, only the first channel-coding encoder 711 and the first channel-coding decoder 705 are used in the transmitter and the receiver, respectively, and the second channel-coding encoder and the second channel-coding decoder are not used. Even when the outer code is not used, the first channel-coding encoder 711 and the first channel-coding decoder 705 may be configured in the same manner as in a case where the outer code is used.

Hereinafter, the eMBB service will be referred to as a first type service, and the eMBB data will be referred to as first type data. The first type service or the first type data is not limited to the eMBB, and may be applicable to a case where high-speed data transmission is required or a broadband transmission is performed. In addition, the URLLC service will be referred to as a second type service, and the URLLC data will be referred to as second type data. The second type service or the second type data is not limited to the URLLC, and may be applicable to a case where low-latency or high-reliable transmission is needed or to other system that requires both low latency and high reliability.

In addition, the mMTC service will be referred to as a third type service, and the mMTC data will be referred to as a third type data. The third type service or the third type data is not limited to the mMTC, and may be applied to a case where a low speed, wide coverage, or low power is required. Further, in describing embodiments, it can be understood that the first type service includes or does not include the third type service.

The structure of the physical layer channel used for each type in order to transmit the above-mentioned three services or data may be different. For example, at least one of a transmission time interval (TTI) length, a frequency resource allocation unit, a control channel structure, and a data mapping method may be different.

Although three services and three kinds of data are described above, more types of services and corresponding data may exist. Even in this case, the present disclosure may be applied.

To describe the method and apparatus proposed in embodiments, the terms physical channel and signal used in the conventional LTE or LTE-A system may be used. However, the present disclosure can be applied to wireless communication systems other than the LTE and LTE-A systems.

In embodiments, transmission and reception operations of the terminal and the base station are defined to transmit the first, second and third type services, or data, and a method for operating terminals that receive scheduling of different types of services or data in the same system is proposed. In the present disclosure, the first, second and third type terminals are respectively referred to as terminals that receive scheduling of the first, second and third type services or data. In embodiments, the first, second and third type terminals may be the same terminal or different terminals.

In the following embodiments, at least one of a PHICH, an uplink scheduling grant signal, and a downlink data signal is referred to as a first signal. Also, at least one of an uplink data signal for the uplink scheduling grant and an HARQ ACK/NACK for the downlink data signal is referred to as a second signal. Among signals transmitted from the base station to the terminal, a signal expecting a response from the terminal may be a first signal, and such a response signal of the terminal in response to the first signal may be a second signal. Also, in embodiments, the service type of the first signal may be at least one of the eMBB, the URLLC, and the mMTC, and the second signal may also correspond to at least one of such services.

For example, in the LTE and LTE-A systems, the PUCCH format 0 or 4 and the PHICH may be the first signal, and the corresponding second signal may be the PUSCH. For example, in the LTE and LTE-A systems, the PDSCH may be the first signal, and the PUCCH or PUSCH including HARQ ACK/NACK information of the PDSCH may be the second signal.

In the following embodiments, the TTI length of the first signal may indicate the length of time for transmission of the first signal as a time value related to the first signal transmission. Also, the TTI length of the second signal may indicate the length of time for transmission of the second signal as a time value related to the second signal transmission, and the TTI length of the third signal may indicate the length of time for transmission of the third signal as a time value related to the third signal transmission. In addition, the second signal transmission timing is information about when the terminal transmits the second signal and when the base station receives the second signal, and may be referred to as a second signal transmission/reception timing.

In the following description, assuming that, when the base station transmits the first signal in the nth TTI, the terminal transmits the second signal in the (n+k)th TTI, notifying the timing of transmitting the second signal to the terminal by the base station means notifying the value of k. Also, assuming that, when the base station transmits the first signal in the nth TTI, the terminal transmits the second signal in the (n+4+a)th TTI, notifying the timing of transmitting the second signal to the terminal by the base station means notifying the offset value of a. The offset may be defined by various methods such as n+3+a and n+5+a in place of the n+4+a.

The contents of the present disclosure are also applicable to the FDD and TDD systems.

In this disclosure, upper signaling refers to a method of transmitting a signal from the base station to the terminal through a downlink data channel of the physical layer or transmitting a signal from the terminal to the base station through an uplink data channel of the physical layer. The upper signaling may also be referred to as radio resource control (RRC) signaling, packet data convergence protocol (PDCP) signaling, or medium access control (MAC) control element (MAC CE).

Although this disclosure describes a method of determining the timing of transmitting the second signal after the terminal or the base station receives the first signal, there may be various methods of sending the second signal. For example, the timing that, after receiving the PDSCH (downlink data), the terminal sends the HARQ ACK/NACK information corresponding to the PDSCH to the base station follows the method described in this disclosure, but a method for selecting the PUCCH format, selecting the PUCCH resource, or mapping the HARQ ACK/NACK information to the PUSCH may be determined in another manner. For example, the method for selecting the PUCCH format, selecting the PUCCH resource, or mapping the HARQ ACK/NACK information to the PUSCH may be determined based on the LTE standard.

In this disclosure, a latency (or delay) reduced terminal, a terminal configured with latency reduction, a terminal having a reduced processing time, or a terminal configured with a reduced processing time may be used interchangeably.

3-1st Embodiment

In the 3-1st embodiment, a method for determining a timing of transmitting a related PUSCH when the terminal receives a PHICH or a PDCCH/EPDCCH including a DCI for delivering uplink scheduling information will be described. The PHICH may not be used if there is a latency reduction in transmission to the terminal configured with latency reduction, and this case may be applied when the DCI for delivering the uplink scheduling information is received. In this case, since the HARQ ACK-NACK information for uplink transmission with latency reduction is not received via the PHICH, the terminal can omit PHICH decoding in the corresponding subframe.

In case where the TDD UL/DL configuration is one of 1 to 6, if the terminal receives the PHICH or the PDCCH/EPDCCH including the DCI for delivering the uplink scheduling information in the subframe n, the terminal transmits a related PUSCH in the subframe n+k, where k is given in Table 3-5.

TABLE 3-5

| TDD UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | 3 | 3 | | | | 3 | 3 | | | |
| 1 | 3 | 6 | | | | 3 | 6 | | | |
| 2 | | | | | 3 | | | | | 3 |
| 3 | 3 | 3 | | | | | | | | 3 |
| 4 | 3 | | | | | | | | | 3 |
| 5 | | | | | | | | | | 3 |
| 6 | 3 | 6 | | | | 3 | 6 | | | 3 |

In case of the TDD UL/DL configuration 0, if the PDCCH/EPDCCH with the most significant bit (MSB) of the UL index of the uplink DCI format being 1 is received, if the PHICH is received in the subframe 1 or 6, or if the PHICH is received in the subframe 0 or 5 at a position where the $I_{PHICH}$ resource is 0, the value of k may be determined according to Table 3-5. In case of the TDD UL/DL configuration 0, if the PDCCH/EPDCCH with the least significant bit (LSB) of the UL index of the uplink DCI format being 1 is received, or if the PHICH is received in the subframe 0 or 5 at a position where the $I_{PHICH}$ resource is 1, the value of k may be determined to be 7. If both the MSB and the LSB of the UL index of the uplink DCI format are 1, it is possible to transmit the PUSCH in the subframe n+k in both cases where the k is 7 and where the k follows Table 3-5.

The method in case of the TDD UL/DL configuration 0 is not limited to the above method, and may be applied through a slight modification. For example, in case of the TDD UL/DL configuration 0, if the PDCCH/EPDCCH with the MSB of the UL index of the uplink DCI format being 1 is received, if the PHICH is received in the subframe 1 or 6, or if the PHICH is received in the subframe 0 or 5 at a position where the $I_{PHICH}$ resource is 1, the value of k may be determined according to Table 3-5.

In case of the TDD UL/DL configuration 0, if the PDCCH/EPDCCH with the LSB of the UL index of the uplink DCI format being 1 is received, or if the PHICH is received in the subframe 0 or 5 at a position where the $I_{PHICH}$ resource is 0, the value of k may be determined to be 7. As another example, in case of the TDD UL/DL configuration 0, if the PDCCH/EPDCCH with the MSB of the UL index of the uplink DCI format being 1 is received, if the PHICH is received in the subframe 0 or 5, or if the PHICH is received in the subframe 1 or 6 at a position where the $I_{PHICH}$ resource is 1, the value of k may be determined according to Table 3-5.

In case of the TDD UL/DL configuration 0, if the PDCCH/EPDCCH with the LSB of the UL index of the uplink DCI format being 1 is received, or if the PHICH is received in the subframe 1 or 6 at a position where the $I_{PHICH}$ resource is 0, the value of k may be determined to be 6.

3-2nd Embodiment

In the 3-2nd embodiment, a method for determining a timing of transmitting a related PUSCH when the terminal receives a PHICH or a PDCCH/EPDCCH including a DCI for delivering uplink scheduling information will be described. The PHICH may not be used if there is a latency reduction in transmission to the terminal configured with latency reduction, and this case may be applied when the DCI for delivering the uplink scheduling information is received. In this case, since the HARQ ACK-NACK information for uplink transmission with latency reduction is not received via the PHICH, the terminal can omit PHICH decoding in the corresponding subframe.

When the terminal receives the PHICH or the PDCCH/EPDCCH including the DCI for delivering the uplink scheduling information in the subframe n, the terminal transmits the PUSCH in the subframe n+k, if the subframe n+k is an uplink transmittable subframe, where the value of k is greater than 2. For example, the terminal that receives the uplink DCI in the subframe n transmits the PUSCH in a subframe capable of uplink transmission from n+3. If n+3 is a downlink subframe and if n+4 is capable of uplink transmission, the PUSCH is transmitted in the subframe n+4.

3-3rd Embodiment

In the 3-3rd embodiment, a method for determining a timing of transmitting a related PUSCH when the terminal receives a PHICH or a PDCCH/EPDCCH including a DCI for delivering uplink scheduling information will be described. The PHICH may not be used if there is a latency reduction in transmission to the terminal configured with latency reduction, and this case may be applied when the DCI for delivering the uplink scheduling information is received. In this case, since the HARQ ACK-NACK information for uplink transmission with latency reduction is not received via the PHICH, the terminal can omit PHICH decoding in the corresponding subframe.

In case where the TDD UL/DL configuration is one of 1 to 6, if the terminal receives the PHICH or the PDCCH/EPDCCH including the DCI for delivering the uplink scheduling information in the subframe n, the terminal transmits a related PUSCH in the subframe n+k, where k is given in Table 3-6.

TABLE 3-6

| TDD UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 2 | | | | 2 | 2 | | | |
| 1 | 2 | 2 | | | | 2 | 2 | | | |
| 2 | 2 | | | | | 2 | | | | |
| 3 | 3 | 3 | | | | | | | | 3 |
| 4 | 2 | 2 | | | | | | | | |
| 5 | 2 | | | | | | | | | |
| 6 | 3 | 3 | | | | 2 | 2 | | | 3 |

In case of the TDD UL/DL configuration 0, if the PDCCH/EPDCCH with the MSB of the UL index of the uplink DCI format being 1 is received, if the PHICH is received in the subframe 0 or 5, or if the PHICH is received in the subframe 1 or 6 at a position where the $I_{PHICH}$ resource is 0, the value of k may be determined according to Table 3-6.

In case of the TDD UL/DL configuration 0, if the PDCCH/EPDCCH with the LSB of the UL index of the uplink DCI format being 1 is received, or if the PHICH is received in the subframe 1 or 6 at a position where the $I_{PHICH}$ resource is 1, the value of k may be determined to be 3. If both the MSB and the LSB of the UL index of the uplink DCI format are 1, it is possible to transmit the PUSCH in the subframe n+k in both cases where the k is 3 and where the k follows Table 3-6.

The method in case of the TDD UL/DL configuration 0 is not limited to the above method, and may be applied through a slight modification.

3-4th Embodiment

In the 3-4th embodiment, a method for determining a timing of transmitting a related PUSCH when the terminal receives a PHICH or a PDCCH/EPDCCH including a DCI for delivering uplink scheduling information will be described. The PHICH may not be used if there is a latency reduction in transmission to the terminal configured with latency reduction, and this case may be applied when the DCI for delivering the uplink scheduling information is received. In this case, since the HARQ ACK-NACK information for uplink transmission with latency reduction is not received via the PHICH, the terminal can omit PHICH decoding in the corresponding subframe.

When the terminal receives the PHICH or the PDCCH/EPDCCH including the DCI for delivering the uplink scheduling information in the subframe n, the terminal transmits the PUSCH in the subframe n+k, if the subframe n+k is an uplink transmittable subframe, where the value of k is greater than 1. For example, the terminal that receives the uplink DCI in the subframe n transmits the PUSCH in a subframe capable of uplink transmission from n+2. If n+2 is a downlink subframe and if n+3 is capable of uplink transmission, the PUSCH is transmitted in the subframe n+3.

The 3-1st embodiment and the 3-3rd embodiment may be used according to configuration of the terminal provided by the base station or used according to information delivered in the DCI. In addition, the 3-2nd embodiment and the 3-4th embodiment may be used according to configuration of the terminal provided by the base station or be used according to information delivered in the DCI. Also, in the 3-1st to 3-4th embodiments, the base station may attempt PUSCH decoding in the subframe where the terminal transmits the PUSCH.

Figure 3H:
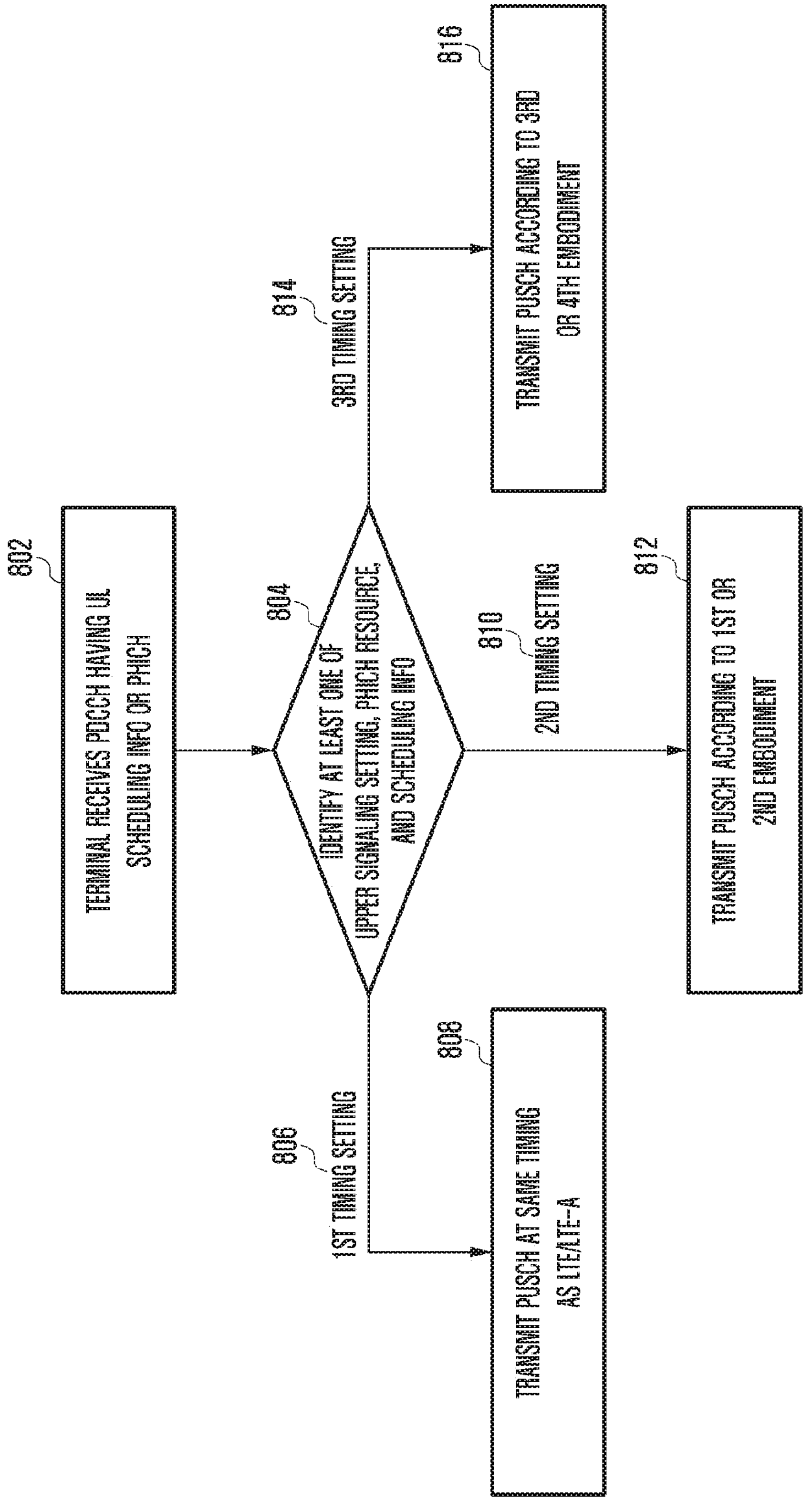
FIG. 3H is a diagram illustrating terminal operations according to the 3-1st, 3-2nd, 3-3rd, and 3-4th embodiments.
Figure 31:
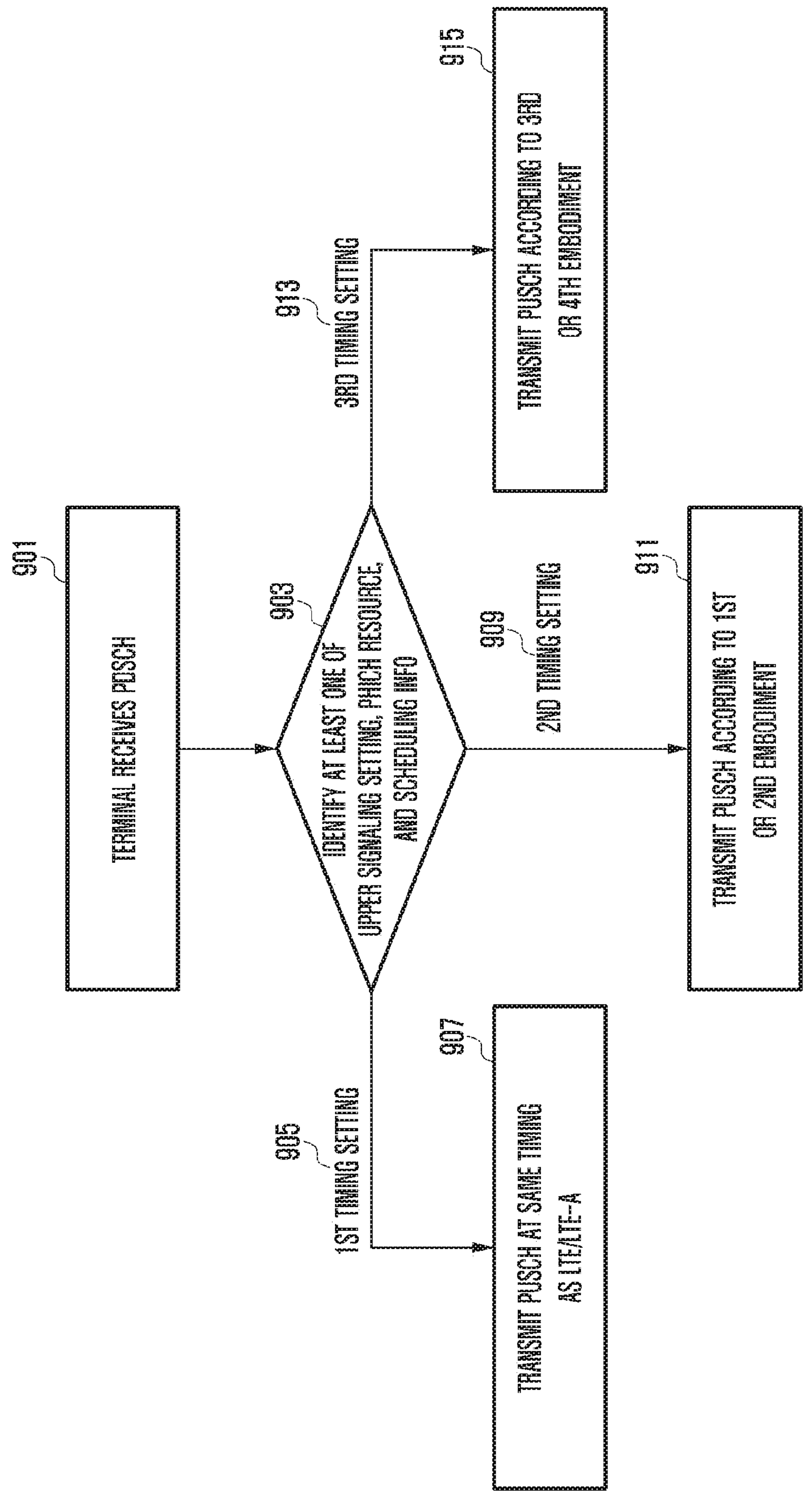

FIG. 3H illustrates the operation of the terminal. When the terminal receives the PHICH or the PDCCH/EPDCCH including the UL scheduling information, the terminal identifies at step 804 at least one of the upper signaling setting, the PHICH resource location, and the DCI information. In FIG. 3H, the first timing setting 806 is to use the PUSCH transmission timing of the conventional LTE/LTE-A, and may indicate a case where the minimum signal processing time of the terminal is about 3 ms including a TA value. Therefore, when the terminal identifies the first timing setting 806, it is equal to the PUSCH transmission timing of the conventional LTE/LTE-A. For example, in the FDD, if the uplink scheduling information is received via the PDCCH in the subframe n, the PUSCH is transmitted in the subframe n+4 at step 808.

In FIG. 3H, the second timing setting 810 may indicate a case where the minimum signal processing time of the terminal is about 2 ms including the TA value. Therefore, when the terminal identifies the second timing setting 810, the timing is determined according to the 3-1st or 3-2nd embodiment. For example, in the FDD, the uplink scheduling information is received via the PDCCH in the subframe n, the PUSCH is transmitted in the subframe n+3 at step 812.

In FIG. 3H, the third timing setting 814 may indicate a case where the minimum signal processing time of the terminal is about 1 ms including the TA value. Therefore, when the terminal identifies the third timing setting 814, the timing is determined according to the 3-3rd or 3-4th embodiment. For example, in the FDD, the uplink scheduling information is received via the PDCCH in the subframe n, the PUSCH is transmitted in the subframe n+2 at step 816. In this case, the terminal or the base station may support only one of the second timing setting 810 and the third timing setting 814.

In addition, the 3-1st and 3-3rd embodiments may be implemented in combination. For example, when the terminal receives the PDCCH/EPDCCH having the DCI for delivering the uplink scheduling information, the transmission timing of the PUSCH is determined as in the 3-1st embodiment. When the terminal receives the PHICH, the transmission timing of the PUSCH is determined as in the 3-3rd embodiment. That is, in case of uplink scheduling using the DCI in the subframe n, the terminal can transmit the PUSCH in the subframe n+3 or later, and in case of uplink retransmission using the PHICH, the terminal can transmit the PUSCH in the subframe n+2 or later.

In the 3-1st to 3-4th embodiments, the PHICH denotes information corresponding to the HARQ NACK for uplink transmission. Therefore, receiving the PHICH may be interpreted to mean that the terminal needs to retransmit.

3-5th Embodiment

In the 3-5th embodiment, a method of determining a timing when the terminal receiving downlink data PDSCH transmission delivers HARQ ACK/NACK for the PDSCH via an uplink channel such as the PUCCH or the PUSCH.

The HARQ ACK/NACK information for the PDSCH transmitted in the subframe n−k is transmitted in the subframe n, and the k may be changed according to the TDD UL/DL configuration and the subframe location as shown in Table 3-7. In this embodiment, the PDSCH may be a PDSCH scheduled by the PDCCH/EPDCCH or a PDSCH configured with SPS.

TABLE 3-7

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 6, 4, 3 | — | — | — | — | 7, 6, 4, 3 | — | — |
| 3 | — | — | 7, 6, 5, 4, 3 | 3 | 3 | — | — | — | — | — |
| 4 | — | — | 11, 8, 7, 6, 5, 4, 3 | 3 | — | — | — | — | — | — |
| 5 | — | — | 12, 9, 8, 7, 5, 4, 3, 11, 6 | — | — | — | — | — | — | — |
| 6 | — | — | 6, 3 | 3 | 3 | — | — | 6 | 3 | — |

The order of numbers written in the above table may be modified and applied differently.

In Table 3-7, multiple k values mean that the HARQ ACK/NACK information for one or more PDSCHs can be transmitted together in the subframe n. For example, in the subframe 2 in case of UL/DL configuration 1, the HARQ ACK/NACK information corresponding to the PDSCHs transmitted before 6 subframes and before 3 subframes is transmitted.

Table 3-7 may be modified to Table 3-7a below.

TABLE 3-7a

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | — | 3 | 3 | — | — | — | 3 | 3 |
| 1 | — | — | 6, 3 | 3 | — | — | — | 6, 3 | 3 | — |
| 2 | — | — | 7, 6, 4, 3 | — | — | — | — | 7, 6, 4, 3 | — | — |
| 3 | — | — | 7, 6, 5 | 5, 4 | 4, 3 | — | — | — | — | — |
| 4 | — | — | 11, 8, 7, 6 | 6, 5, 4, 3 | — | — | — | — | — | — |
| 5 | — | — | 12, 9, 8, 7, 5, 4, 3, 11, 6 | — | — | — | — | — | — | — |
| 6 | — | — | 6 | 4 | 4 | — | — | 6 | 3 | — |

The order of numbers written in the above table may be modified and applied differently.

3-6th Embodiment

In the 3-6th embodiment, a method of determining a timing when the terminal receiving downlink data PDSCH transmission delivers HARQ ACK/NACK for the PDSCH via an uplink channel such as the PUCCH or the PUSCH.

When the base station transmits the PDSCH to the terminal in the subframe n, the terminal transmits the HARQ ACK/NACK information related to the PDSCH in the subframe n+k via the PUCCH or PUSCH, if the subframe n+k is an uplink transmittable subframe, where the value of k is greater than 2. For example, the terminal that receives the PDSCH in the subframe n transmits the HARQ ACK/NACK information for the PDSCH via the PUCCH or PUSCH in the subframe capable of uplink transmission from n+3. If n+3 is a downlink subframe and if n+4 is capable of uplink transmission, the HARQ ACK/NACK information is transmitted in the subframe n+4 via the PUCCH or PUSCH.

3-7th Embodiment

In the 3-7th embodiment, a method of determining a timing when the terminal receiving downlink data PDSCH transmission delivers HARQ ACK/NACK for the PDSCH via an uplink channel such as the PUCCH or the PUSCH.

The HARQ ACK/NACK information for the PDSCH transmitted in the subframe n−k is transmitted in the subframe n, and the k may be changed according to the TDD UL/DL configuration and the subframe location as shown in Table 3-8. In this embodiment, the PDSCH may be a PDSCH scheduled by the PDCCH/EPDCCH or a PDSCH configured with SPS.

TABLE 3-8

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 6, 4, 3, 2 | — | — | — | — | 6, 4, 3, 2 | — | — |
| 3 | — | — | 7, 6, 5, 4, 3, 2 | 2 | — | — | — | — | — | — |
| 4 | — | — | 8, 7, 6, 5, 4, 3, 2 | 2 | — | — | — | — | — | — |
| 5 | — | — | 9, 8, 7, 5, 4, 3, 11, 6, 2 | — | — | — | — | — | — | — |
| 6 | — | — | 3, 2 | 2 | — | — | — | 2 | 2 | — |

The order of numbers written in the above table may be modified and applied differently.

In Table 3-8, multiple k values mean that the HARQ ACK/NACK information for one or more PDSCHs can be transmitted together in the subframe n. For example, in the subframe 2 in case of UL/DL configuration 1, the HARQ ACK/NACK information corresponding to the PDSCHs transmitted before 3 subframes and before 2 subframes is transmitted.

Table 3-8 may be modified to Table 3-8a below.

TABLE 3-8a

| UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 6, 4, 3, 2 | — | — | — | — | 6, 4, 3, 2 | — | — |
| 3 | — | — | 7, 6, 5, 4 | 4, 3, 2 | — | — | — | — | — | — |
| 4 | — | — | 8, 7, 6, 5 | 5, 4, 3, 2 | — | — | — | — | — | — |
| 5 | — | — | 9, 8, 7, 5, 4, 3, 11, 6, 2 | — | — | — | — | — | — | — |
| 6 | — | — | 3 | 3 | 3 | — | — | 2 | 2 | — |

The order of numbers written in the above table may be modified and applied differently.

3-8th Embodiment

In the 3-8th embodiment, a method of determining a timing when the terminal receiving downlink data PDSCH transmission delivers HARQ ACK/NACK for the PDSCH via an uplink channel such as the PUCCH or the PUSCH.

When the base station transmits the PDSCH to the terminal in the subframe n, the terminal transmits the HARQ ACK/NACK information related to the PDSCH in the subframe n+k via the PUCCH or PUSCH, if the subframe n+k is an uplink transmittable subframe, where the value of k is greater than 1. For example, the terminal that receives the PDSCH in the subframe n transmits the HARQ ACK/NACK information for the PDSCH via the PUCCH or PUSCH in the subframe capable of uplink transmission from n+2. If n+2 is a downlink subframe and if n+3 is capable of uplink transmission, the HARQ ACK/NACK information is transmitted in the subframe n+3 via the PUCCH or PUSCH.

The 3-5th embodiment and the 3-7th embodiment may be used according to configuration of the terminal provided by the base station or used according to information delivered in the DCI. In addition, the 3-6th embodiment and the 3-8th embodiment may be used according to configuration of the terminal provided by the base station or be used according to information delivered in the DCI. Also, in the 3-5th to 3-8th embodiments, the base station may attempt PUCCH or PUSCH decoding in the subframe where the terminal transmits the PUCCH or PUSCH including the HARQ ACK/NACK information for the PDSCH.

FIG. 3I illustrates the operation of the terminal. When the terminal receives the PDSCH, the terminal identifies at step 903 at least one of the upper signaling setting and the DCI information. In FIG. 3I, the first timing setting 905 is to use the HARQ ACK/NACK information timing via the PUCCH or PUSCH of the conventional LTE/LTE-A, and may indicate a case where the minimum signal processing time of the terminal is about 3 ms including a TA value. Therefore, when the terminal identifies the first timing setting 905, it is equal to the HARQ ACK/NACK information of the conventional LTE/LTE-A. For example, in the FDD, if the PDSCH is received in the subframe n, the HARQ ACK/NACK information is transmitted through the PUCCH or PUSCH in the subframe n+4 at step 907.

In FIG. 3I, the second timing setting 909 may indicate a case where the minimum signal processing time of the terminal is about 2 ms including the TA value. Therefore, when the terminal identifies the second timing setting 909, the timing is determined according to the 3-5th or 3-6th embodiment. For example, in the FDD, the PDSCH is received in the subframe n, the HARQ ACK/NACK information is transmitted through the PUCCH or PUSCH in the subframe n+3 at step 911.

In FIG. 3I, the third timing setting 913 may indicate a case where the minimum signal processing time of the terminal is about 1 ms including the TA value. Therefore, when the terminal identifies the third timing setting 913, the timing is determined according to the 3-7th or 3-8th embodiment. For example, in the FDD, the PDSCH is received in the subframe n, the HARQ ACK/NACK information is transmitted through the PUCCH or PUSCH in the subframe n+2 at step 915. In this case, the terminal or the base station may support only one of the second timing setting 909 and the third timing setting 913.

3-9th Embodiment

In the 3-9th embodiment, the timing for controlling power used by the terminal for uplink transmission will be described.

A terminal incapable of simultaneously transmitting the PUCCH and the PUSCH can calculate power $P_{PUSCH,c}(i)$ used for PUSCH transmission in the subframe i in a specific serving cell c, as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j)\cdot \\ PL_c + \Delta_{TF,c}(i) + f_c(i) \end{Bmatrix}$$

[dBm]

A terminal capable of simultaneously transmitting the PUCCH and the PUSCH can calculate power $P_{PUSCH,c}(i)$ used for PUSCH transmission in the subframe i in a specific serving cell c, as follows.

$$P_{PUSCH,c}(i) = \min\begin{Bmatrix} 10\log_{10}\left(\hat{P}_{CMAX,c}(i) - \hat{P}_{PUCCH}(i)\right), \\ 10\log_{10}(M_{PUSCH,c}(i)) + P_{O\_PUSCH,c}(j) + \alpha_c(j)\cdot \\ PL_c + \Delta_{TF,c}(i) + f_c(i) \end{Bmatrix}$$

[dBm]

In the above equations, $P_{CMAX,c}(i)$ denotes power set for transmission of the terminal in the subframe i in the serving cell c. $\hat{P}_{CMAX,c}(i)$ denotes a linearly changed value of $P_{CMAX,c}(i)$, and $\hat{P}_{PUCCH}(i)$ denotes a linearly changed value of $P_{PUCCH}(i)$ which is the PUCCH transmission power. $M_{PUSCH,c}(i)$ denotes the number of PRBs allocated to the subframe i for PUSCH transmission in a serving cell c. $P_{O\_PUSCH,c}(j)$ denotes a value formed of parameters delivered through upper signaling. $\alpha_c$ may be delivered from a higher layer as one of values $\alpha_c \in \{0, 0.4, 0.5, 0.6, 0.7, 0.8, 0.9, 1\}$. $P_{LC}$ can be calculated by the terminal as a downlink pathloss estimation value.

$\Delta_{TF,c}(i)=10\log_{10}((2^{BPRE\cdot K_S}-1)\beta_{offset}^{PUSCH})$ is a value that can be determined according to a control signal portion transmitted in the PUSCH. $\delta_{PUSCH,c}$ is a value that can be set according to a transmission power control (TPC) command included in DCI format 0/4 or DCI format 3/3A of the PDCCH or EPDCCH, which can be applied according to the following equation. If it is set to enable cumulative power calculation, equation $f_c(i)=f_c(i-1)+\delta_{PUSCH,c}(i-K_{PUSCH})$ is used. If it is not cumulative setting, equation $f_c(i)\ \delta_{PUSCH,c}(i-K_{PUSCH})$ is used.

The $K_{PUSCH}$ for determining the timing in the above can be transferred via higher signaling. For example, if the minimum signal processing time of the latency reduction terminal is set to be 1 ms, the terminal can assume that the $K_{PUSCH}$ is 2. The $K_{PUSCH}$ of 2 means that the power of the PUSCH to be transmitted in the subframe i is determined according to the power control command delivered in i−2.

Alternatively, an indicator indicating the $K_{PUSCH}$ value may be included in the DCI format in which the power control command is delivered. For example, if the above indicator is 0, the $K_{PUSCH}$ is 2, and if the indicator is 1, the $K_{PUSCH}$ is 3. Information of the $K_{PUSCH}$ value indicated by the indicator of the DCI format may be mapped by various methods.

Although the above example is based on the FDD system, the values indicated in TDD may be provided in Table 3-9, as follows.

TABLE 3-9

| TDD UL/DL | Subframe n | | | | | | | | | |
|---|---|---|---|---|---|---|---|---|---|---|
| configuration | 0 | 1 | 2 | 3 | 4 | 5 | 6 | 7 | 8 | 9 |
| 0 | — | — | 6 | 3 | 3 | — | — | 6 | 3 | 3 |
| 1 | — | — | 3 | 3 | — | — | — | 3 | 3 | — |
| 2 | — | — | 3 | — | — | — | — | 3 | — | — |
| 3 | — | — | 3 | 3 | 3 | — | — | — | — | — |
| 4 | — | — | 3 | 3 | — | — | — | — | — | — |
| 5 | — | — | 3 | — | — | — | — | — | — | — |
| 6 | — | — | 6 | 4 | 4 | — | — | 6 | 3 | — |

In TDD UL/DL configurations 1 to 6, $K_{PUSCH}$ may be determined according to subframe i, based on the above Table. In case of the TDD UL/DL configuration 0, a method of determining the $K_{PUSCH}$ value may be changed according to the 3-1st to 3-4th embodiments.

For example, in case of the TDD UL/DL configuration 0 in the 3-1st embodiment, if the PDCCH/EPDCCH with the most significant bit (MSB) of the UL index of the uplink DCI format being 1 is received, if the PHICH is received in the subframe 1 or 6, or if the PHICH is received in the subframe 0 or 5 at a position where the $I_{PHICH}$ resource is 0, the value of k may be determined according to Table 3-5. In case of the TDD UL/DL configuration 0, if the PDCCH/EPDCCH with the least significant bit (LSB) of the UL index of the uplink DCI format being 1 is received, or if the PHICH is received in the subframe 0 or 5 at a position where the $I_{PHICH}$ resource is 1, the value of k may be determined to be 7. If both the MSB and the LSB of the UL index of the uplink DCI format are 1, it is possible to transmit the PUSCH in the subframe n+k in both cases where the k is 7 and where the k follows Table 3-5. In this case, the determination of the $K_{PUSCH}$ value may be as follows.

In the above example of the 3-1st embodiment, the DCI information for scheduling the PUSCH which can be transmitted in the subframe 3 or 8 may be delivered in the subframe 0 or 5 of the same frame or in the subframe 0 or 5 of the previous frame. Therefore, it is necessary to specify a subframe in which the PUSCH that can be transmitted in the subframe 3 or 8 is scheduled for power control.

In the above example, if i is the subframe 3 or 8, that is, when the PUSCH transmission is performed in the subframe 3 or 8, it may be determined to be 7 when the LSB of the UL index of the DCI format 0 or 4 or other DCI format provided in the PDCCH or EPDCCH is 1.

3-10th Embodiment

In the 3-10th embodiment, described is the timing when the PHICH including the HARQ-ACK information following PUSCH transmission is transmitted. That is, description relates to a time relation between the transmitted PUSCH and the PHICH including the HARQ-ACK information received by the terminal.

The terminal configured with latency reduction can determine that the HARQ-ACK information of the PHICH transmitted in the subframe i is associated with the PUSCH transmitted in the subframe i−k. In case of the FDD system, the k is given as 3. That is, in the FDD system, the HARQ-ACK information of the PHICH transmitted in the subframe i is associated with the PUSCH transmitted in the subframe i−3. In case of the TDD system, a terminal configured without EIMTA is configured for only one serving cell or has the same TDD UL/DL configuration, the value of k may be given as shown in Table 3-10 when the TDD UL/DL configuration is 1 to 6.

TABLE 3-10

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | 3 | 3 | | | | 3 | 3 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 3 | 3 | | | | 3 | 3 | | | 5 |

That is, for example, in the TDD UL/DL configuration 1, the PHICH transmitted in the subframe 6 may be the HARQ-ACK information of the PUSCH transmitted in the subframe 2 which is four subframes before.

In case of the TDD UL/DL configuration 0, if the HARQ-ACK is received in the PHICH resource corresponding to $I_{PHICH}=0$, the PUSCH indicated by the HARQ-ACK information is what transmitted in the subframe i−k, and the value of k is given according to Table 3-10. Also, in case of the TDD UL/DL configuration 0, if the HARQ-ACK is received in the PHICH resource corresponding to $I_{PHICH}=1$, the PUSCH indicated by the HARQ-ACK information is what transmitted in the subframe i−6. The above-described method may be applied to the latency reduction terminal capable of n+3.

Alternatively, implementation may be modified as follows.

The terminal configured with latency reduction can determine that the HARQ-ACK information of the PHICH transmitted in the subframe i is associated with the PUSCH transmitted in the subframe i−k. In case of the FDD system, the k is given as 2. That is, in the FDD system, the HARQ-ACK information of the PHICH transmitted in the subframe i is associated with the PUSCH transmitted in the subframe i−2. In case of the TDD system, a terminal configured without EIMTA is configured for only one serving cell or has the same TDD UL/DL configuration, the value of k may be given as shown in Table 3-11 when the TDD UL/DL configuration is 1 to 6.

TABLE 3-11

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | 2 | 2 | | | | 2 | 2 | | | |
| 1 | | 3 | | | 2 | | 3 | | | 2 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 3 | 3 | | | | 3 | 3 | | | 5 |

That is, for example, in the TDD UL/DL configuration 1, the PHICH transmitted in the subframe 6 may be the HARQ-ACK information of the PUSCH transmitted in the subframe 3 which is three subframes before.

In case of the TDD UL/DL configuration 0, if the HARQ-ACK is received in the PHICH resource corresponding to $I_{PHICH}=0$, the PUSCH indicated by the HARQ-ACK information is what transmitted in the subframe i−k, and the value of k is given according to Table 3-11. Also, in case of the TDD UL/DL configuration 0, if the HARQ-ACK is received in the PHICH resource corresponding to $I_{PHICH}=1$, the PUSCH indicated by the HARQ-ACK information is what transmitted in the subframe i−3.

The operating methods corresponding to Table 3-10 and Table 3-11 may be selected according to upper signaling from the base station.

In this disclosure, if i−k or n−k is smaller than zero, the subframe i−k or n−k may indicate the subframe 10+i−k or 10+n−k of the previous radio frame.

The 3-10th embodiment may be set as the 3-1st to 3-4th embodiments, thereby being used to reduce the retransmission delay time in data transmission.

3-11th Embodiment

In the 3-11th embodiment, a method of determining a timing when the terminal receiving a downlink data PDSCH transmits a HARQ ACK/NACK for the PDSCH to an uplink channel such as a PUCCH or PUSCH will be described. This embodiment can be applied to a case of carrier aggregation, especially a case where a primary cell (Pcell) is the TDD system and a secondary cell (Scell) is the FDD. The FDD may correspond to a frame structure 1 of the LTE, and the TDD may correspond to a frame structure 2 of the LTE.

The HARQ ACK/NACK information of the PDSCH transmitted in the subframe n−k is transmitted in the subframe n, and the k may be changed according to the TDD UL/DL configuration and the subframe location as shown in Table 3-12. In this embodiment, the PDSCH may be a PDSCH scheduled by the PDCCH/EPDCCH or a PDSCH configured with SPS.

TABLE 3-12

| DL-reference UL/DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 5, 4 | 4, 3 | 3 | — | — | 5, 4 | 4, 3 | 3 |
| 1 | — | — | 6, 5 | 5, 4, 3 | — | — | — | 6, 5 | 5, 4, 3 | — |
| 2 | — | — | 7, 6, 5, 4, 3 | — | — | — | — | 7, 6, 5, 4, 3 | — | — |
| 3 | — | — | 10, 9, 8, 7, 6, 5 | 5, 4 | 4, 3 | — | — | — | — | — |

TABLE 3-12-continued

| DL-reference UL/DL Configuration | Subframe n 0 | 1 | 2 | 3 | 4 | 5 | 6 | 7 | 8 | 9 |
|---|---|---|---|---|---|---|---|---|---|---|
| 4 | — | — | 11, 10, 9, 8, 7 | 7, 6, 5, 4, 3 | — | — | — | — | — | — |
| 5 | — | — | 3, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

The order of numbers written in the above table may be modified and applied differently.

In Table 3-12, multiple k values mean that the HARQ ACK/NACK information for one or more PDSCHs can be transmitted together in the subframe n.

Instead of Table 3-12, Table 3-13 or Table 3-14 below may be applied.

TABLE 3-13

| DL-reference UL/DL Configuration | Subframe n 0 | 1 | 2 | 3 | 4 | 5 | 6 | 7 | 8 | 9 |
|---|---|---|---|---|---|---|---|---|---|---|
| 0 | — | — | 5, 4, 3 | 3 | 3 | — | — | 5, 4, 3 | 3 | 3 |
| 1 | — | — | 6, 5, 4, 3 | 3 | — | — | — | 6, 5, 4, 3 | 3 | — |
| 2 | — | — | 7, 6, 5, 4, 3 | — | — | — | — | 7, 6, 5, 4, 3 | — | — |
| 3 | — | — | 10, 9, 8, 7, 6, 5 | 5, 4 | 4, 3 | — | — | — | — | — |
| 4 | — | — | 11, 10, 9, 8, 7, 6 | 6, 5, 4, 3 | — | — | — | — | — | — |
| 5 | — | — | 12, 11, 10, 9, 8, 7, 6, 5, 4, 3 | — | — | — | — | — | — | — |
| 6 | — | — | 6, 5, 4 | 4 | 4 | — | — | 6, 5, 4, 3 | 3 | — |

TABLE 3-14

| DL-reference UL/DL Configuration | Subframe n 0 | 1 | 2 | 3 | 4 | 5 | 6 | 7 | 8 | 9 |
|---|---|---|---|---|---|---|---|---|---|---|
| 0 | — | — | 5, 4 | 4, 3 | 3 | — | — | 5, 4 | 4, 3 | 3 |
| 1 | — | — | 6, 5, 4, 3 | 3 | — | — | — | 6, 5, 4, 3 | 3 | — |
| 2 | — | — | 7, 6, 5, 4, 3 | — | — | — | — | 7, 6, 5, 4, 3 | — | — |
| 3 | — | — | 10, 9, 8, 7, 6, 5 | 5, 4 | 4, 3 | — | — | — | — | — |
| 4 | — | — | 11, 10, 9, 8, 7, 6 | 6, 5, 4, 3 | — | — | — | — | — | — |
| 5 | — | — | 12, 11, 10, 9, 8, 7, 6, 5, 4, 3 | — | — | — | — | — | — | — |
| 6 | — | — | 6, 5 | 5, 4 | 4 | — | — | 6, 5, 4 | 4, 3 | — |

Table 3-13 can be applied for the purpose of minimizing the delay time, and Table 3-14 can keep the number of HARQ-ACK bits transmitted in one subframe alike. Table 3-13 and Table 3-14 may be applied in combination according to the UL-DL configuration. In case of the UL-DL configuration 6, Table 3-15 and Table 3-16 may be applied.

TABLE 3-15

| DL-reference UL/DL Configuration | Subframe n 0 | 1 | 2 | 3 | 4 | 5 | 6 | 7 | 8 | 9 |
|---|---|---|---|---|---|---|---|---|---|---|
| 6 | — | — | 6, 5, 4, 3, | 3 | 3 | — | — | 5, 4, 3 | 3 | — |

TABLE 3-16

| DL-reference UL/DL Configuration | Subframe n 0 | 1 | 2 | 3 | 4 | 5 | 6 | 7 | 8 | 9 |
|---|---|---|---|---|---|---|---|---|---|---|
| 6 | — | — | 6, 5, 4, 3, | 3 | 3 | — | — | 5, 4 | 4, 3 | — |

Figure 3J:
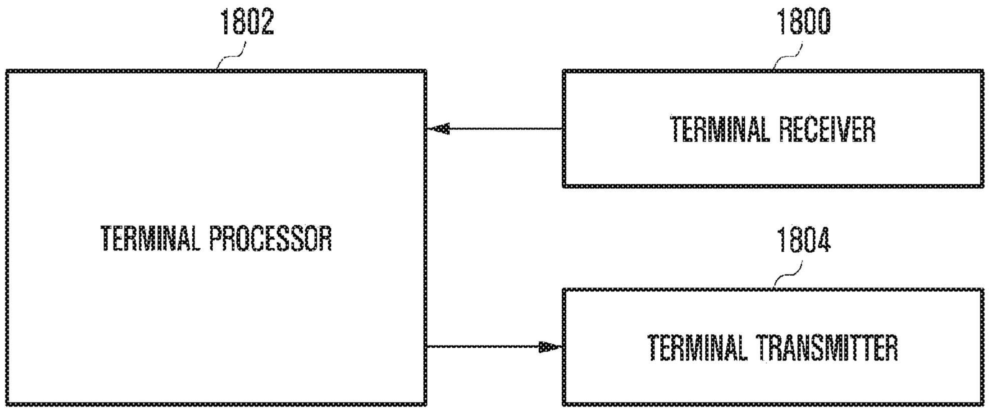
FIG. 3J is a block diagram illustrating a structure of a terminal according to embodiments.
Figure 3K:
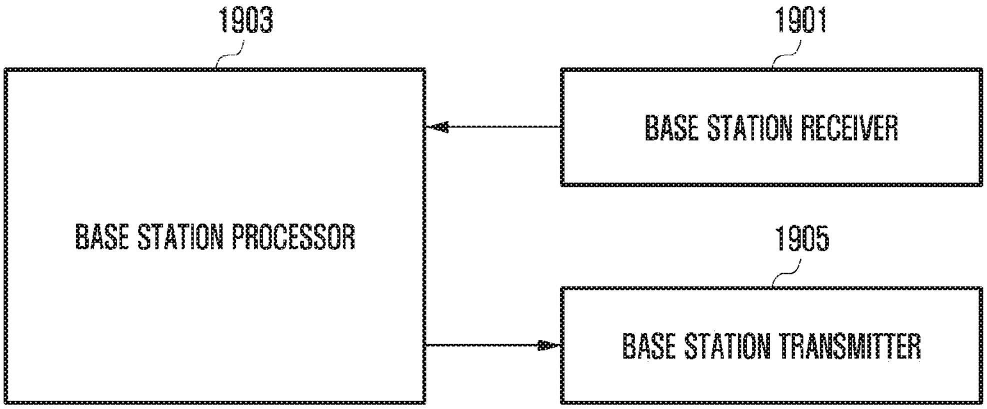
FIG. 3K is a block diagram illustrating a structure of a base station according to embodiments.

The terminal and the base station each having a transmitter, a receiver, and a processor for implementing the above-described embodiments of the present disclosure are shown in FIGS. 3J and 3K, respectively. The above-described 3-1st to 3-9th embodiments show transmission/reception methods of the base station and terminal for determining the second signal transmission/reception timing and terminal transmission power and performing a related operation. The receiver, the processor, and the transmitter in each of the base station and the terminal should operate in accordance with such embodiments.

Specifically, FIG. 3J is a block diagram illustrating an internal structure of a terminal according to an embodiment of the present disclosure. As shown FIG. 3J, the terminal of the present disclosure may include a terminal receiver 1200, a terminal transmitter 1204, and a terminal processor 1202. In embodiments of the present disclosure, the terminal receiver 1200 and the terminal transmitter 1204 may be collectively referred to as a transceiver.

The transceiver may transmit and receive signals to and from the base station. These signals may include control information and data. For this, the transceiver may include an RF transmitter for up-converting and amplifying the frequency of a signal to be transmitted, an RF receiver for low-noise amplifying a received signal and down-converting the frequency, and the like.

In addition, the transceiver may receive a signal through a radio channel, output the received signal to the terminal processor 1202, and transmit a signal, output from the terminal processor 1202, through a radio channel. The terminal processor 1202 may control the terminal to operate in accordance with the above-described embodiments of the present disclosure. For example, the terminal receiver 1200 may receive a signal including the second signal timing information from the base station, and the terminal processor 1202 may control to analyze the second signal transmission timing. Also, the terminal transmitter 1204 may transmit the second signal in accordance with the timing.

FIG. 3K is a block diagram illustrating an internal structure of a base station according to an embodiment of the present disclosure. As shown in FIG. 3K, the base station of the present disclosure may include a base station receiver 1301, a base station transmitter 1305, and a base station processor 1303. In embodiments of the present disclosure, the base station receiver 1301 and the base station transmitter 1305 may be collectively referred to as a transceiver.

The transceiver may transmit and receive signals to and from the terminal. These signals may include control information and data. For this, the transceiver may include an RF transmitter for up-converting and amplifying the frequency of a signal to be transmitted, an RF receiver for low-noise amplifying a received signal and down-converting the frequency, and the like.

In addition, the transceiver may receive a signal through a radio channel, output the received signal to the base station processor 1303, and transmit a signal, output from the base station processor 1303, through a radio channel. The base station processor 1303 may control the base station to operate in accordance with the above-described embodiments of the present disclosure. For example, the base station processor 1303 may determine the second signal transmission timing and control to generate the second signal transmission timing information to be delivered to the terminal. Then, the base station transmitter 1305 may deliver the timing information to the terminal, and the base station receiver 1301 may receive the second signal on the basis of the timing.

In addition, according to an embodiment of the present disclosure, the base station processor 1303 may control to generate downlink control information (DCI) including the second signal transmission timing information. In this case, the DCI may indicate the second signal transmission timing information.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure. Further, the disclosed embodiments may be implemented in combination as needed. For example, the 3-1st, 3-2nd and 3-3rd embodiments of the present disclosure may be combined, at least in part, with each other for the operations of the base station and terminal. Also, although the above embodiments are presented on the basis of the LTE/LTE-A systems, such embodiments or modifications thereof based on the same technical idea may be implemented in other systems such as the 5G or NR system, and the like.

The invention claimed is:

1. A method performed by a base station in a wireless communication system, the method comprising:

transmitting to a terminal, first information associated with a number of a symbol for a demodulation reference signal (DMRS) and second information associated with an additional DMRS position, wherein the number of the symbol for the DMRS is one or two;

identifying a symbol position of the DMRS based on the first information, the second information, and a start of a slot which is identified between the start of the slot and a start of a scheduled physical downlink shared channel (PDSCH); and transmitting, to the terminal, the DMRS on the identified symbol position of the DMRS.

2. The method of claim 1, wherein the symbol position of the DMRS is identified based on the first information, the second information, and the start of the scheduled PDSCH which is identified between the start of the slot and the start of the scheduled PDSCH.

3. The method of claim 1, wherein the start of the slot between the start of the slot and the start of the scheduled PDSCH is identified by downlink control information (DCI).

4. The method of claim 1, wherein a first symbol of the DMRS and a second symbol of the DMRS are adjacent, in case that the number of the symbol for the DMRS is two.

5. The method of claim 2, wherein a first symbol of the DMRS is identified same as the start of the scheduled PDSCH, in case that the symbol position of the DMRS is identified based on the first information, the second information, and the start of the scheduled PDSCH.

6. A base station in a wireless communication system, comprising:

a transceiver; and a controller configured to:

transmit, to a terminal via the transceiver, first information associated with a number of a symbol for a demodulation reference signal (DMRS) and second information associated with an additional DMRS position, wherein the number of the symbol for the DMRS is one or two, identify a symbol position of the DMRS based on first information, the second information, and a start of a slot which is identified between the start of the slot and a start of a scheduled physical downlink shared channel (PDSCH), and transmit, to the terminal, the DMRS on the identified symbol position of the DMRS.

7. The base station of claim 6, wherein the symbol position of the DMRS is identified based on the first information, the second information, and the start of the scheduled PDSCH which is identified between the start of the slot and the start of the scheduled PDSCH.

8. The base station of claim 6, wherein the start of the slot between the start of the slot and the start of the scheduled PDSCH is identified by downlink control information (DCI).

9. The base station of claim 6, wherein a first symbol of the DMRS and a second symbol of the DMRS are adjacent, in case that the number of the symbol for the DMRS is two.

10. The base station of claim 7, wherein a first symbol of the DMRS is identified same as the start of the scheduled PDSCH, in case that the symbol position of the DMRS is identified based on the first information, the second information, and the start of the scheduled PDSCH.

11. A method by a terminal in a wireless communication system, the method comprising:

receiving, from a base station, first information associated with a number of a symbol for a demodulation reference signal (DMRS) and second information associated with an additional DMRS position, wherein the number of the symbol for the DMRS is one or two;

identifying symbol position of the DMRS based on the first information, the second information, and a start of a slot which is identified between the start of the slot and a start of a scheduled physical downlink shared channel (PDSCH); and receiving, from the base station, the DMRS on the identified symbol position of the DMRS.

12. The method of claim 11, wherein the symbol position of the DMRS is identified based on the first information, the second information, and the start of the scheduled PDSCH which is identified between the start of the slot and the start of the scheduled PDSCH, and wherein a first symbol of the DMRS is identified same as the start of the scheduled PDSCH, in case that the symbol position of the DMRS is identified based on the first information, the second information, and the start of the scheduled PDSCH.

13. The method of claim 11, wherein the start of the slot between the start of the slot and the start of the scheduled PDSCH is identified by downlink control information (DCI), and wherein a first symbol of the DMRS and a second symbol of the DMRS are adjacent, in case that the number of the symbol for the DMRS is two.

14. A terminal in a wireless communication system, comprising:

a transceiver; and a controller configured to:

receive, from a base station, via the transceiver, first information associated with a number of a symbol for a demodulation reference signal (DMRS) and second information associated with an additional DMRS position, wherein the number of the symbol for the DMRS is one or two, identify symbol position of the DMRS based on the first information, the second information, and a start of a slot which is identified between the start of the slot and a start of a scheduled physical downlink shared channel (PDSCH), and receive, from the base station, the DMRS on the identified symbol position of the DMRS.

15. The terminal of claim 14, wherein the symbol position of the DMRS is identified based on the first information, the second information, and the start of the scheduled PDSCH which is identified between the start of the slot and the start of the scheduled PDSCH, and wherein a first symbol of the DMRS is identified same as the start of the scheduled PDSCH, in case that the symbol position of the DMRS is identified based on the first information, the second information, and the start of the scheduled PDSCH.

16. The terminal of claim 14, wherein the start of the slot between the start of the slot and the start of the scheduled PDSCH is identified by downlink control information (DCI), and wherein a first symbol of the DMRS and a second symbol of the DMRS are adjacent, in case that the number of the symbol for the DMRS is two.

* * * * *